(12) United States Patent
Sato et al.

(10) Patent No.: US 7,902,282 B2
(45) Date of Patent: Mar. 8, 2011

(54) PRESSURE-SENSITIVE ADHESIVE CONTAINING NEAR INFRARED ABSORBING COLORING MATTER

(75) Inventors: Wataru Sato, Yokohama (JP); Kumiko Okamoto, Yokohama (JP); Yasuyo Saito, Yokohama (JP); Masahiro Kawashima, Yokohama (JP); Takeshi Kaneda, Yokohama (JP)

(73) Assignee: API Corporation, Osaka-shi (JP)

( * ) Notice: Subject to any disclaimer, the term of this patent is extended or adjusted under 35 U.S.C. 154(b) by 330 days.

(21) Appl. No.: 11/911,919

(22) PCT Filed: Apr. 28, 2006

(86) PCT No.: PCT/JP2006/309049
§ 371 (c)(1),
(2), (4) Date: Oct. 18, 2007

(87) PCT Pub. No.: WO2006/118277
PCT Pub. Date: Nov. 9, 2006

(65) Prior Publication Data
US 2009/0029135 A1    Jan. 29, 2009

(30) Foreign Application Priority Data
Apr. 28, 2005   (JP) .................. 2005-133342

(51) Int. Cl.
C08K 5/00     (2006.01)
C07F 15/00    (2006.01)
(52) U.S. Cl. ...................... 524/399; 556/150
(58) Field of Classification Search .......... 556/150; 524/399
See application file for complete search history.

(56) References Cited

U.S. PATENT DOCUMENTS

| | | | | |
|---|---|---|---|---|
| 3,875,199 A * | 4/1975 | Bloom | ............ | 556/136 |
| 4,152,332 A * | 5/1979 | Bloom | ............ | 548/403 |
| 4,742,173 A * | 5/1988 | McDonnell et al. | ............ | 556/146 |
| 4,753,923 A * | 6/1988 | Byers et al. | ............ | 503/227 |
| 4,767,571 A * | 8/1988 | Suzuki et al. | ............ | 252/587 |
| 4,806,664 A * | 2/1989 | Schrott et al. | ............ | 556/136 |
| 4,835,317 A * | 5/1989 | Suzuki et al. | ............ | 568/66 |
| 4,921,317 A * | 5/1990 | Suzuki et al. | ............ | 359/350 |
| 4,992,244 A * | 2/1991 | Grate | ............ | 422/98 |
| 5,036,040 A * | 7/1991 | Chapman et al. | ............ | 503/227 |
| 5,574,715 A * | 11/1996 | Namba et al. | ............ | 369/288 |
| 5,804,102 A * | 9/1998 | Oi et al. | ............ | 252/587 |
| 6,074,802 A * | 6/2000 | Murata et al. | ............ | 430/270.1 |
| 6,117,370 A * | 9/2000 | Hasegawa et al. | ............ | 252/587 |
| 6,120,692 A * | 9/2000 | Wang et al. | ............ | 210/749 |
| 6,255,031 B1 * | 7/2001 | Yao et al. | ............ | 430/270.1 |
| 6,451,414 B1 * | 9/2002 | Wheatley et al. | ............ | 428/212 |
| 6,522,463 B1 * | 2/2003 | Shimomura et al. | ............ | 359/350 |
| 6,879,438 B2 * | 4/2005 | Masuda | ............ | 359/359 |
| 2002/0125464 A1 * | 9/2002 | Saito et al. | ............ | 252/587 |
| 2002/0148386 A1 * | 10/2002 | Woosman et al. | ............ | 106/31.27 |
| 2003/0105374 A1 * | 6/2003 | Wang et al. | ............ | 585/526 |
| 2003/0225296 A1 * | 12/2003 | Mueller-Westerhoff et al. | ............ | 556/136 |
| 2005/0153079 A1 * | 7/2005 | Hieda et al. | ............ | 428/1.2 |
| 2005/0201930 A1 * | 9/2005 | Klaveness et al. | ............ | 424/1.11 |
| 2005/0227164 A1 * | 10/2005 | Park et al. | ............ | 430/270.1 |
| 2005/0277729 A1 * | 12/2005 | Tsunemine et al. | ............ | 524/558 |
| 2006/0018688 A1 * | 1/2006 | Nakamura et al. | ............ | 399/336 |
| 2006/0257760 A1 * | 11/2006 | Mori et al. | ............ | 430/7 |
| 2007/0090331 A1 * | 4/2007 | Seo et al. | ............ | 252/587 |
| 2008/0085955 A1 * | 4/2008 | Yanagida et al. | ............ | 524/90 |
| 2009/0029135 A1 * | 1/2009 | Sato et al. | ............ | 428/220 |
| 2010/0012634 A1 * | 1/2010 | Caldecott | ............ | 219/121.72 |
| 2010/0019212 A1 * | 1/2010 | Yamamoto et al. | ............ | 252/587 |

FOREIGN PATENT DOCUMENTS

| | | |
|---|---|---|
| EP | 1 506 985 A1 | 2/2005 |
| EP | 1 602 700 A1 | 12/2005 |
| JP | 56-143242 | 11/1981 |
| JP | 64-69686 | 3/1989 |
| JP | 2001-207142 | 7/2001 |
| JP | 2002-201449 | 7/2002 |
| JP | 2004-4385 | 1/2004 |
| JP | 2004182936 A * | 7/2004 |
| JP | 2005232158 A * | 9/2005 |
| KR | 10-2004-0049280 | 6/2004 |

OTHER PUBLICATIONS

Machine Translation of JP 2005232158 A 2010.*
Cornelia Kraffert, et al., Komplexe mit Dimethyltetrathiooxalat: Struktur und Eigenschaften von [Ni(S$_2$C$_2$(SMe)$_2$)$_2$] und [Pd(sC$_2$(SMe)$_2$)(PPH$_3$)$_2$], Z. anorg. Allg. Chem. 588, 1990, pp. 167-180. (with English abstract). A. Charlton, et al., "Synthesis, Physical Properties and X-Ray Crystal Structures of a Series of Nickel Complexes based on n-Alkylthio-substituted Ethylene-1,2-dithiolene Ligands", J. Mater. Chem, vol. 4, No. 12, 1994, pp. 1861-1866.
Yang Geng-Xin, et al., Study on complexes of potassium 1,2-di (benzylthio) vinylenedithiolate and metals, Chemical Abstracts, vol. 132, No. 23, 2000, 19 pages.
Chi Xing-Bao, et al., Synthesis of benzylthioethenedithiolate ,metal complexes, Chemical Abstracts, vol. 133, No. 19, 2000, 14 pages.

* cited by examiner

*Primary Examiner* — Mark Eashoo
*Assistant Examiner* — Liam J Heincer
(74) *Attorney, Agent, or Firm* — Oblon, Spivak, McClelland, Maier & Neustadt, L.L.P.

(57) ABSTRACT

A pressure-sensitive adhesive containing a near infrared absorbing dye having excellent shielding function for near infrared rays and excellent in durability is provided. In a light resistance test, a layer of the pressure-sensitive adhesive having a thickness of 25±5 μm has an absorption intensity at the maximum absorption wavelength of the near infrared absorbing dye after a light resistance test of 50% or more of the absorption intensity before the test in which light with an irradiance of 64.5 W/m$^2$ at a wavelength of 300 to 400 nm is irradiated on the layer for 160 hours.

2 Claims, 22 Drawing Sheets

Dotted line: Before test   Solid line: After test for 160 hours

Dotted line: Before test   Solid line: After test for 250 hours   Narrow solid line: After test for 500 hours Dotted line: Before test   Solid line: After test for 250 hours   Narrow solid line: After test for 500 hours Dotted line: Before test   Solid line: After test for 160 hours Dotted line: Before test   Solid line: After test for 250 hours   Narrow solid line: After test for 500 hours Dotted line: Before test   Solid line: After test for 250 hours   Narrow solid line: After test for 500 hours Dotted line: Before test  Solid line: After test for 160 hours Dotted line: Before test  Solid line: After test for 250 hours  Narrow solid line: After test for 500 hours Dotted line: Before test   Solid line: After test for 250 hours   Narrow solid line: After test for 500 hours Dotted line: Before test   Solid line: After test for 160 hours Dotted line: Before test   Solid line: After test for 250 hours   Narrow solid line: After test for 500 hours Dotted line: Before test   Solid line: After test for 250 hours   Narrow solid line: After test for 500 hours Dotted line: Before test   Solid line: After test for 160 hours Dotted line: Before test   Solid line: After test for 250 hours   Narrow solid line: After test for 500 hours Dotted line: Before test  Solid line: After test for 250 hours  Narrow solid line: After test for 500 hours Dotted line: Before test  Solid line: After test for 160 hours Dotted line: Before test  Solid line: After test for 250 hours  Narrow solid line: After test for 500 hours Dotted line: Before test  Solid line: After test for 250 hours  Narrow solid line: After test for 500 hours Dotted line: Before test   Solid line: After test for 160 hours Dotted line: Before test   Solid line: After test for 250 hours   Narrow solid line: After test for 500 hours Dotted line: Before test  Solid line: After test for 250 hours  Narrow solid line: After test for 500 hours Dotted line: Before test  Solid line: After test for 160 hours Dotted line: Before test   Solid line: After test for 250 hours   Narrow solid line: After test for 500 hours Dotted line: Before test   Solid line: After test for 250 hours   Narrow solid line: After test for 500 hours Dotted line: Before test   Solid line: After test for 160 hours Dotted line: Before test   Solid line: After test for 250 hours   Narrow solid line: After test for 500 hours Dotted line: Before test    Solid line: After test for 250 hours    Narrow solid line: After test for 500 hours Dotted line: Before test    Solid line: After 3 days in ripening at room    Narrow solid line: After 15 days at room temperature Dotted line: Before test    Solid line: After test for 160 hours Dotted line: Before test   Solid line: After test for 250 hours   Narrow solid line: After test for 500 hours Dotted line: Before test    Solid line: After test for 250 hours    Narrow solid line: After test for 500 hours Dotted line: Before test    Solid line: After test for 160 hours Dotted line: Before test   Solid line: After test for 250 hours   Narrow solid line: After test for 500 hours Dotted line: Before test   Solid line: After test for 250 hours   Narrow solid line: After test for 500 hours Dotted line: Before test   Solid line: After test for 160 hours Dotted line: Before test   Solid line: After test for 250 hours   Narrow solid line: After test for 500 hours Dotted line: Before test   Solid line: After test for 250 hours   Narrow solid line: After test for 500 hours Dotted line: Before test   Solid line: After 3 days in ripening   Narrow solid line: Original absorption shape Dotted line: Before test   Solid line: After test for 160 hours Dotted line: Before test  Solid line: After test for 250 hours  Narrow solid line: After test for 500 hours Dotted line: Before test    Solid line: After test for 250 hours    Narrow solid line: After test for 500 hours Dotted line: Before test    Solid line: After test for 160 hours Dotted line: Before test  Solid line: After test for 250 hours  Narrow solid line: After test for 500 hours Dotted line: Before test  Solid line: After test for 250 hours  Narrow solid line: After test for 500 hours

PRESSURE-SENSITIVE ADHESIVE CONTAINING NEAR INFRARED ABSORBING COLORING MATTER

TECHNICAL FIELD

The invention relates to a near infrared absorbing dye capable of being compounded in a pressure-sensitive adhesive for an electronic display and a pressure-sensitive adhesive for an electronic display containing the near infrared absorbing dye.

BACKGROUND TECHNOLOGY

A plasma display panel discharges intense near infrared rays and electromagnetic wave in principle. Since near infrared rays act on neighboring electronic instruments such as a cordless phone and a video cassette recorder using a near infrared remote control, particularly at a wavelength range of 800 to 1050 nm and cause erroneous motion, there is a request for a panel having a function of shielding near infrared rays at 800 to 1050 nm.

With respect to near infrared rays shield, there have been conventionally studied variously those containing metal ions such as copper and iron and those containing near infrared absorbing dyes such as a nitroso compound and its metal complex salt, a cyanine compound, a squalilium compound, a dithiol metal complex compound, an aminothiophenol metal complex compound, a phthalocyanine compound, a naphthalocyanine compound, a triarylmethane compound, an immonium compound, a diimonium compound, a naphthoquinone compound, an anthraquinone compound, an amino compound and an aminium salt compound.

As its use mode, there can be considered (a) a transparent polymer film prepared by kneading a near infrared absorbing dye with a resin, (b) a polymer film prepared by a casting process by dispersing and dissolving the near infrared absorbing dye in a concentrated solution of a resin or a resin monomer/organic solvent, (c) those prepared by adding the dye to a resin binder and an organic dye solvent and coating the solution on a transparent polymer film, (d) those obtained by containing the near infrared absorbing dye in a pressure-sensitive adhesive, etc.

It is impossible that the above-mentioned near infrared absorbing dye covers the above-mentioned range of 800 to 1050 nm by only one dye. Usually, a plurality kinds of dyes, specifically, a dye absorbing near infrared rays with comparatively short wavelength and a dye absorbing near infrared rays with comparatively long wavelength among near infrared rays are used in combination.

Hereat, products are generally prepared by pasting a plural number of layers by the above-mentioned methods (a) to (c). However, considering labor hour at production, cost, and light transmittance, it is status quo that the much more the layers are laminated, the higher the cost is and the lower the light transmittance is. It is a direction for further reducing cost and improving the light transmittance that the number of layers is reduced.

Consequently, it is considered that if a dye is compounded in a pressure-sensitive adhesive used for interlayer adhesion by the method (d), the number of layers of plastic films used is reduced, cost is reduced and light transmittance is improved. This method has been studied hitherto and there is known a front filter for plasma display using a pressure-sensitive adhesive in which visible light absorbing dyes such as a methine dye and a tetraazaporphyrin dye are compounded (for example, Patent Documents 1 to 3).

Further, it is proposed that a diimmonium dye being a conventional near infrared absorbing dye that is preferably used for a front filter for plasma display, or a nickel dithiol dye known in Patent Document 4 is also compounded in a pressure-sensitive adhesive (Patent Documents 4 to 6).

Patent Document 1: Japanese Unexamined Patent Publication No. 2004-107566

Patent Document 2: Japanese Unexamined Patent Publication No. 2002-40233

Patent Document 3: Japanese Unexamined Patent Publication No. 2002-4372619

Patent Document 4: Japanese Unexamined Patent Publication No. 9-230134

Patent Document 5: Japanese Unexamined Patent Publication No. 10-156991

Patent Document 6: Japanese Unexamined Patent Publication No. 2001-207142

DISCLOSURE OF INVENTION

Problem to be Solved by the Invention

However, when the near infrared absorbing dyes proposed in the above-mentioned Patent Documents 4 to 6 are used, there have been problems that even though they can be compounded, durability thereafter is remarkably deteriorated in fact and cannot shield near infrared rays, etc. Accordingly, it has been not practically used that the near infrared absorbing dye is compounded in a pressure-sensitive adhesive to be used.

Considering the above-mentioned conventional technology, it is the purpose of the invention to provide a pressure-sensitive adhesive containing a near infrared absorbing dye having excellent shielding function for near infrared rays generated from an electronic display screen such as a plasma display panel and excellent in durability.

Means for Solving Problems

The present inventor has intensively studied means for solving the above-mentioned problems and as a result, has found that a metal complex having a specific structure has good heat resistance, heat and humidity resistance and light resistance. Further, the present inventor has found that a pressure-sensitive adhesive capable of absorbing so-called near infrared rays that effectively shields near infrared rays at a necessary range by combining a plural number of near infrared absorbing dyes, to complete the invention.

Namely, the purport of the invention exists in a pressure-sensitive adhesive containing a near infrared absorbing dye, wherein the layer of the pressure-sensitive adhesive has a thickness of 25±5 μm and absorption intensity at the maximum absorption wavelength of the near infrared absorbing dye after light resistance test is 50% or more for absorption intensity before the test in the light resistance test in which light with an irradiance of 64.5 W/m$^2$ at a wavelength of 300 to 400 nm is irradiated for the layer for 160 hours.

Further, it exists further in the pressure-sensitive adhesive including a near infrared absorbing dye represented by the under-mentioned general formula (1) that is a preferable means for attaining the parameter.

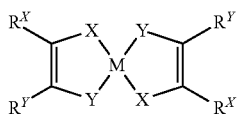

(1)

[In the formula (1), each of X and Y represents independently a sulfur atom, an oxygen atom, or a nitrogen atom which may optionally have a substituent, and when X is a nitrogen atom having a substituent, the substituent of the nitrogen atom is a group represented by the under-mentioned general formula (A).

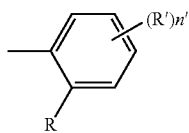

(A)

(In the general formula (A), R indicates a monovalent substituent having 3 or more in total of at least one atom selected from a carbon atom, an oxygen atom, a sulfur atom, a nitrogen atom and a silicon atom. However, (A) may form a condensed ring. R' represents an arbitrary monovalent substituent and R' may be mutually bonded to form a condensed ring. When (A) is a single ring, n' is 0 to 4 and when it is a condensed ring, n' is 0 to 10.)

Each of $R^X$ and $R^Y$ represents independently a monovalent substituent and may be bonded through a bonding group.

When X is an oxygen atom or a sulfur atom, $R^X$ is a compound represented by the under-mentioned general formula (A).

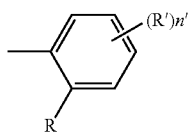

(A)

(In the general formula (A), R indicates a monovalent substituent having 4 or more in total of at least one atom selected from a carbon atom, an oxygen atom, a sulfur atom, a nitrogen atom and a silicon atom. However (A) may form a condensed ring. R' represents an arbitrary monovalent substituent and R' may be mutually bonded to form a condensed ring. When (A) is a single ring, n' is 0 to 4 and when it is a condensed ring, n' is 0 to 10.)

Each of $R^Y$ represents independently a monovalent substituent. M represents a metal atom.]

These pressure-sensitive adhesives containing a near infrared absorbing dye may contain a specific dye for color calibration and can be used as a portion of a filter for electronic display such as a filter for plasma display.

Effect of the Invention

According to the invention, there are provided a near infrared absorbing dye that provokes hardly the deterioration of the dye by mixing with a pressure-sensitive adhesive, is excellent in light resistance, further heat resistance and heat and humidity resistance, cuts broadly a near infrared rays range nearby 800 to 1050 nm, and a pressure-sensitive adhesive containing the dye.

The pressure-sensitive adhesive of the invention can be used as a portion of a filter for electronic display such as a filter for an optical plasma display panel by being used for adhesion with layers having another functions such as an antireflection layer and an electromagnetic wave shielding layer and the cost reduction and light transmittance can be improved by the reduction of the layers of a filter for electronic display and the reduction of pasting process.

BEST MODES FOR CARRYING OUT THE INVENTION

Figure 1:
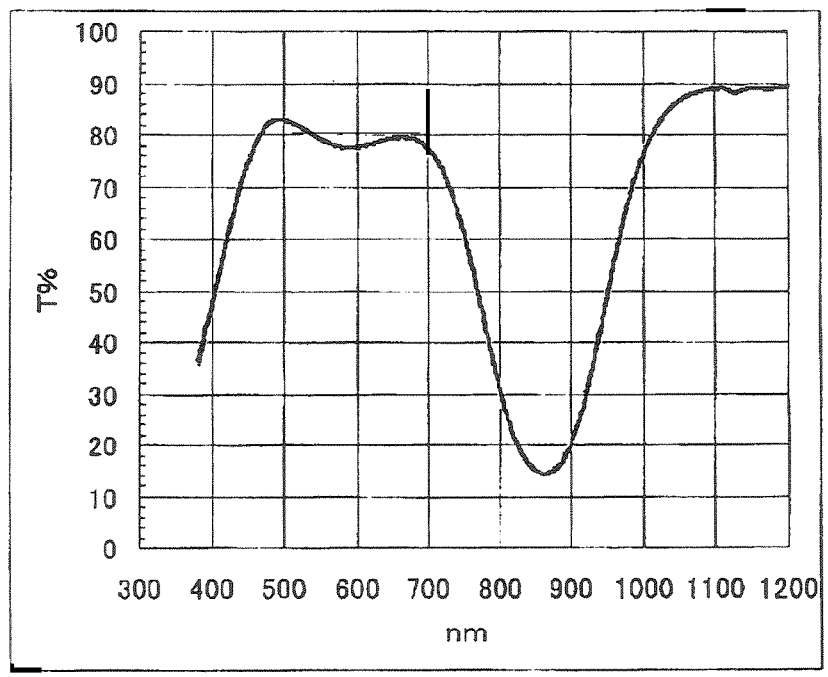
FIG. 1 is the measurement result of spectral transmission spectrum before and after evaluation 2 (light resistance test) in Example 1.
Figure 2:
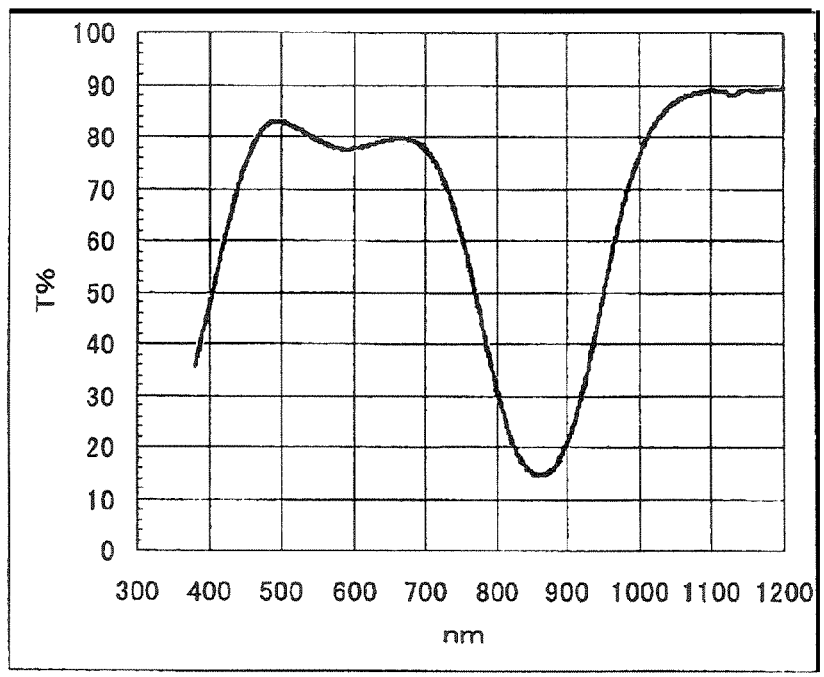
FIG. 2 is the measurement result of spectral transmission spectrum before and after evaluation 3 (heat and humidity resistance test) in Example 1.
Figure 3:
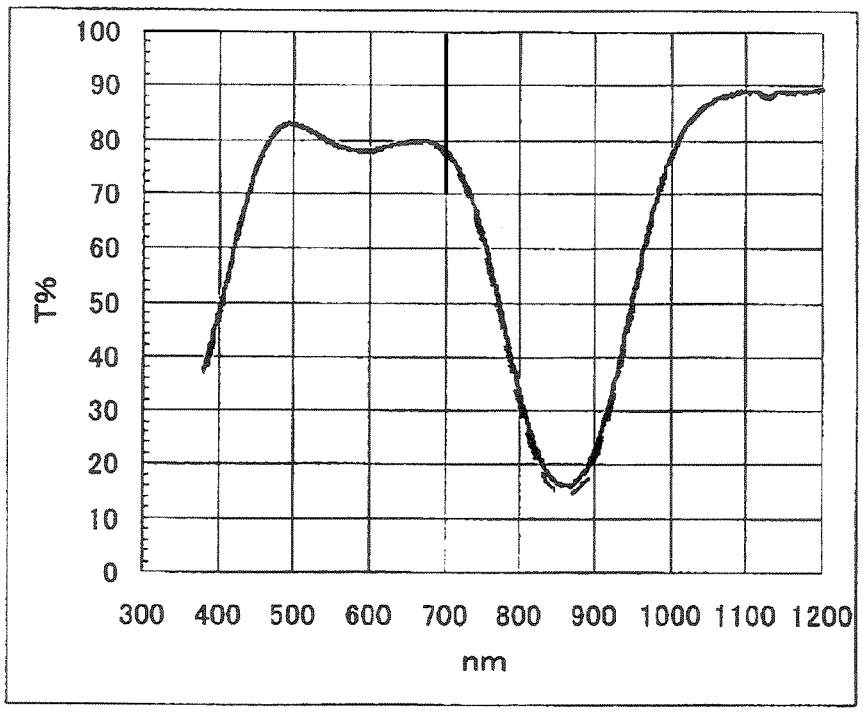
FIG. 3 is the measurement result of spectral transmission spectrum before and after evaluation 4 (heat resistance test) in Example 1.
Figure 4:
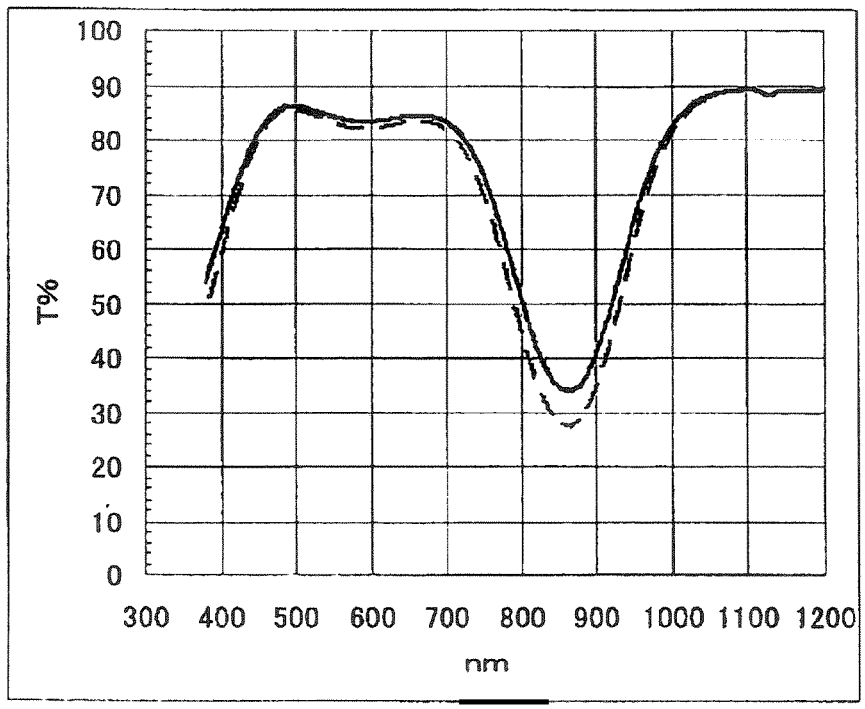
FIG. 4 is the measurement result of spectral transmission spectrum before and after evaluation 2 (light resistance test) in Example 2.
Figure 5:
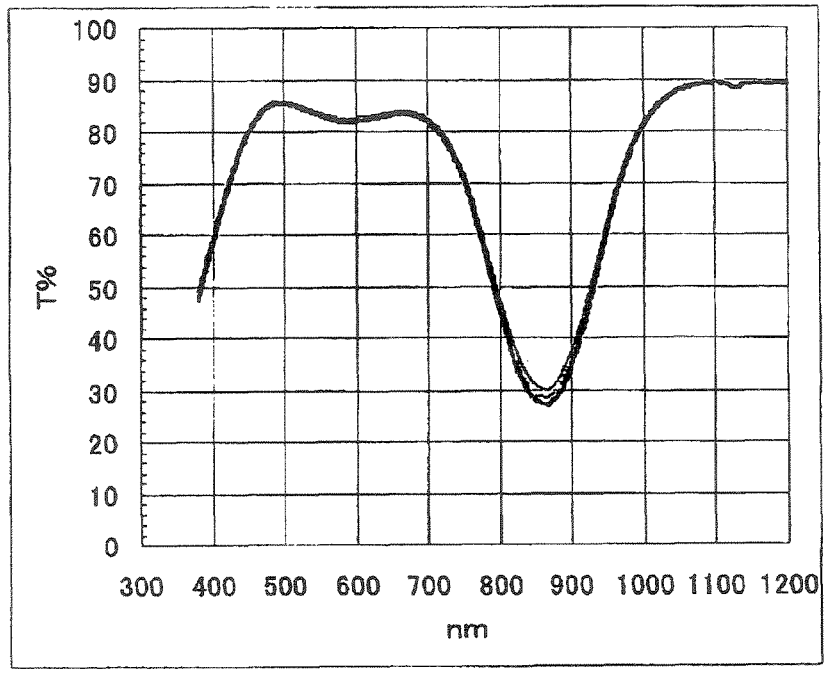
FIG. 5 is the measurement result of spectral transmission spectrum before and after evaluation 3 (heat and humidity resistance test) in Example 2.
Figure 6:
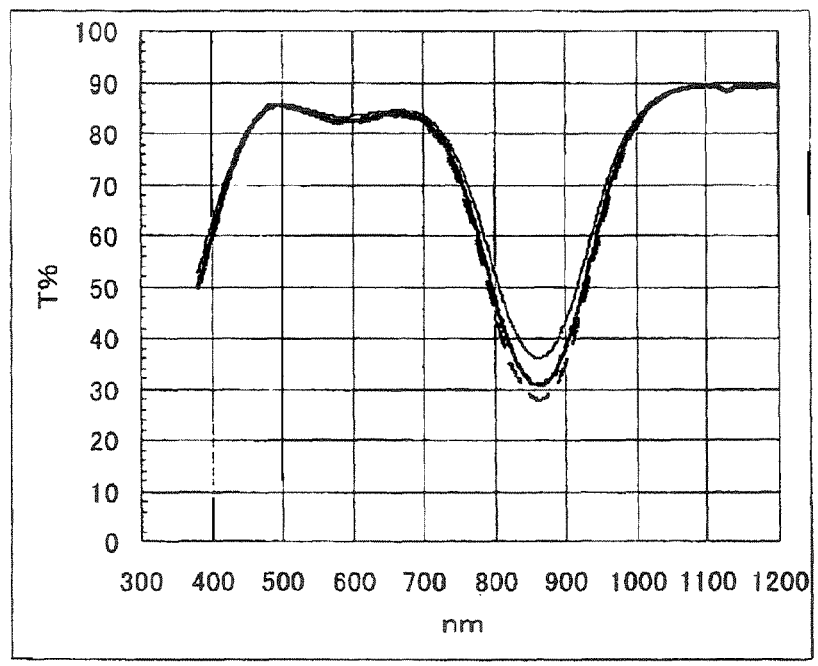
FIG. 6 is the measurement result of spectral transmission spectrum before and after evaluation 4 (heat resistance test) in Example 2.
Figure 7:
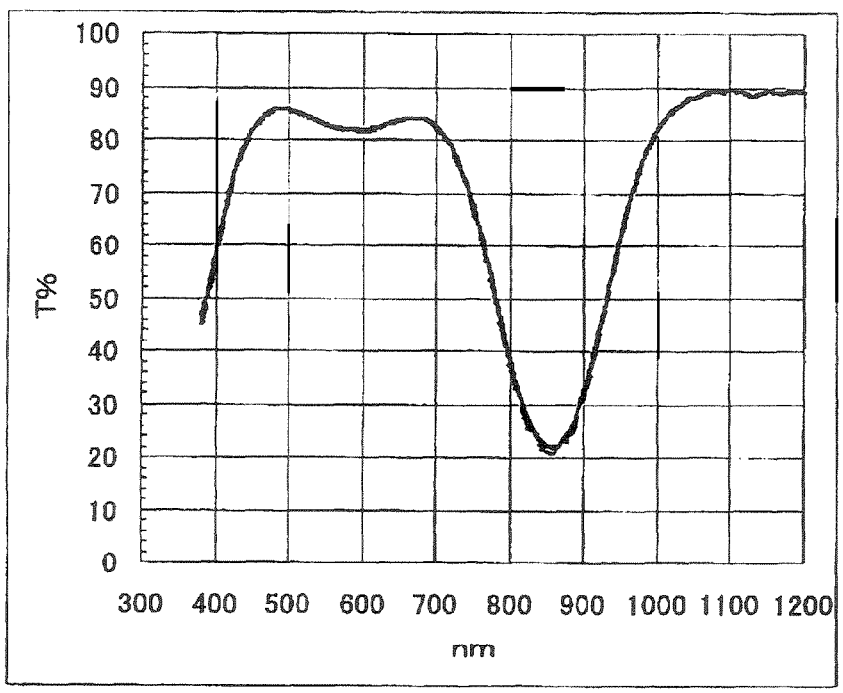
FIG. 7 is the measurement result of spectral transmission spectrum before and after evaluation 2 (light resistance test) in Example 6.
Figure 8:
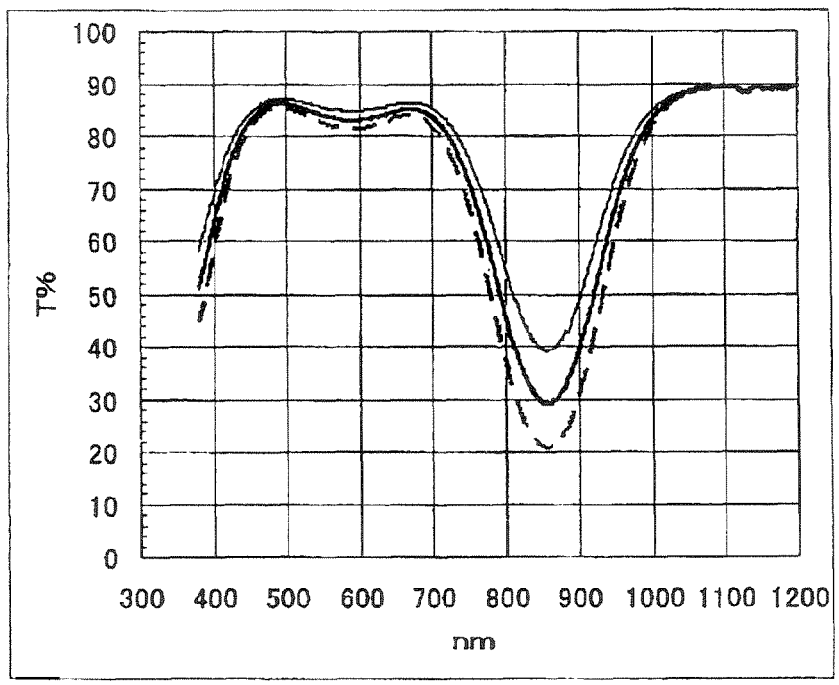
FIG. 8 is the measurement result of spectral transmission spectrum before and after evaluation 3 (heat and humidity resistance test) in Example 6.
Figure 9:
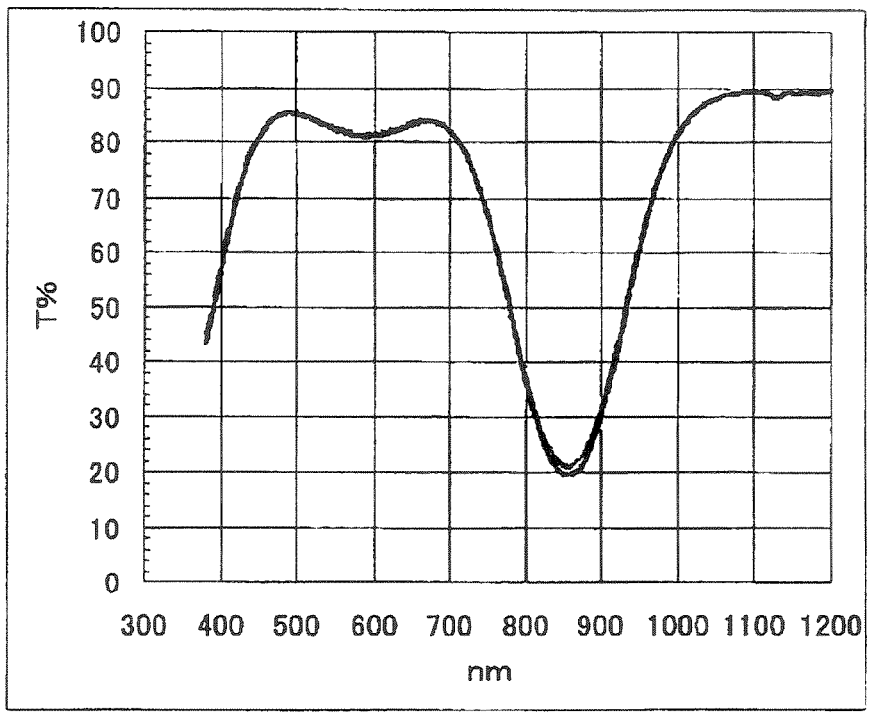
FIG. 9 is the measurement result of spectral transmission spectrum before and after evaluation 4 (heat resistance test) in Example 6.
Figure 10:
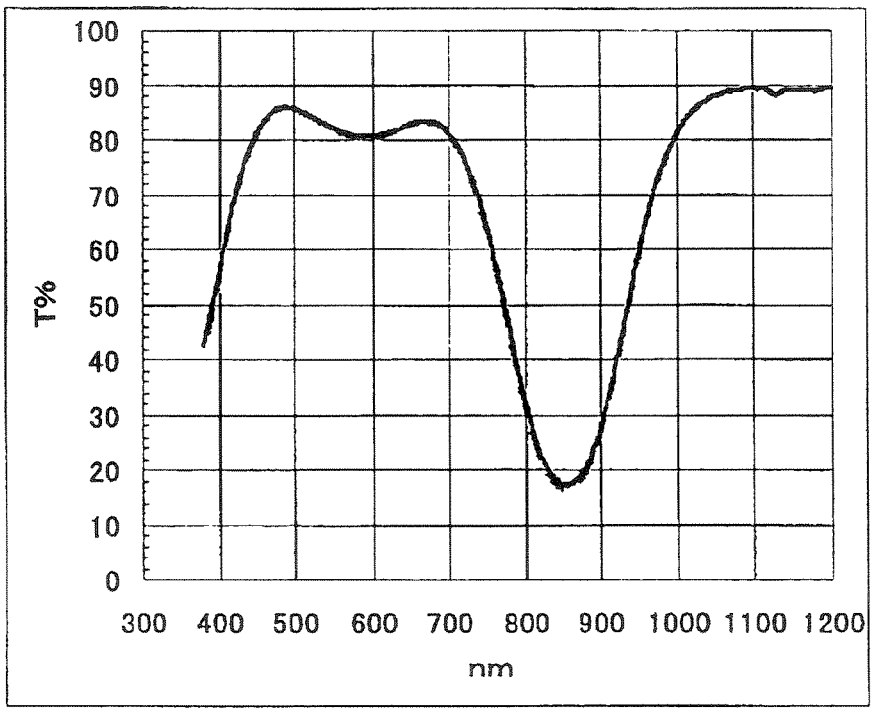
FIG. 10 is the measurement result of spectral transmission spectrum before and after evaluation 2 (light resistance test) in Example 8.
Figure 11:
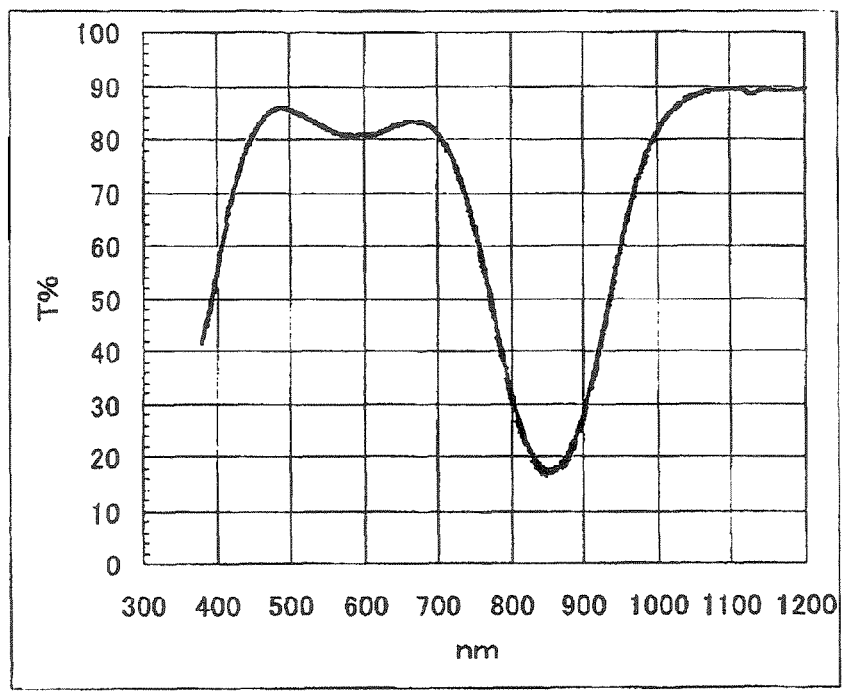
FIG. 11 is the measurement result of spectral transmission spectrum before and after evaluation 3 (heat and humidity resistance test) in Example 8.
Figure 12:
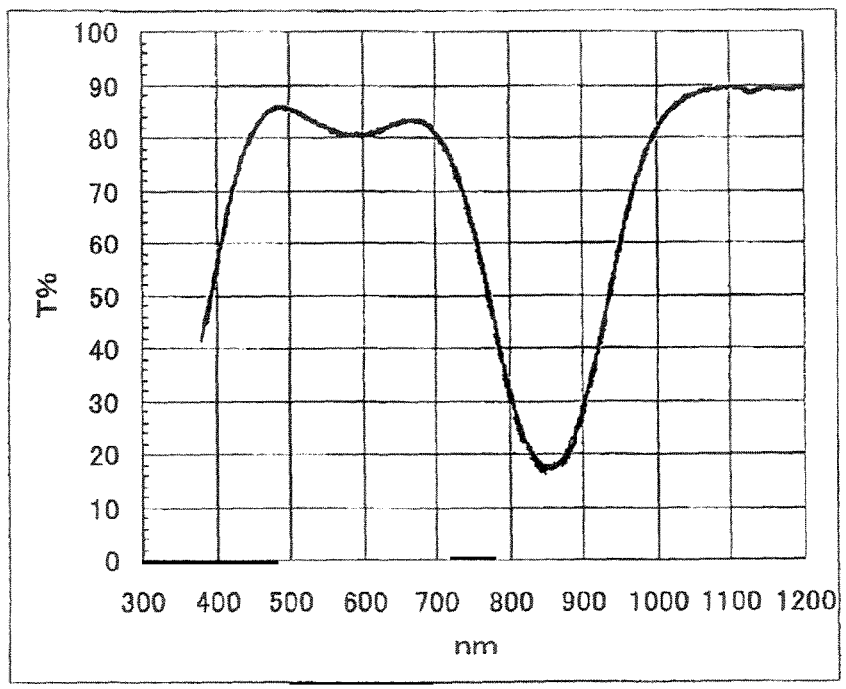
FIG. 12 is the measurement result of spectral transmission spectrum before and after evaluation 4 (heat resistance test) in Example 8.
Figure 13:
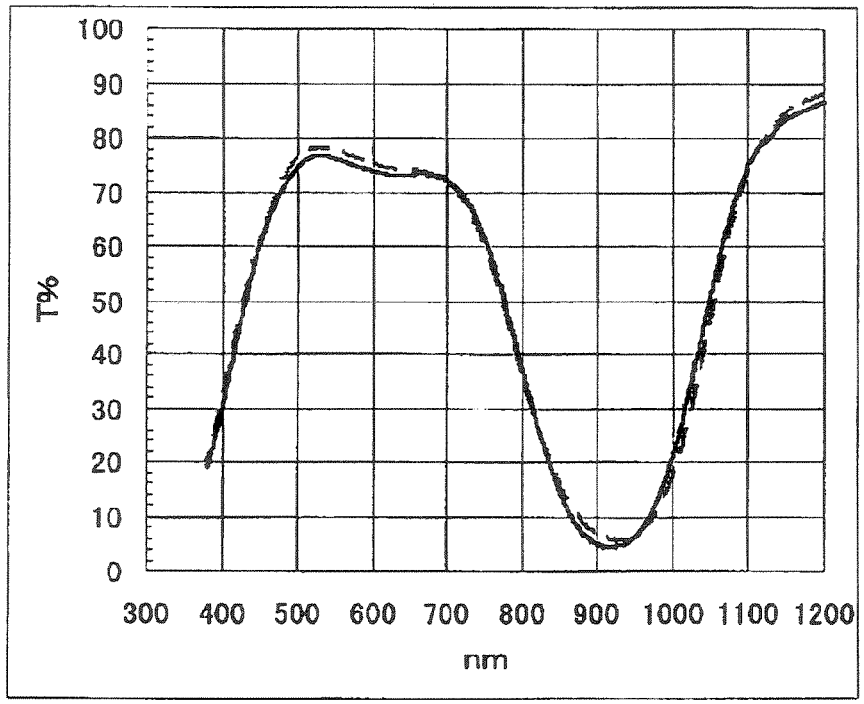
FIG. 13 is the measurement result of spectral transmission spectrum before and after evaluation 2 (light resistance test) in Example 22.
Figure 14:
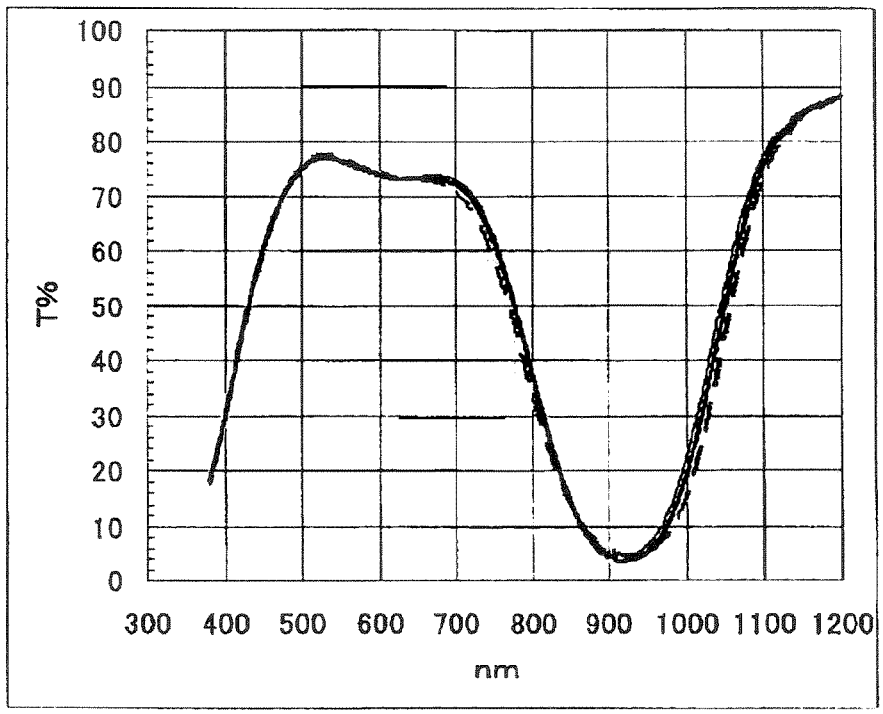
FIG. 14 is the measurement result of spectral transmission spectrum before and after evaluation 3 (heat and humidity resistance test) in Example 22.
Figure 15:
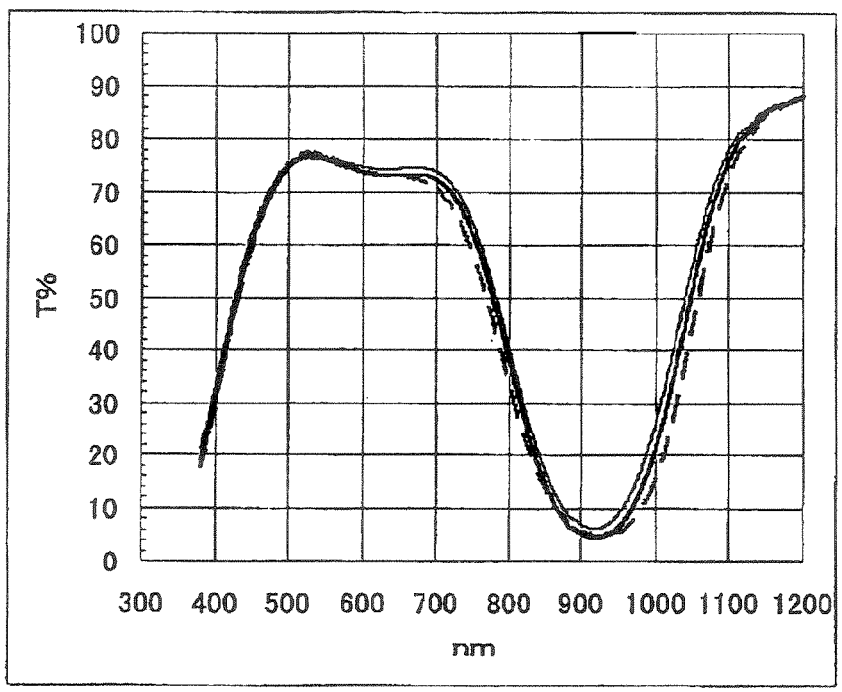
FIG. 15 is the measurement result of spectral transmission spectrum before and after evaluation 4 (heat resistance test) in Example 22.
Figure 16:
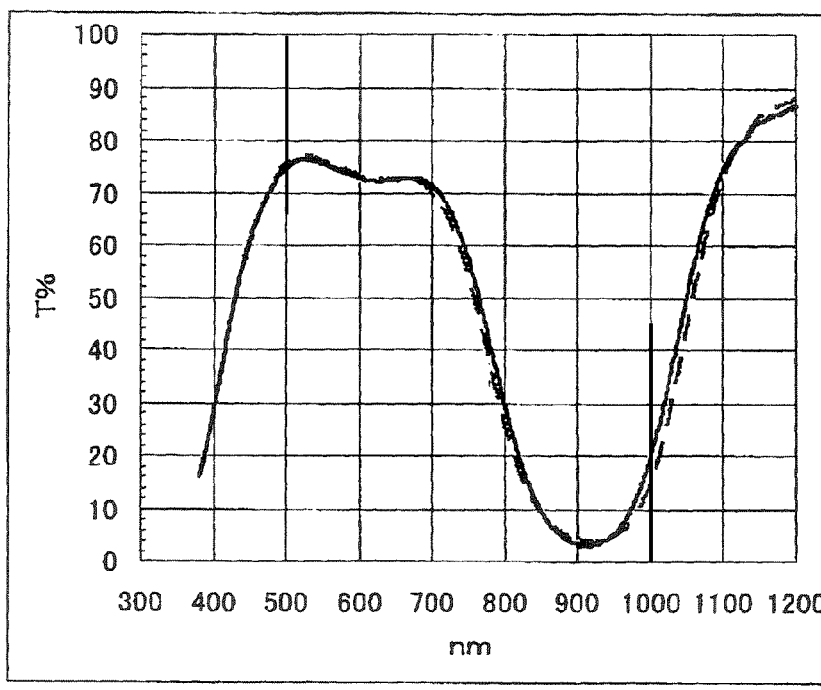
FIG. 16 is the measurement result of spectral transmission spectrum before and after evaluation 2 (light resistance test) in Example 24.
Figure 17:
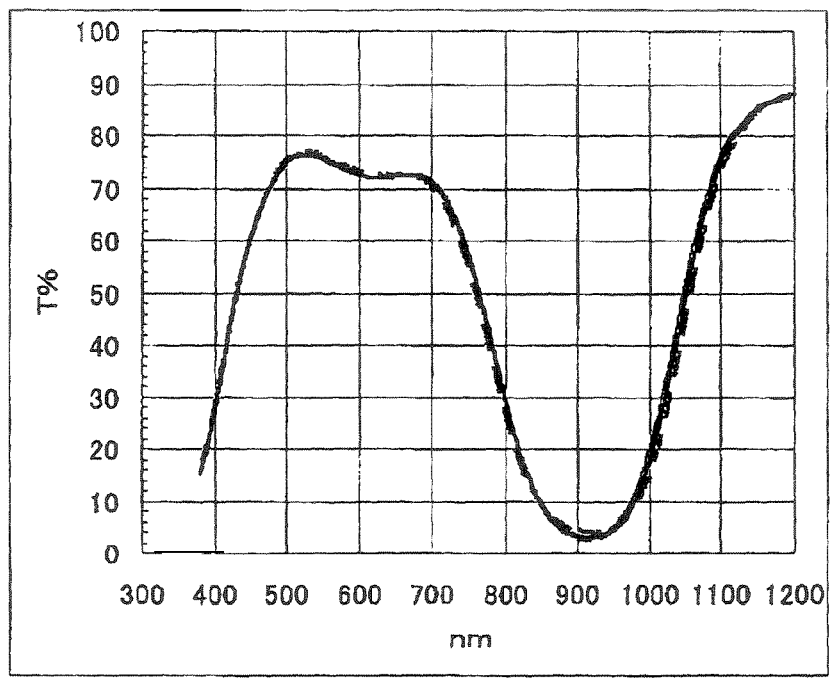
FIG. 17 is the measurement result of spectral transmission spectrum before and after evaluation 3 (heat and humidity resistance test) in Example 24.
Figure 18:
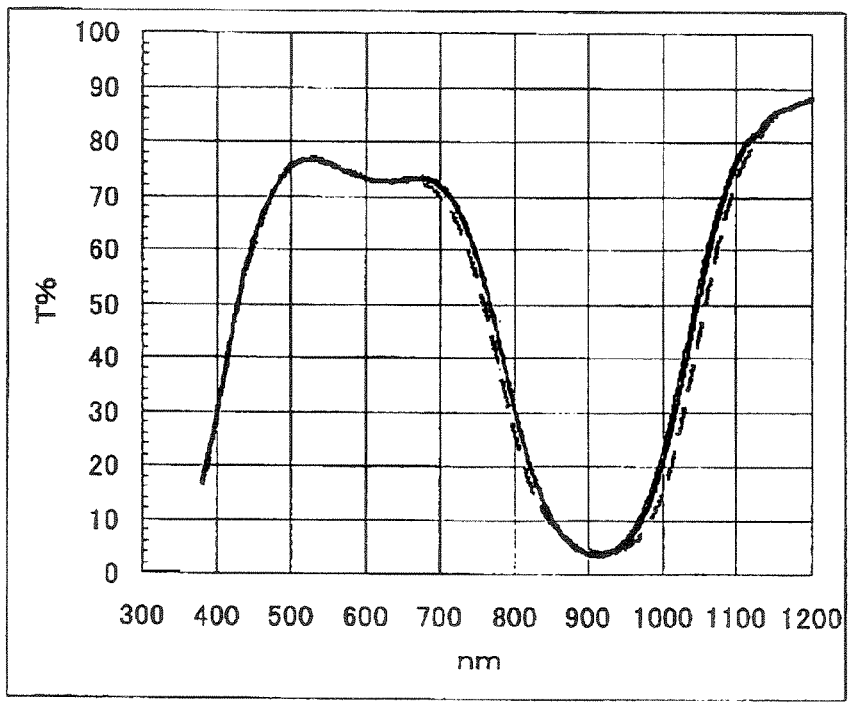
FIG. 18 is the measurement result of spectral transmission spectrum before and after evaluation 4 (heat resistance test) in Example 24.
Figure 19:
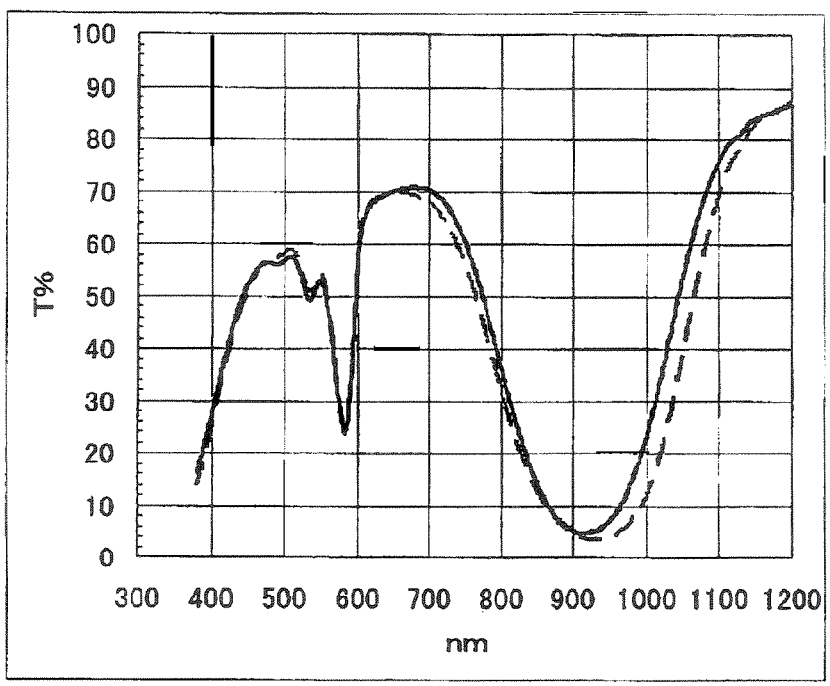
FIG. 19 is the measurement result of spectral transmission spectrum before and after evaluation 2 (light resistance test) in Example 27.
Figure 20:
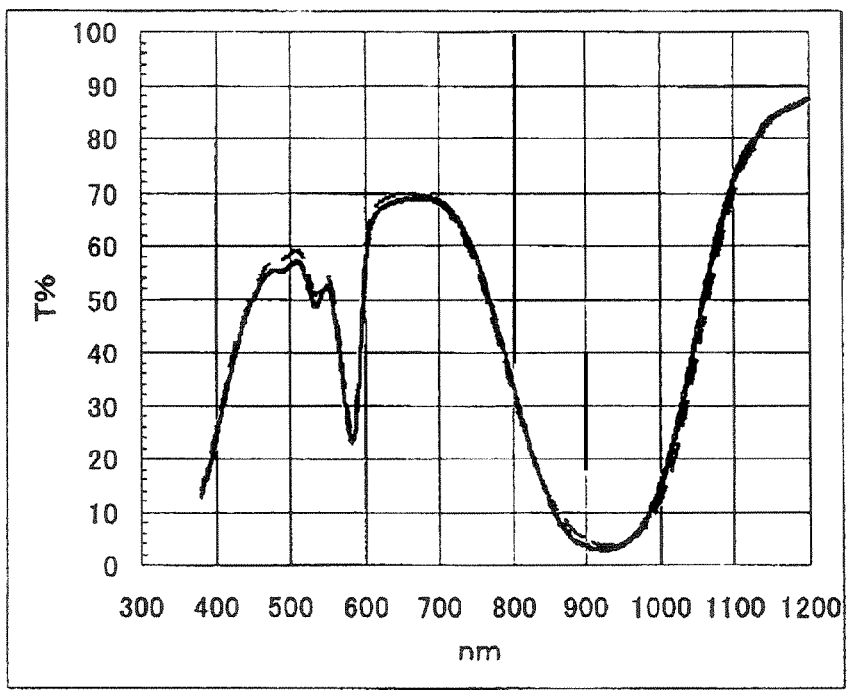
FIG. 20 is the measurement result of spectral transmission spectrum before and after evaluation 3 (heat and humidity resistance test) in Example 27.
Figure 21:
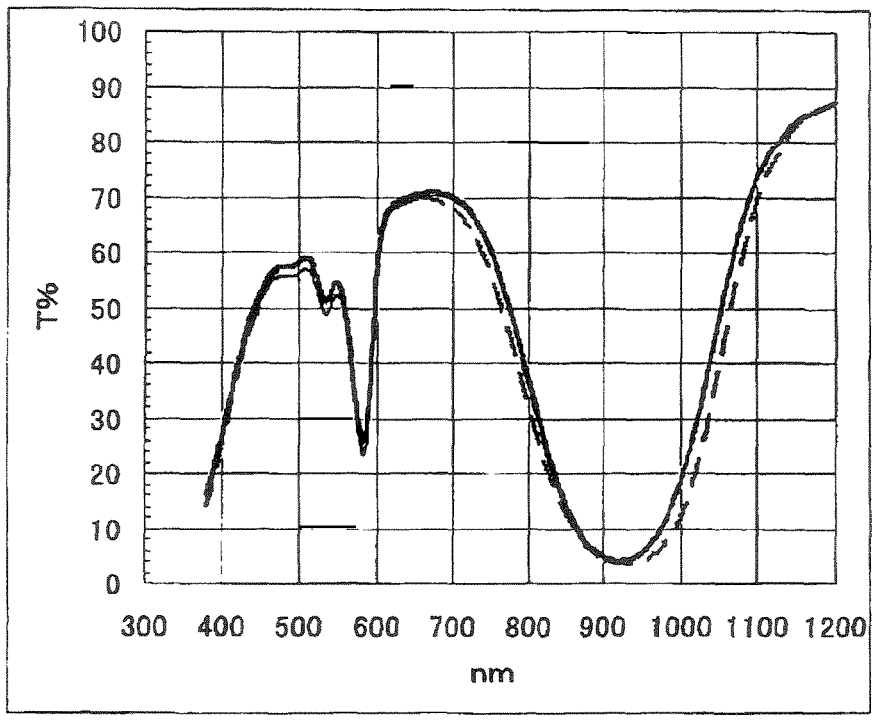
FIG. 21 is the measurement result of spectral transmission spectrum before and after evaluation 4 (heat resistance test) in Example 27.
Figure 22:
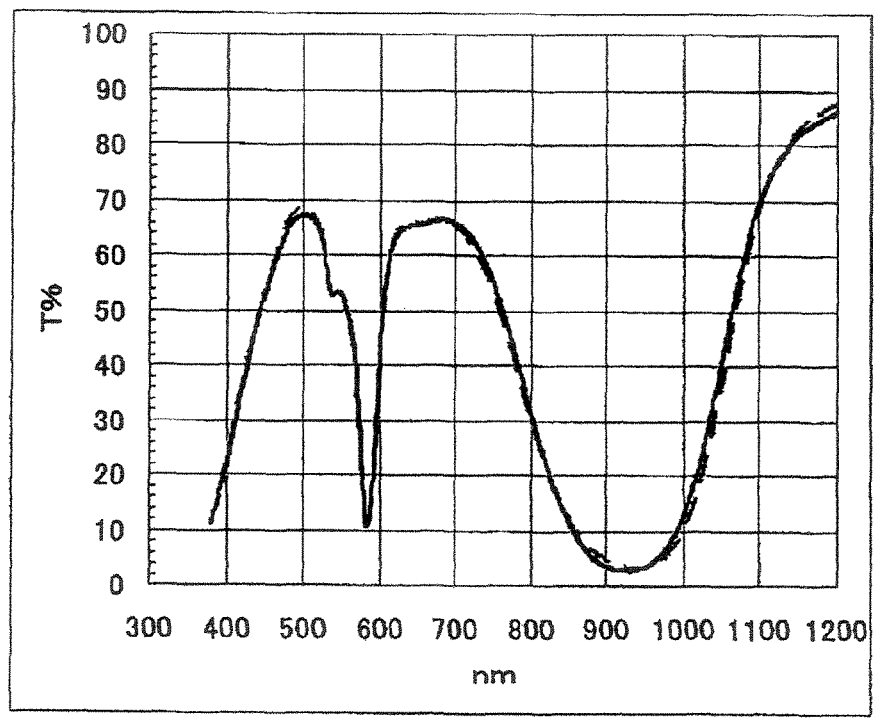
FIG. 22 is the measurement result of spectral transmission spectrum before and after evaluation 2 (light resistance test) in Example 28.
Figure 23:
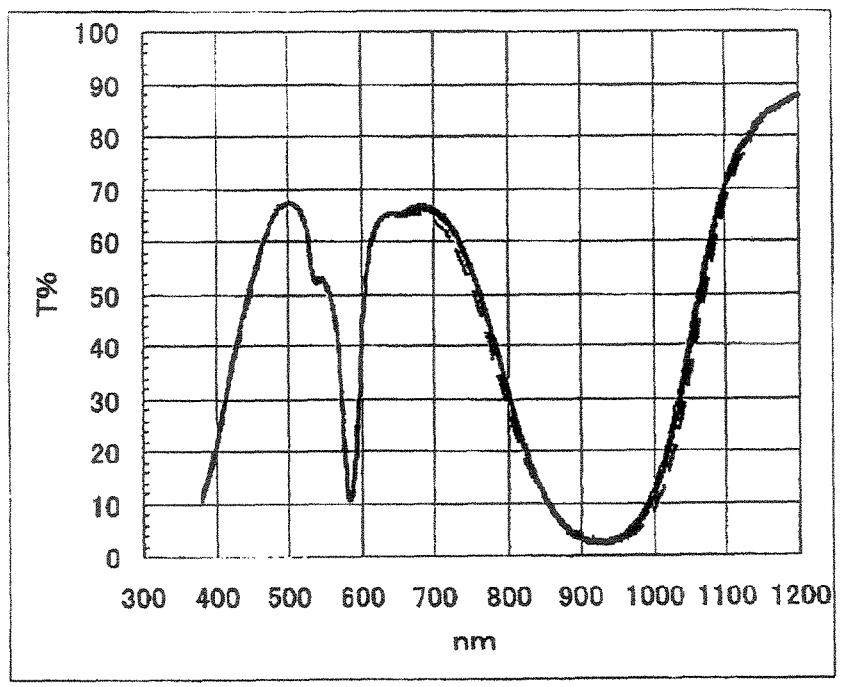
FIG. 23 is the measurement result of spectral transmission spectrum before and after evaluation 3 (heat and humidity resistance test) in Example 28.
Figure 24:
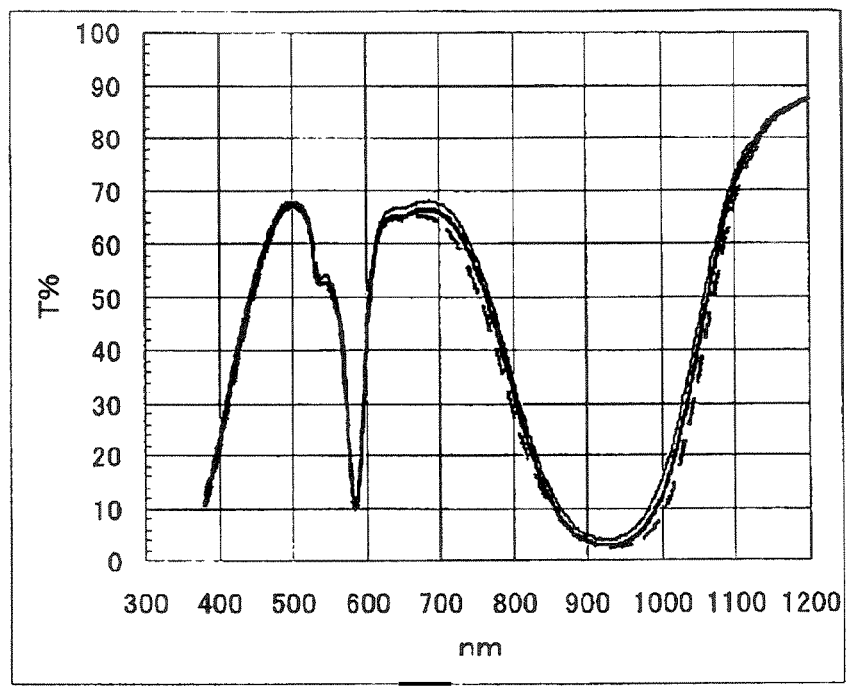
FIG. 24 is the measurement result of spectral transmission spectrum before and after evaluation 4 (heat resistance test) in Example 28.
Figure 25:
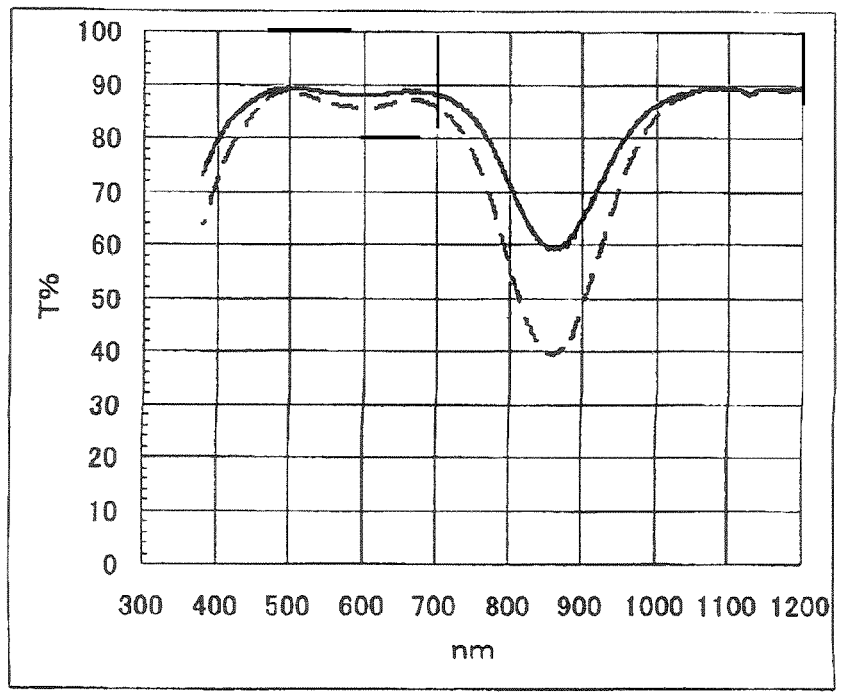
FIG. 25 is the measurement result of spectral transmission spectrum before and after evaluation 2 (light resistance test) in Comparative Example 1.
Figure 26:
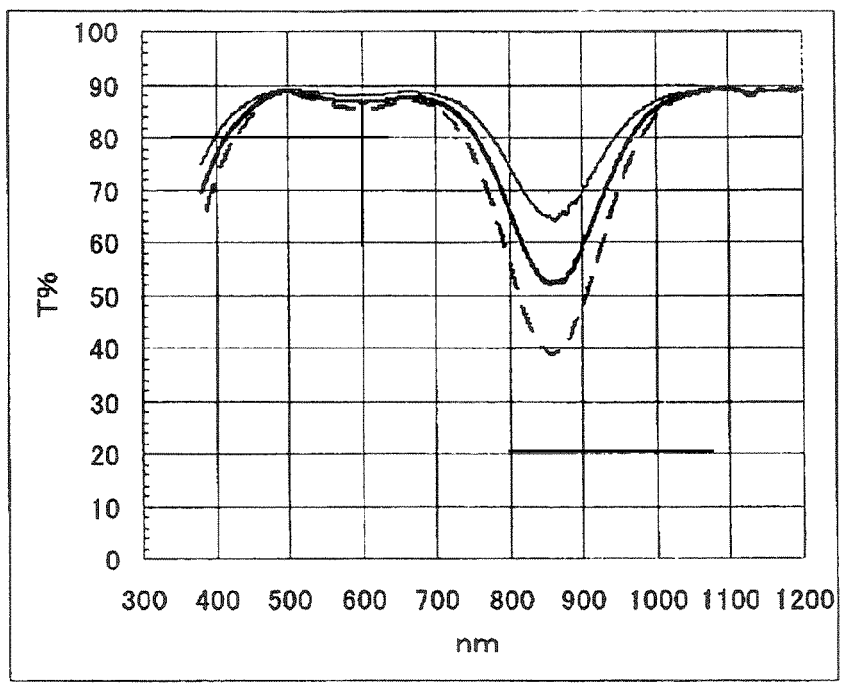
FIG. 26 is the measurement result of spectral transmission spectrum before and after evaluation 3 (heat and humidity resistance test) in Comparative Example 1.
Figure 27:
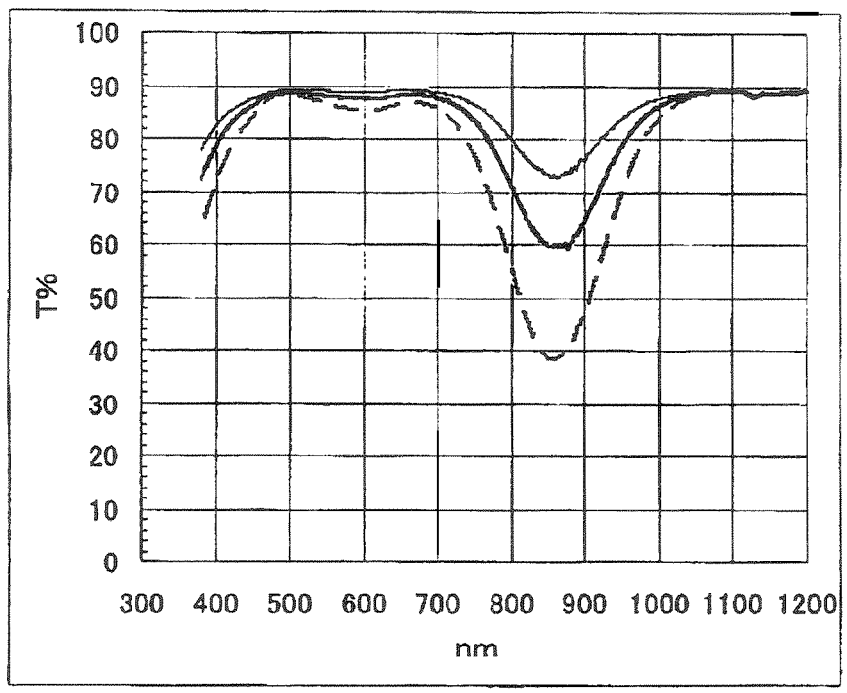
FIG. 27 is the measurement result of spectral transmission spectrum before and after evaluation 4 (heat resistance test) in Comparative Example 1.
Figure 28:
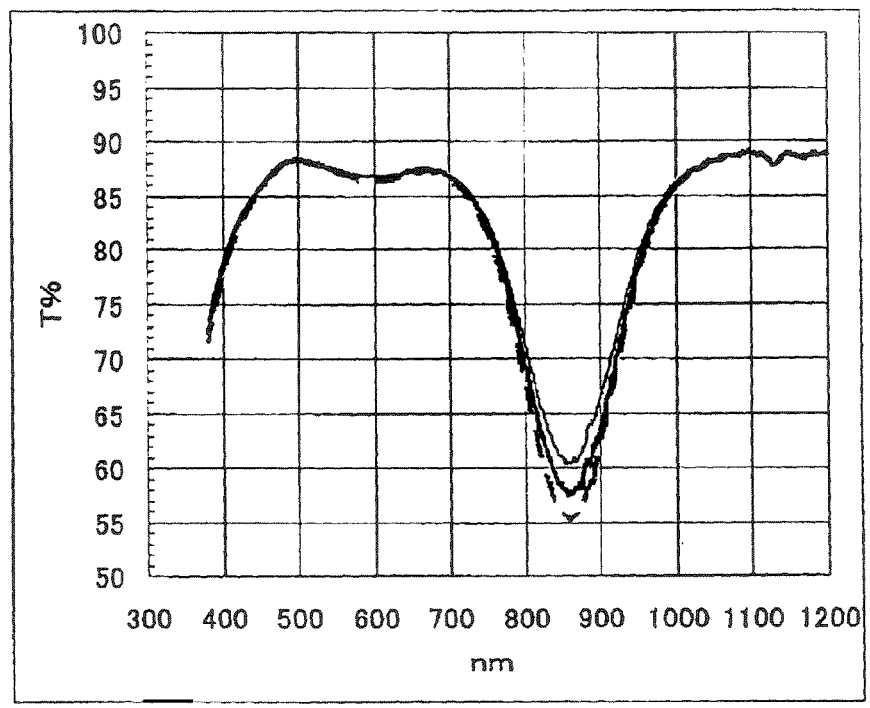
FIG. 28 is the measurement result of spectral transmission spectrum before and after evaluation 1 in Comparative Example 2.
Figure 29:
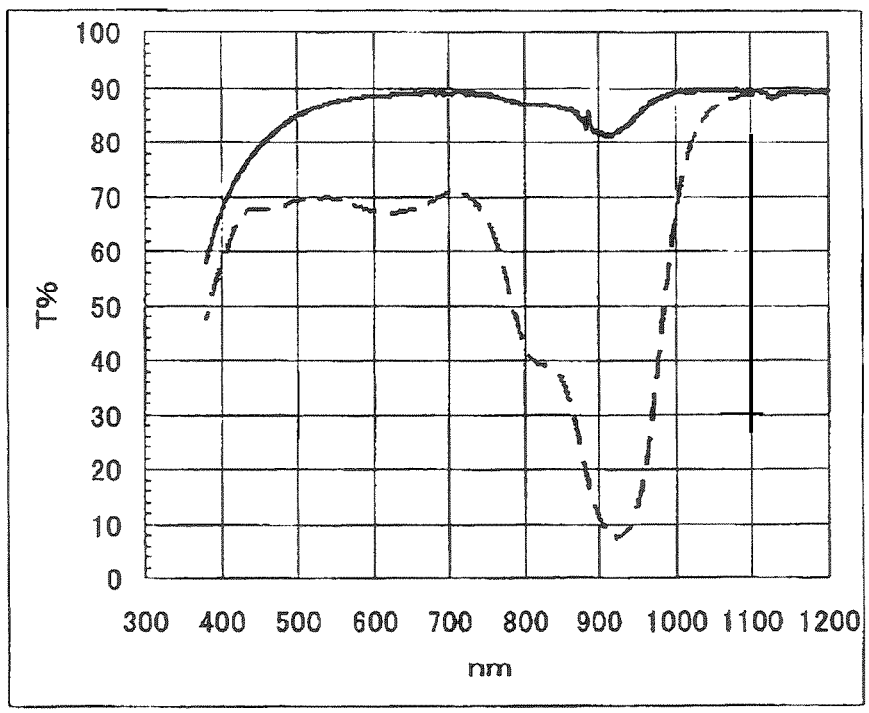
FIG. 29 is the measurement result of spectral transmission spectrum before and after evaluation 2 (light resistance test) in Comparative Example 3.
Figure 30:
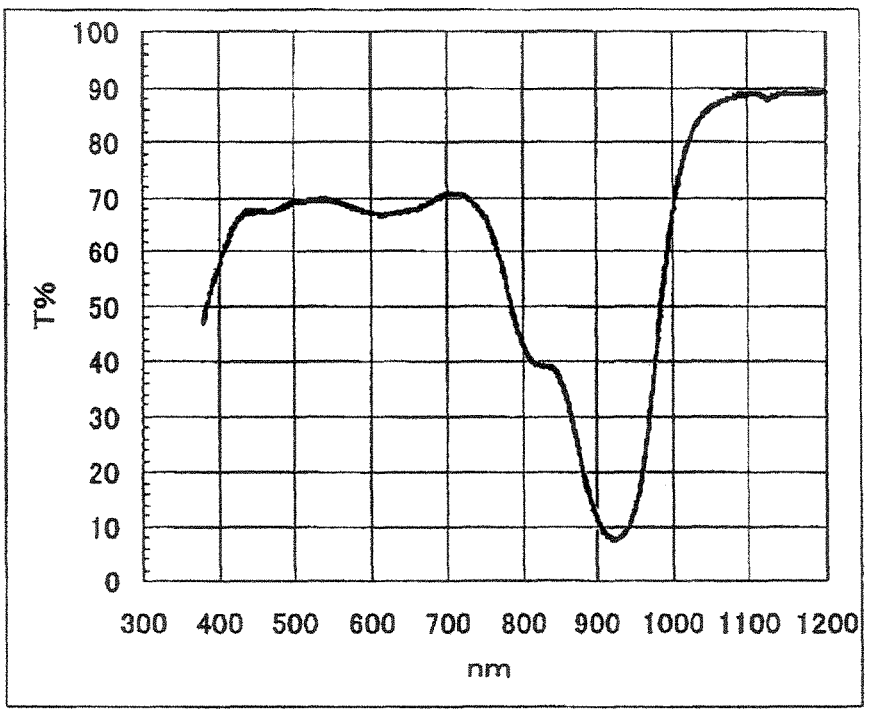
FIG. 30 is the measurement result of spectral transmission spectrum before and after evaluation 3 (heat and humidity resistance test) in Comparative Example 3.
Figure 31:
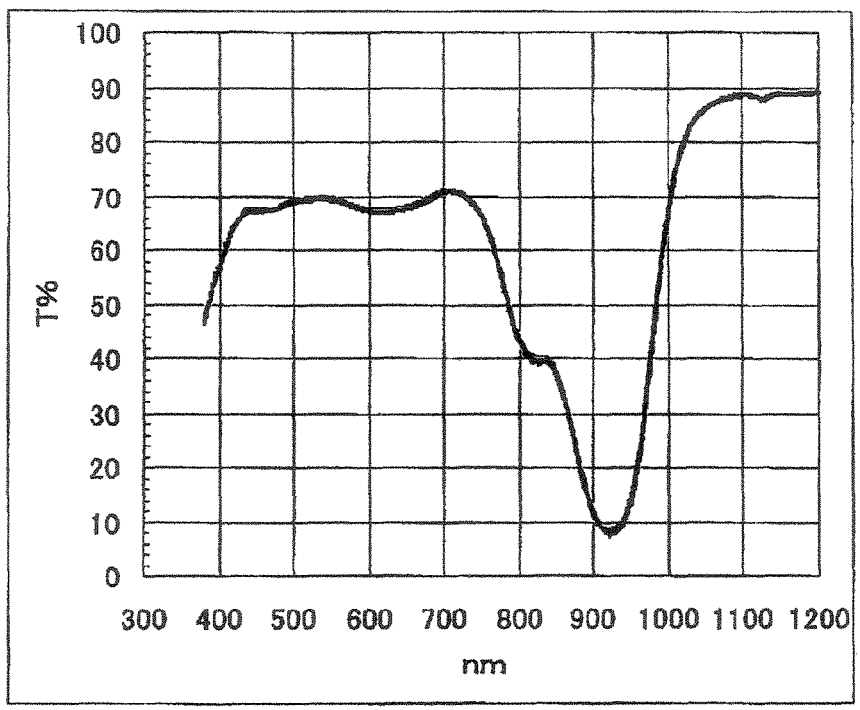
FIG. 31 is the measurement result of spectral transmission spectrum before and after evaluation 4 (heat resistance test) in Comparative Example 3.
Figure 32:
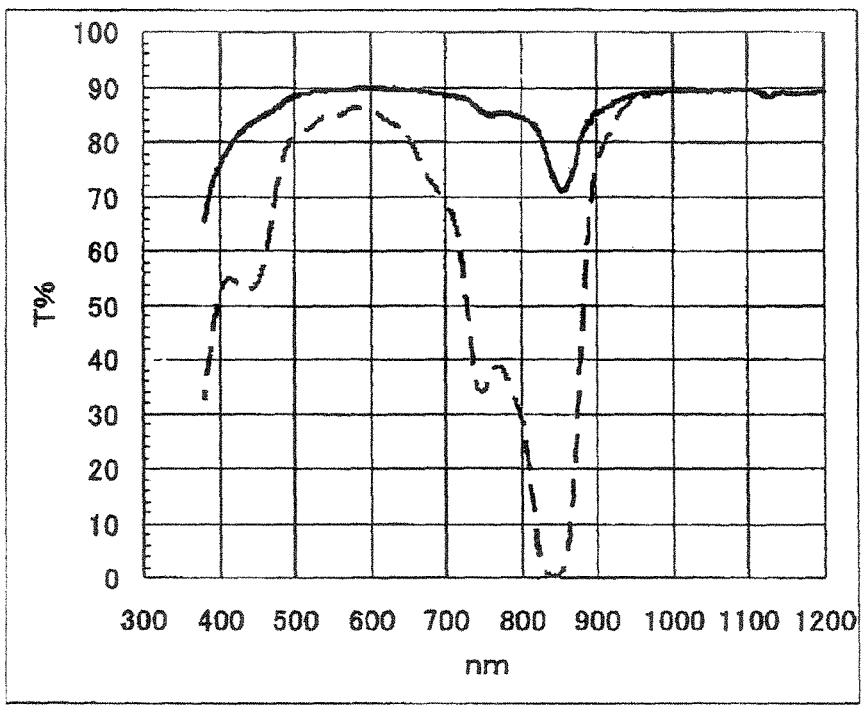
FIG. 32 is the measurement result of spectral transmission spectrum before and after evaluation 2 (light resistance test) in Comparative Example 6.
Figure 33:
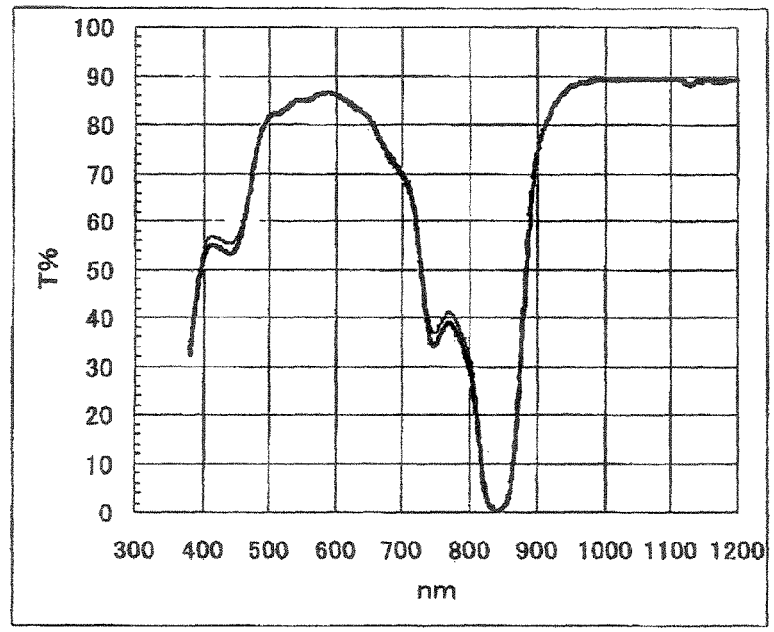
FIG. 33 is the measurement result of spectral transmission spectrum before and after evaluation 3 (heat and humidity resistance test) in Comparative Example 6.
Figure 34:
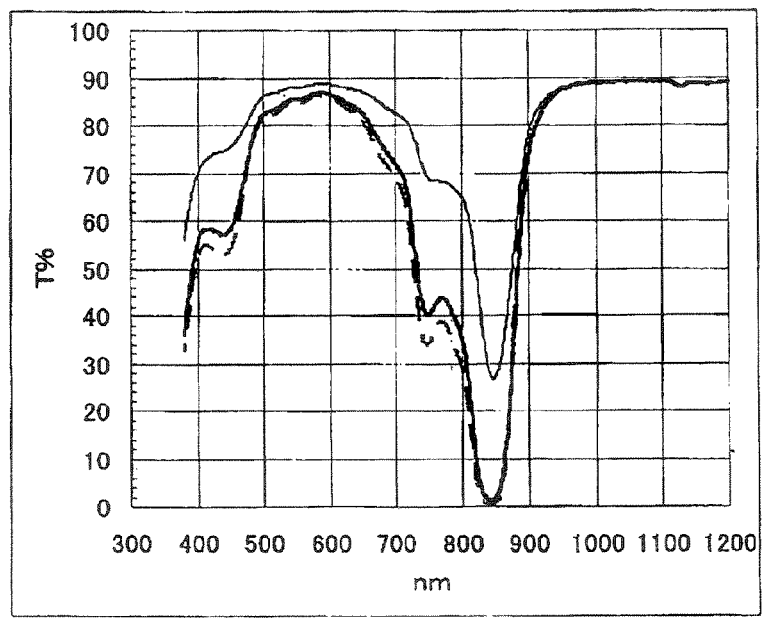
FIG. 34 is the measurement result of spectral transmission spectrum before and after evaluation 4 (heat resistance test) in Comparative Example 6.
Figure 35:
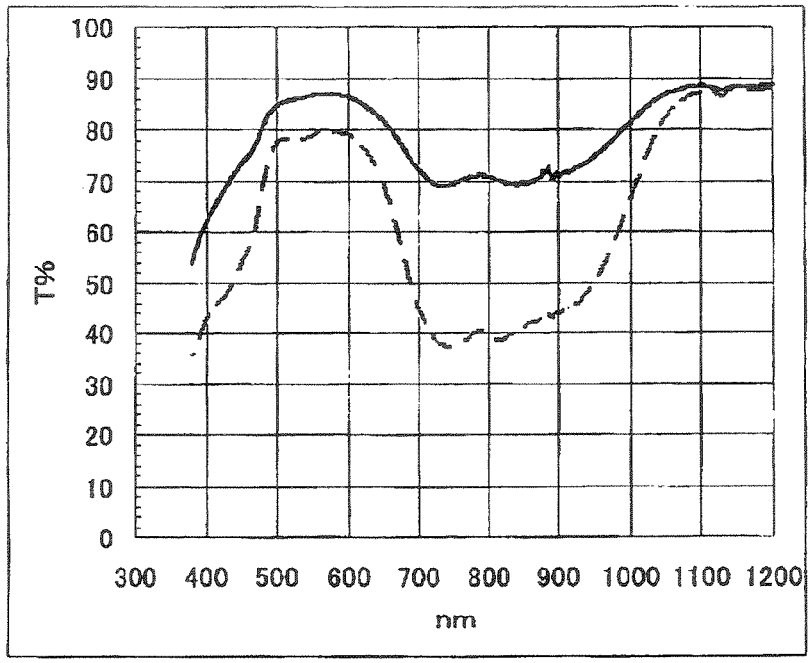
FIG. 35 is the measurement result of spectral transmission spectrum before and after evaluation 2 (light resistance test) in Comparative Example 8.
Figure 36:
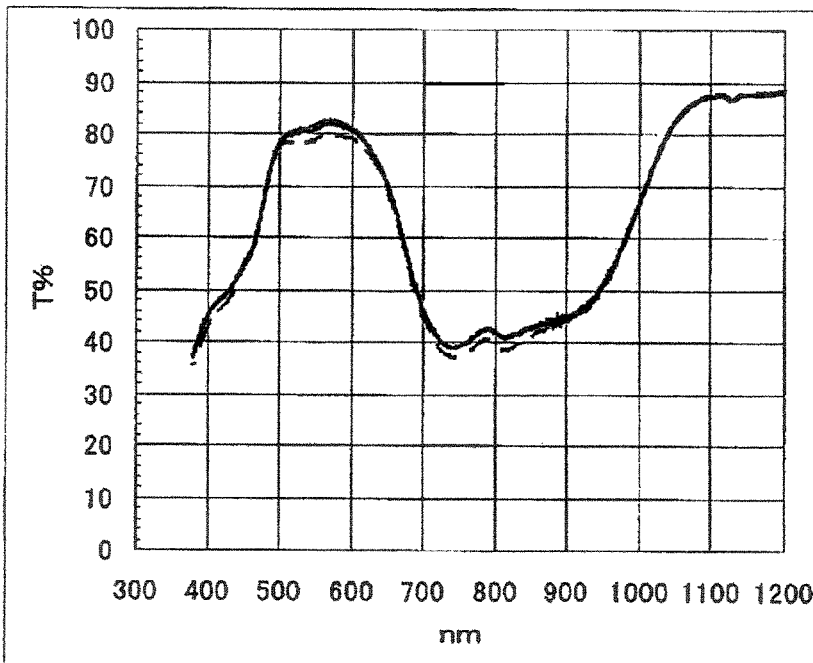
FIG. 36 is the measurement result of spectral transmission spectrum before and after evaluation 3 (heat and humidity resistance test) in Comparative Example 8.
Figure 37:
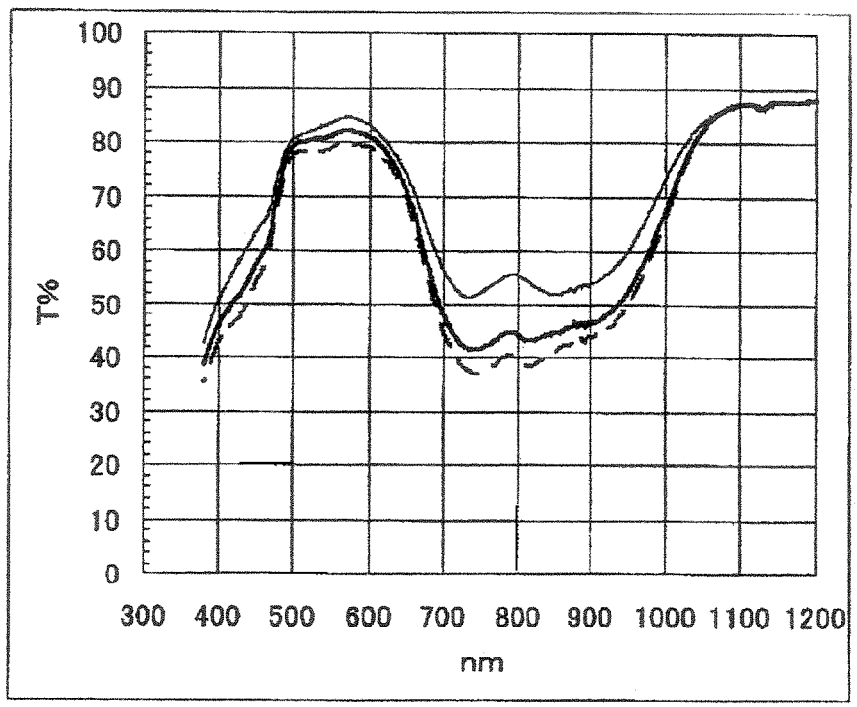
FIG. 37 is the measurement result of spectral transmission spectrum before and after evaluation 4 (heat resistance test) in Comparative Example 8.
Figure 38:
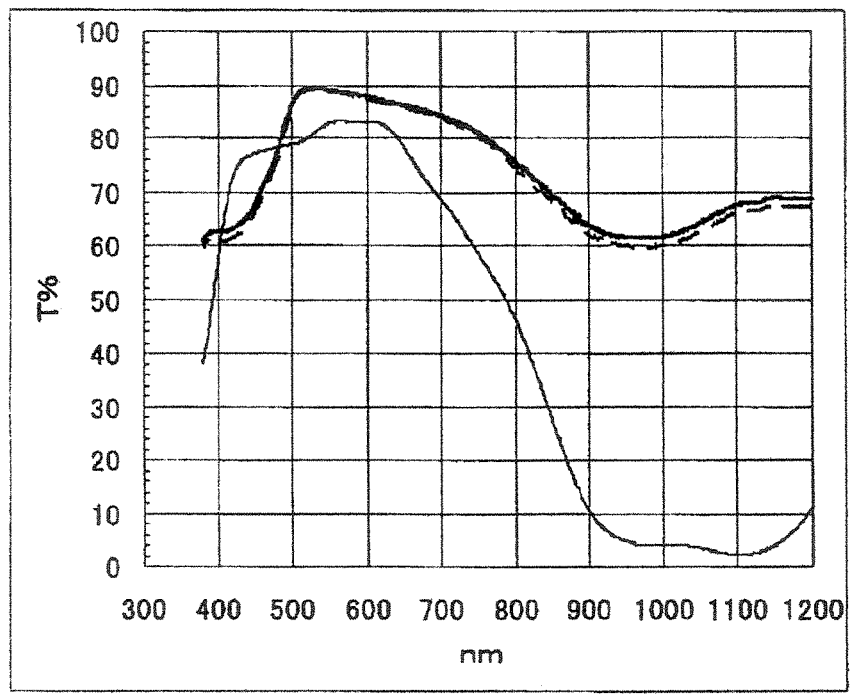
FIG. 38 is the measurement result of spectral transmission spectrum before and after evaluation 1 in Comparative Example 11.
Figure 39:
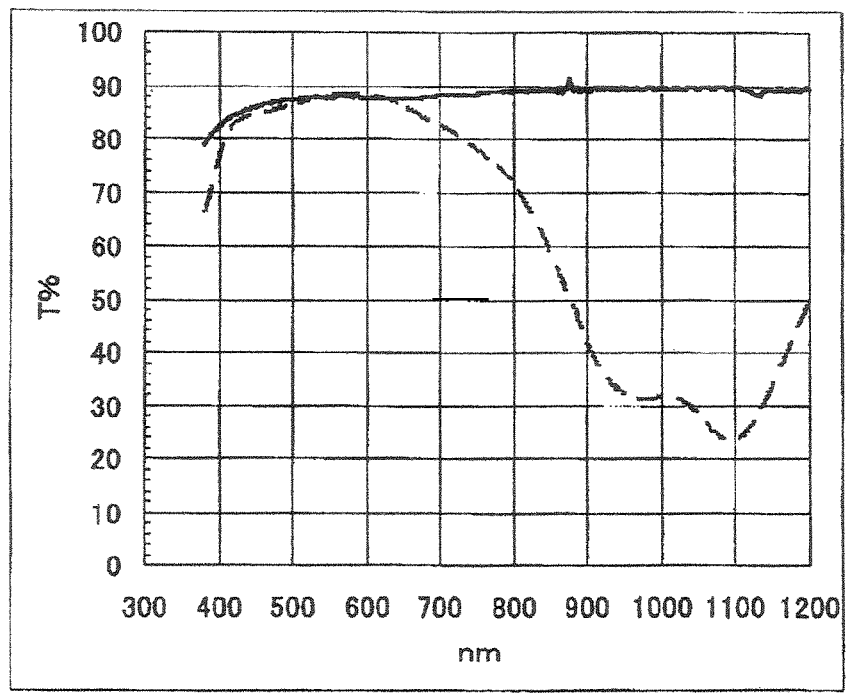
FIG. 39 is the measurement result of spectral transmission spectrum before and after evaluation 2 (light resistance test) in Comparative Example 12.
Figure 40:
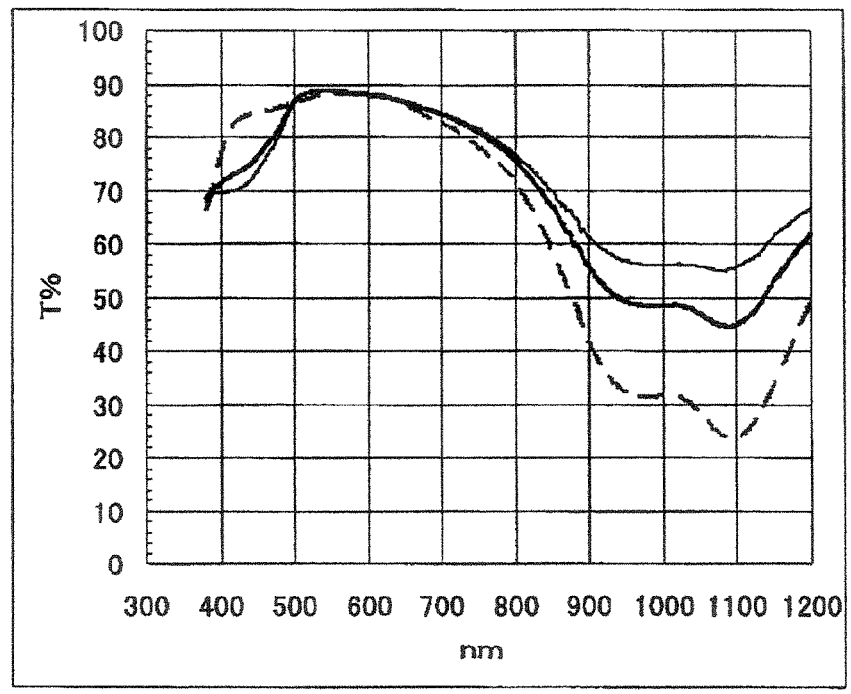
FIG. 40 is the measurement result of spectral transmission spectrum before and after evaluation 3 (heat and humidity resistance test) in Comparative Example 12.
Figure 41:
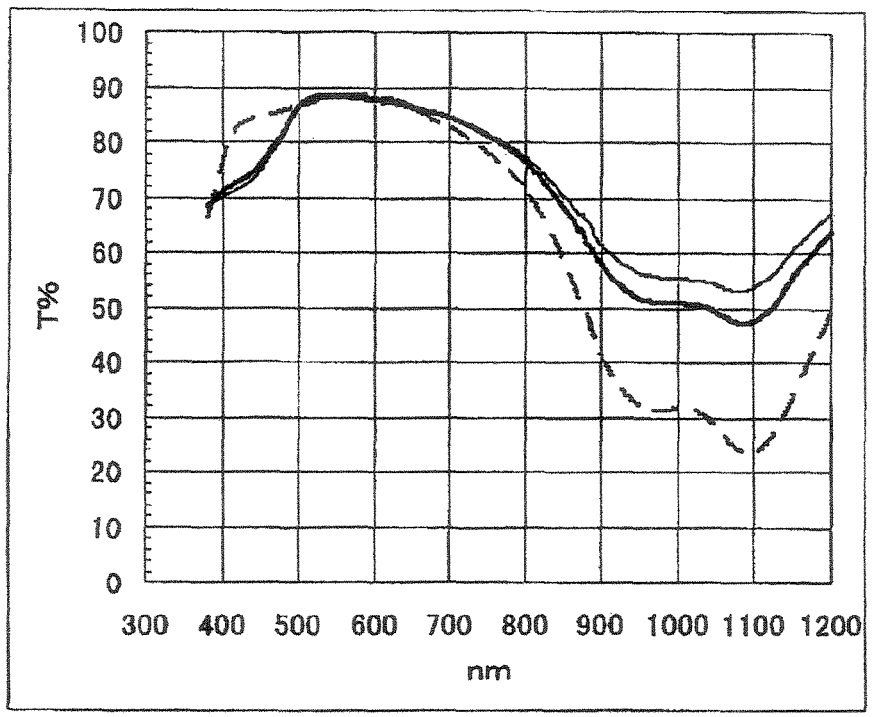
FIG. 41 is the measurement result of spectral transmission spectrum before and after evaluation 4 (heat resistance test) in Comparative Example 12.
Figure 42:
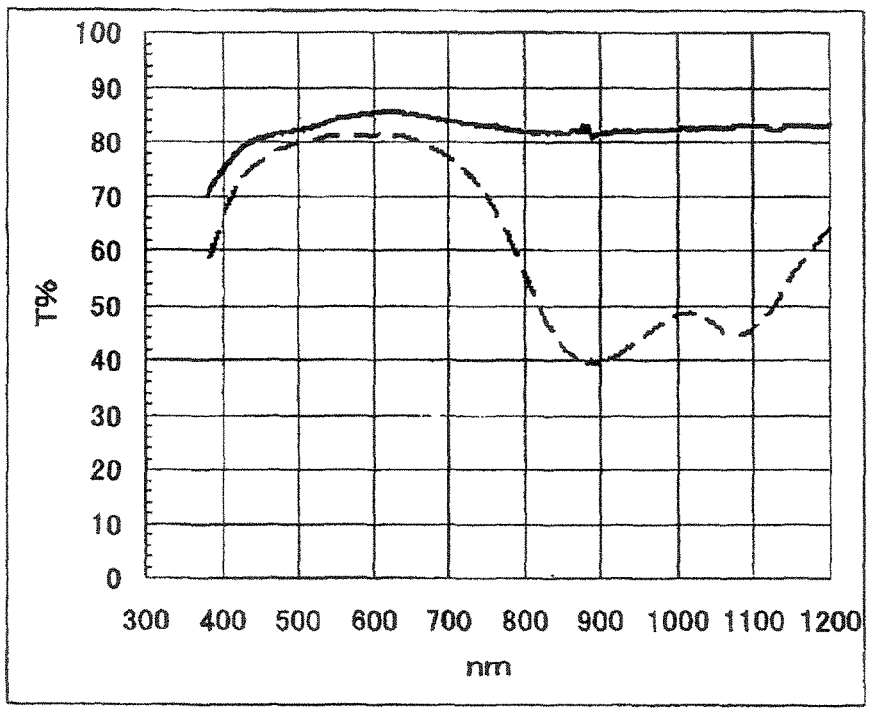
FIG. 42 is the measurement result of spectral transmission spectrum before and after evaluation 2 (light resistance test) in Comparative Example 13.
Figure 43:
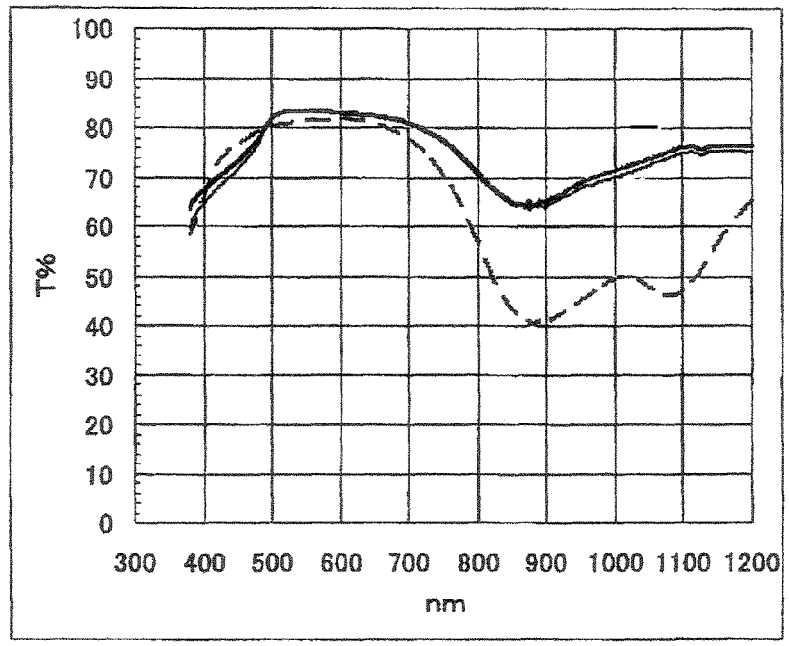
FIG. 43 is the measurement result of spectral transmission spectrum before and after evaluation 3 (heat and humidity resistance test) in Comparative Example 13.
Figure 44:
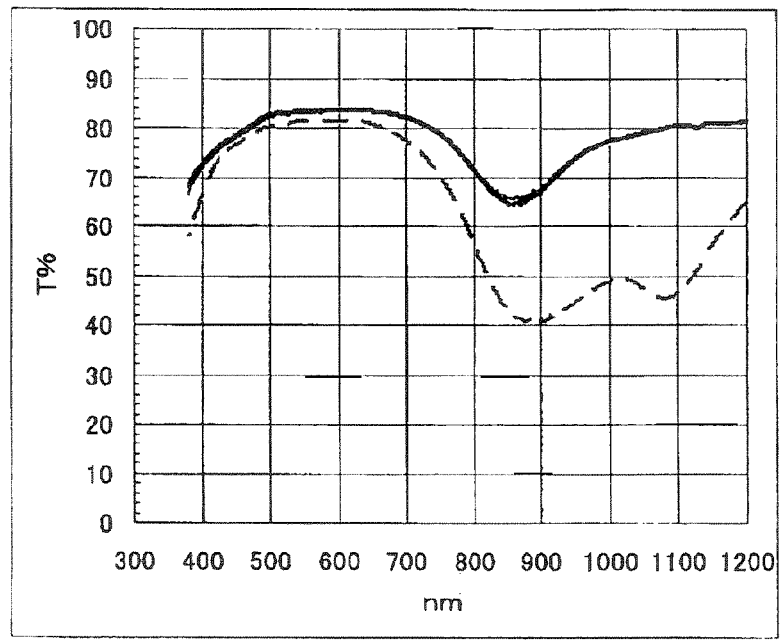
FIG. 44 is the measurement result of spectral transmission spectrum before and after evaluation 4 (heat resistance test) in Comparative Example 13.

Best mode for enforcing the invention is illustrated below, but the embodiment of the invention is not limited to modes below.

A. Physical Property of Pressure-sensitive Adhesive

A-1. Tackiness Performance

The pressure-sensitive adhesive of the invention is a pressure-sensitive adhesive by which a layer including the pressure-sensitive adhesive with a thickness of 25±5 µm is provided on a polyester film, the film is pasted on a stainless plate after ripening at 23° C. for 7 days, and adhesion strength by a 180 degree peeling method (a drawing speed of 300 mm/min and a unit of g/25 mm width) is 0.1 g/25 mm width or more under the atmospheric condition of a temperature of 23° C. and a humidity of 65%. It is preferably 1.0 g/25 mm width or more, more preferably 5.0 g/25 mm width or more, further preferably 10 g/25 mm width or more and most preferably 50 g/25 mm width or more. Further, it is usually 10000 g/25 mm width or less, preferably 8000 g/25 mm width or less and more preferably 5000 g/25 mm width or more.

In particular, in an adhesive layer that can be peeled again, it is preferably 1.0 g/25 mm width or more, more preferably 5.0 g/25 mm width or more and further preferably 10 g/25 mm width or more. In an adhesive layer that is not required to be peeled again, it is preferably 10 g/25 mm width or more, more preferably 50 g/25 mm width or more and further preferably 100 g/25 mm width or more.

A-2. Durability of Near Infrared Rays Absorption Power

The pressure-sensitive adhesive of the invention can be preferably used as a portion of an optical material requiring near infrared rays absorbing power, and deterioration by various lights (luminescent light, irradiation light and environmental light) is little. Specifically, it exhibits light resistance below.

<Light Resistance>

The pressure-sensitive adhesive of the invention is a pressure-sensitive adhesive containing a near infrared absorbing dye. When it is made as a layer with a thickness of 25±5 µm, absorption intensity at the maximum absorption wavelength of the near infrared absorbing dye after light resistance test is 50% or more for absorption intensity before the test in the light resistance test in which light with an irradiance of 64.5 W/m² at a wavelength of 300 to 400 nm is irradiated for the layer for 160 hours.

Light used for the light resistance test is light with an irradiance of 64.5 W/m² at a wavelength of 300 to 400 nm. Preferably used is light cutting UV light for xenon light with an irradiance of 0.55 W/m² at a wavelength of 340 nm, 1.38 W/m² at a wavelength of 420 nm, 64.5 W/m² at a wavelength of 300 to 400 nm and 605.4 W/m² at a wavelength of 300 to 800 nm that is the index of performance physical property of light resistance.

The light resistance is evaluated by comparing absorption intensity at the maximum absorption wavelength of the near infrared absorbing dye before and after the test. It is necessary for practical use that proportion calculated by "absorption intensity after irradiation÷absorption intensity before irradiation×100" is 50% or more at the maximum absorption wavelength. It is preferably 60% or more, more preferably 70% or more and further preferably 80% or more.

The near infrared absorbing dye exhibits occasionally the maximum absorption in addition to so-called near infrared rays range, but the change of absorption intensity at the maximum absorption wavelength within a range of 800 to 1050 nm being the near infrared rays range is measured in order to evaluate the light resistance.

A pressure-sensitive adhesive having high heat resistance and heat and humidity resistance is preferable among pressure-sensitive adhesives satisfying the above-mentioned light resistance.

<Heat Resistance>

The pressure-sensitive adhesive of the invention is preferably a pressure-sensitive adhesive in which the layer of the pressure-sensitive adhesive has a thickness of 25±5 μm and absorption intensity at the maximum absorption wavelength of the near infrared absorbing dye after light resistance test is preferably 50% or more, more preferably 60% or more, further preferably 70% or more and most preferably 80% or more for absorption intensity before the test in the heat resistance test in which the layer is exposed for 250 hours under environment at a temperature of 80° C.

The method of the heat resistance test is not specifically limited so far as it does not deviate from its purpose, but is usually carried out by using a constant temperature bath.

Among the above description, absorption intensity at the maximum absorption wavelength of the near infrared absorbing dye after heat resistance test is preferably 50% or more, more preferably 60% or more, further preferably 70% or more and most preferably 80% or more for absorption intensity before the test in the heat resistance test in which it is exposed for 500 hours under environment at a temperature of 80° C.

It is further preferable that absorption intensity at the maximum absorption wavelength of the near infrared absorbing dye after heat resistance test is preferably 50% or more, more preferably 60% or more, further preferably 70% or more and most preferably 80% or more for absorption intensity before the test in the heat resistance test in which it is exposed for 250 hours under environment at a temperature of 90° C.

The determination method of the maximum absorption wavelength of the near infrared absorbing dye in the heat resistance test is similar to that in the light resistance test.

<Heat and Humidity Resistance>

The pressure-sensitive adhesive of the invention is a pressure-sensitive adhesive in which the layer of the pressure-sensitive adhesive has a thickness of 25±5 μm and absorption intensity at the maximum absorption wavelength of the near infrared absorbing dye after light resistance test is preferably 50% or more, more preferably 60% or more, further preferably 70% or more and most preferably 80% or more for absorption intensity before the test, in the heat and humidity resistance test in which the layer is exposed for 250 hours at a temperature of 60° C. and a relative humidity of 90%.

The method of the heat and humidity resistance test is not specifically limited so far as it does not deviate from its purpose, but is usually carried out using a constant temperature and constant temperature and humidity bath.

Absorption intensity at the maximum absorption wavelength of the near infrared absorbing dye after heat resistance test is preferably 50% or more, more preferably 60% or more, further preferably 70% or more and most preferably 80% or more for absorption intensity before the test in the heat and humidity resistance test in which it is exposed for 500 hours at a temperature of 60° C. and a relative humidity of 90%.

B. Near Infrared Absorbing Dye and Adhesive Resin

The pressure-sensitive adhesive containing a near infrared absorbing dye of the invention comprises a near infrared absorbing dye and an adhesive resin and has one of characteristics in using a near infrared absorbing dye having a specific structure. The content of the near infrared absorbing dye is those containing 10 ppm to 50% by weight of one or more of a near infrared absorbing dye based on the solid content of a adhesive resin. It is more preferable that an adhesive resin corresponding to the near infrared absorbing dye is combined.

B-1. Near Infrared Absorbing Dye

The near infrared absorbing dye of the invention has maximum absorption at 800 nm to 1050 nm.

As the near infrared absorbing dye attaining the fore-mentioned durability parameter, compounds represented by the under-mentioned general formulae (1) to (8) are mentioned and among these, compounds represented by the under-mentioned general formulae (1) to (4) are preferably mentioned.

[1] Compounds Represented by the General Formulae (1) to (4)

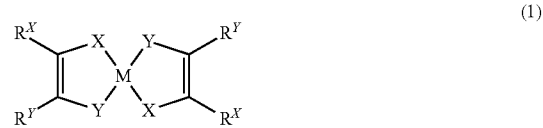

M is not specifically limited so far as it is a metal atom assuming the mode of 4 coordinations. Preferably, Ni, Pd or Pt of Group X metal atoms and Co, Fe, Cu, Ag, Au and Zn are mentioned. Metal atom of Group X is preferable and Ni or Pd is preferable in particular.

Each of X and Y represents independently a sulfur atom, an oxygen atom or a nitrogen atom having a substituent.

(1) It is a Case that X is Nitrogen Atom Having Substituent

The substituent of a nitrogen atom is a group represented by the under-mentioned general formula (A).

The compound represented by the general formula (1) has two Rs as a whole compound, but R may be mutually bonded through a bonding group Further, (A) may optionally form a condensed ring.

In the general formula (A), R' represents an arbitrary substituent and R' may be mutually bonded to form a condensed ring. When it is a single ring, n' is 0 to 4 and when it is a condensed ring, n' is 0 to 10.

R indicates a monovalent substituent having 3 or more in total of at least one atom selected from a carbon atom, an oxygen atom, a sulfur atom, a nitrogen atom and a silicon atom.

As the monovalent substituent having 3 or more in total of at least one atom selected from a carbon atom, an oxygen atom, a sulfur atom, a nitrogen atom and a silicon atom, there are mentioned a hydrocarbon group which may be optionally substituted, a carbonyl group which may be optionally substituted, a hydrocarbon thio group which may be optionally substituted, a silyl group which may be optionally substituted, a hydrocarbon amino group which may be optionally substituted and a hydrocarbon oxy group which may be optionally substituted.

(a) Hydrocarbon Group

As the hydrocarbon group, an aliphatic hydrocarbon group and an aryl group are mentioned.

The aliphatic hydrocarbon group includes linear chain, branched chain or cyclic alkyl groups such as an n-butyl group a 2-methylbutyl group, a 3-methylbutyl group, a cyclohexylmethyl group, a neopentyl group, 2-ethylbutyl group, 2-butyl group, a cyclohexyl group and a 3-pentyl group; alkenyl groups such as a 2-butenyl group, a 3-butenyl group and a 2,4-pentadienyl group; and alkynyl groups such as a 2-hexyne group. Among these, an aliphatic hydrocarbon group having 4 to about 12 carbon atoms is preferable and in particular, a branched chain aliphatic hydrocarbon group having 4 to about 12 carbon atoms is preferable.

The aryl group includes a phenyl group, a naphthyl group, an anthranyl group, a fluorenyl group, a phenanthrenyl group, an azulenyl group, a metallocene ring group and the like. Among these, a monocyclic or condensed bicyclic aryl group having 6 to about 12 carbon atoms is preferable.

(b) Heterocyclic Group

There are mentioned a thienyl group, a furyl group, a pyrolyl group, a pyridyl group, an imidazolyl group, a pyrazolyl group, an indolyl group, a quinoxalinyl group, an acrydinyl group, a thiazolyl group, a pyrazinyl group and the like. Among these, a monocyclic or bicyclic 5-membered heterocyclic group having 3 to about 12 carbon atoms is preferable.

(c) Carbonyl Group

There are mentioned an acyl group (—COR), a carbamoyl group (—CONRR'), an alkoxycarbonyl group (—C(O)OR), an aryloxycarbonyl group and a heterocyclic oxycarbonyl group. Specifically, as R of an acyl group (—COR), an n-propyl group, a 2-propenyl group and the like are mentioned in addition to those similar to the specific example of the fore-mentioned aliphatic hydrocarbon group, aryl group and heterocyclic group. Further, as R and R' of the carbamoyl group (—CONRR'), an ethyl group, an n-propyl group, a 2-propenyl group, an ethynyl group and the like are mentioned in addition to those similar to the specific example of the fore-mentioned aliphatic hydrocarbon group, aryl group and heterocyclic group. As R of the alkoxycarbonyl group (—C(O)OR), an ethyl group, an n-propyl group, a 2-propenyl group, an ethynyl group and the like are mentioned in addition to those similar to the specific example of the fore-mentioned aliphatic hydrocarbon group. Further, as R of the aryloxycarbonyl group (—C(O)OR), those similar to the specific example of the fore-mentioned aryl group are mentioned and as R of the heterocyclic oxycarbonyl group (—C(O)OR), those similar to the specific example of the fore-mentioned heterocyclic group are mentioned.

(d) Hydrocarbon Thio Group

As R of the hydrocarbon thio group (—SR), an n-propyl group, a 2-propenyl group, an ethynyl group and the like are mentioned in addition to those similar to the specific example of the fore-mentioned hydrocarbon group, aryl group and heterocyclic group.

(e) Silyl Group

As the Silyl group, silyl groups such as a t-butyldiphenylsilyl group, an n-butyldimethylsilyl group, a dimethylpropylsilyl group, a dimethylphenylsilyl group, a dimethylisopropylsilyl group and a triisopropylsilyl group are mentioned. An alkylsilyl group having 3 to about 18 carbon atoms is preferable.

(f) Hydrocarbon Amino Group

As R and R' of the hydrocarbon amino group (—NRR'), an n-propyl group, a 2-propenyl group, an ethynyl group and the like are mentioned in addition to those similar to the specific example of the fore-mentioned hydrocarbon group, aryl group and heterocyclic group.

(g) Hydrocarbon Oxy Group

As R of the hydrocarbon oxy group (—OR), an n-propyl group, a 2-propenyl group, an ethynyl group and the like are mentioned in addition to those similar to the specific example of the fore-mentioned hydrocarbon group, aryl group and heterocyclic group.

When the above groups (a) to (g) have a substituent, the kind of the substituent is not specifically limited so far as it does not affect the stability of the dye and dispersion/solubility to an adhesive resin.

For example, there is mentioned a group selected from a group including a halogen atom, a hydroxyl group, a nitro group, a cyano group, an alkyl group, an alkenyl group, an alkynyl group, an aryl group, a heteroaryl group, an alkoxy group, an aryloxy group, a heteroaryloxy group, an alkylthio group, an arylthio group, a heteroarylthio group, an amino group, an acyl group, an aminoacyl group, an ureide group, a sulfoneamide group, a carbamoyl group, a sulfamoyl group, a sulfamoylamino group, an alkoxycarbonyl group, an aryloxycarbonyl group, a heteroaryloxycarbonyl group, an alkylsulfonyl group, an arylsulfonyl group, a heteroarylsulfonyl group, an imide group and a silyl group, and the like.

Specifically, there are mentioned alkyl groups having 1 to about 6 carbon atoms such as a methyl group and an ethyl group; alkenyl groups having 1 to about 6 carbon atoms such as an ethynyl group and a propylenyl group; alkynyl groups having 1 to about 6 carbon atoms such as an acetylenyl group; aryl groups having 6 to about 20 carbon atoms such as a phenyl group and a naphthyl group; heteroaryl groups having 3 to about 20 carbon atoms such as a thienyl group, a furyl group and a pyridyl group; alkoxy groups having 1 to about 6 carbon atoms such as an ethoxy group and a propoxy group; aryloxy groups having 6 to about 20 carbon atoms such as a phenoxy group and a naphthoxy group; heteroaryloxy groups having 3 to about 20 carbon atoms such as a pyridyloxy group and a thienyloxy group; alkylthio groups having 1 to about 6 carbon atoms such as a methylthio group and an ethylthio group; arylthio groups having 6 to about 20 carbon atoms such as a phenylthio group and a naphthylthio group; heteroarylthio groups having 3 to about 20 carbon atoms such as a pyridylthio group and a thienylthio group; amino groups having 1 to about 20 carbon atoms that may optionally have a substituent such as a dimethylamino group and a diphenylamino group; acyl groups having 2 to about 20 carbon atoms such as an acetyl group and a pivaloyl group; acylamino groups having 2 to about 20 carbon atoms such as an acetylamino group and a propionylamino group; ureide groups having 2 to about 20 carbon atoms such as a 3-methylureide group; sulfoneamide groups having 1 to about 20 carbon atoms such as a methanesulfoneamide group and a benzenesulfoneamide group; carbamoyl groups having 1 to about 20 carbon atoms such as a dimethylcarbamoyl group and an ethylcarbamoyl group; sulfamoyl groups having 1 to about 20 carbon atoms such as an ethylsulfamoyl group; sulfamoylamino groups having 1 to about 20 carbon atoms such as a dimethylsulfamoylamino group; alkoxycarbonyl groups having 2 to about 6 carbon atoms such as a methoxycarbonyl group and an ethoxycarbonyl group; aryloxycarbonyl groups having 7 to about 20 carbon atoms such as a phenoxycarbonyl group and a naphthoxycarbonyl group; heteroaryloxycarbonyl groups having 6 to about 20 carbon atoms such as a pyridyloxycarbonyl group; alkylsulfonyl groups having 1 to about 6 carbon atoms such as a methanesulfonyl group, an ethane sulfonyl group and a trifluoromethanesulfonyl group; arylsulfonyl groups having 6 to about 20 carbon atoms such as a benzenesulfonyl group and a monofluorobenzenesulfonyl group; heteroarylsulfonyl groups having 3 to about 20 carbon atoms such as a thienylsulfonyl group; imide groups having 4 to about 20 carbon atoms such as phthalimide; a silyl group that is substituted with 3 substituents selected from a group including an alkyl group and an aryl group.

An alkyl group, an alkoxy group, an alkylthio group, an amino group having a substituent, a fluorine atom and a chlorine atom are preferable.

R' is not specifically limited so far as it does not affect the stability of the dye and dispersion/solubility to a adhesive resin and is an arbitrary monovalent substituent.

For example, there is mentioned a group selected from a group including a halogen atom, a hydroxyl group, a nitro group, a cyano group, an alkyl group, an alkenyl group, an alkynyl group, an aryl group, a heteroaryl group, an alkoxy group, an aryloxy group, a heteroaryloxy group, an alkylthio group, an arylthio group, a heteroarylthio group, an amino group, an acyl group, an aminoacyl group, an ureide group, a sulfoneamide group, a carbamoyl group, a sulfamoyl group, a sulfamoylamino group, an alkoxycarbonyl group, an aryloxycarbonyl group, a heteroaryloxycarbonyl group, an alkylsulfonyl group, an arylsulfonyl group, a heteroarylsulfonyl group, an imide group and a silyl group, and the like.

Specifically, there are mentioned alkyl groups having 1 to about 6 carbon atoms such as a methyl group and an ethyl group; alkenyl groups having 1 to about 6 carbon atoms such as an ethynyl group and a propylenyl group; alkynyl groups having 1 to about 6 carbon atoms such as an acetylenyl group; aryl groups having 6 to about 20 carbon atoms such as a phenyl group and a naphthyl group; heteroaryl groups having 3 to about 20 carbon atoms such as a thienyl group, a furyl group and a pyridyl group; alkoxy groups having 1 to about 6 carbon atoms such as an ethoxy group and a propoxy group; aryloxy groups having 6 to about 20 carbon atoms such as a phenoxy group and a naphthoxy group; heteroaryloxy groups having 3 to about 20 carbon atoms such as a pyridyloxy group and a thienyloxy group; alkylthio groups having 1 to about 6 carbon atoms such as a methylthio group and an ethylthio group; arylthio groups having 6 to about 20 carbon atoms such as a phenylthio group and a naphthylthio group; heteroarylthio groups having 3 to about 20 carbon atoms such as a pyridylthio group and a thienylthio group; amino groups having 1 to about 20 carbon atoms that may optionally have a substituent such as a dimethylamino group and a diphenylamino group; acyl groups having 2 to about 20 carbon atoms such as an acetyl group and a pivaloyl group; acylamino groups having 2 to about 20 carbon atoms such as an acetylamino group and a propionylamino group; ureide groups having 2 to about 20 carbon atoms such as a 3-methylureide group; sulfoneamide groups having 1 to about 20 carbon atoms such as a methanesulfoneamide group and a benzenesulfoneamide group; carbamoyl groups having 1 to about 20 carbon atoms such as a dimethylcarbamoyl group and an ethylcarbamoyl group; sulfamoyl groups having 1 to about 20 carbon atoms such as an ethylsulfamoyl group; sulfamoylamino groups having 1 to about 20 carbon atoms such as a dimethylsulfamoylamino group; alkoxycarbonyl groups having 2 to about 6 carbon atoms such as a methoxycarbonyl group and an ethoxycarbonyl group; aryloxycarbonyl groups having 7 to about 20 carbon atoms such as a phenoxycarbonyl group and a naphthoxycarbonyl group; heteroaryloxycarbonyl groups having 6 to about 20 carbon atoms such as a pyridyloxycarbonyl group; alkylsulfonyl groups having 1 to about 6 carbon atoms such as a methanesulfonyl group, an ethane sulfonyl group and a trifluoromethanesulfonyl group; arylsulfonyl groups having 6 to about 20 carbon atoms such as a benzenesulfonyl group and a monofluorobenzenesulfonyl group; heteroarylsulfonyl groups having 3 to about 20 carbon atoms such as a thienylsulfonyl group; imide groups having 4 to about 20 carbon atoms such as phthalimide; a silyl group that is substituted with 3 substituents selected from a group including an alkyl group and an aryl group.

An alkyl group, an alkoxy group, an alkylthio group, an amino group having a substituent, a fluorine atom and a chlorine atom are preferable.

Each of $R^X$ and $R^Y$ represents independently a monovalent substituent and $R^X$ and $R^Y$ may be bonded through a bonding group. There is preferably mentioned a hydrogen atom, a hydrocarbon group which may be optionally substituted, a carbonyl group which may be optionally substituted, a hydrocarbon thio group which may be optionally substituted, a silyl group which may be optionally substituted, a hydrocarbon amino group which may be optionally substituted, a hydrocarbon oxy group which may be optionally substituted, a hydrocarbon carbonyl group, a cyano group or a halogen atom. The specific examples of R' of the previous general formula (A) are applicable to these specific examples.

$R^X$ and $R^Y$ are more preferably bonded through a bonding group and specifically,

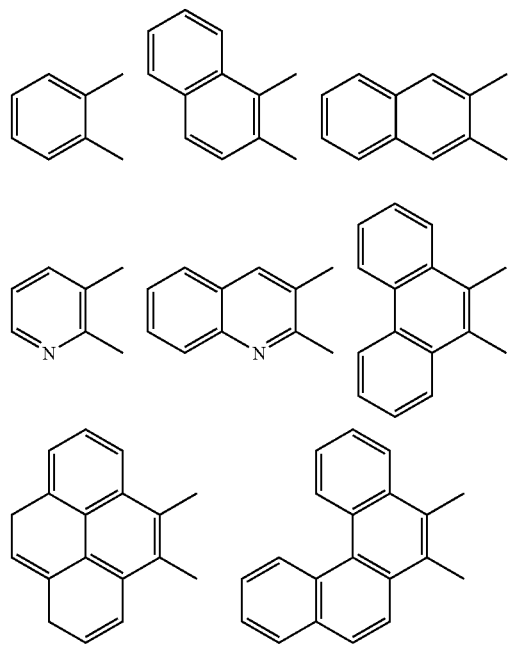

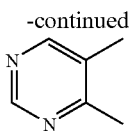

A structure including a single ring and a condensed ring such as above.

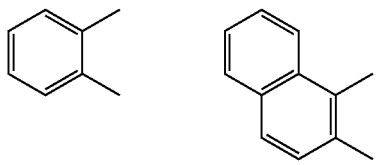

are more preferable.

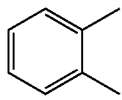

is preferable in particular.

These structures may optionally have a monovalent substituent. Specifically, it is similar to those described as a substituent that may be optionally substituted in (A). Among these, an alkyl group, an alkoxy group, an alkylthio group, a fluorine atom and a chlorine atom are preferable and a tertiary or secondary branched chain alkyl group is preferable in particular.

A structure in which $R^X$ and $R^Y$ are bonded through a bonding group and form the following

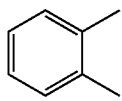

A structure in case of forming (a benzene ring) is represented by the formula (2) below.

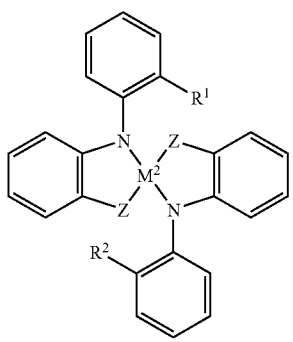

(2)

In the general formula (2), each of $R^1$ and $R^2$ is independently a monovalent group having 3 or more in total of at least one atom selected from a carbon atom, an oxygen atom, a nitrogen atom and a silicon atom. $R^1$ and $R^2$ may be bonded through a bonding group.

Z indicates an oxygen atom, a sulfur atom or a nitrogen atom which may optionally have a substituent.

The aromatic ring may optionally have a substituent and the substituent may be bonded with an adjacent group through a bonding group, or may further form a condensed ring.

$M^2$ represents a metal atom.

Hereat, the Z of the formula (2) is applicable to the Y of the formula (1) and the $M^2$ of the formula (2) is applicable to the M of the formula (1) Further, the $R^1$ and $R^2$ of the formula (2) are applicable to the R of the formula (A).

As a further preferable example, (1)-(i) to (iii) below are mentioned.

1-(i). It is a case that X is a nitrogen atom having a substituent, Y is an oxygen atom and $R^x$ and $R^y$ are bonded through a bonding group. In particular, in case of forming a benzene ring, a benzene ring formed by the coupling of $R^x$ and $R^y$ is desirably substituted with 2 or more of branched chain alkyl groups. The R of the above-mentioned formula (A) being the substituent of a nitrogen atom is particularly a linear and branched chain alkyl group that may optionally have a substituent having 3 to about 10 carbon atoms, or an alkoxy group that may optionally have a substituent having 2 to about 10 carbon atoms, or an alkylthio group or a substituted amino group. R may be mutually bonded through a bonding group.

1-(ii). It is a case that X is a nitrogen atom having a substituent, Y is a sulfur atom and $R^x$ and $R^y$ are bonded through a bonding group. In particular, in case of forming a benzene ring, the substituent of a benzene ring formed by the coupling of $R^x$ and $R^y$ is preferably an alkyl group, an alkoxy group, an alkylthio group, a cyano group, and a halogen atom. The R of the above-mentioned formula (A) being the substituent of a nitrogen atom is preferably a linear chain or branched chain alkyl group that may optionally have a substituent having 3 to about 10 carbon atoms, or an alkoxy group that may optionally have a substituent having 2 to about 10 carbon atoms, or an alkylthio group or a substituted amino group, in particular. R may be mutually bonded through a bonding group.

1-(iii). It is a case that X is a nitrogen atom having a substituent, Y is a nitrogen atom having hydrogen and $R^x$ and $R^y$ are bonded through a bonding group. In particular, in case of forming a benzene ring, the substituent of a benzene ring formed by the coupling of $R^x$ and $R^y$ is preferably an alkyl group, an alkoxy group, an alkylthio group, a cyano group, and a halogen atom. The R of the above-mentioned formula (A) being the substituent of a nitrogen atom is preferably a linear and branched chain alkyl group which may optionally have a substituent having 3 to about 10 carbon atoms, or an alkoxy group which may optionally have a substituent having 2 to about 10 carbon atoms, or an alkylthio group or a substituted amino group, in particular. R may be mutually bonded through a bonding group.

(2) It is a case that X is an oxygen atom or a sulfur atom $R^X$ is a compound represented by the under-mentioned general formula (A) However, (A) may form a condensed ring.

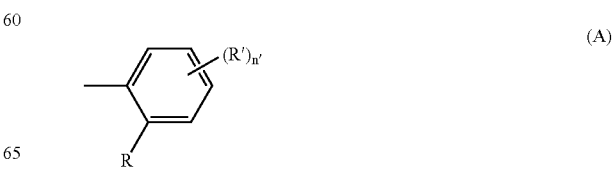

(A)

The compound represented by the general formula (1) has two Rs as a whole compound, but R may be mutually bonded through a bonding group.

In the general formula (A), R indicates a monovalent group having 4 or more in total of at least one atom selected from a carbon atom, an oxygen atom, a nitrogen atom and a silicon atom. As R, there are mentioned a hydrocarbon group which may be optionally substituted, a carbonyl group which may be optionally substituted, a hydrocarbon thio group which may be optionally substituted, a silyl group which may be optionally substituted, a hydrocarbon amino group which may be optionally substituted and a hydrocarbon oxy group which may be optionally substituted. Specifically, it is a group having 4 or more in total of at least one atom selected from a carbon atom, an oxygen atom, a nitrogen atom and a silicon atom, in the Rs of the general formula (A) of (1).

R' is an arbitrary substituent and R' may be mutually bonded to form a condensed ring. When it is a single ring, n' is 0 to 4 and when it is a condensed ring, n' is 0 to 10.

As R', the kind of the substituent is not specifically limited so far as it does not affect the stability of the dye and dispersion/solubility to an adhesive resin.

For example, there is mentioned a group selected from a group including a halogen atom, a hydroxyl group, a nitro group, a cyano group, an alkyl group, an alkenyl group, an alkynyl group, an aryl group, a heteroaryl group, an alkoxy group, an aryloxy group, a heteroaryloxy group, an alkylthio group, an arylthio group, a heteroarylthio group, an amino group, an acyl group, an aminoacyl group, an ureide group, a sulfoneamide group, a carbamoyl group, a sulfamoyl group, a sulfamoylamino group, an alkoxycarbonyl group, an aryloxycarbonyl group, a heteroaryloxycarbonyl group, an alkylsulfonyl group, an arylsulfonyl group, a heteroarylsulfonyl group, an imide group and a silyl group, and the like. Specifically, it is similar to the specific example of the R' of the general formula (A) of previous (1).

$R^Y$ represents a monovalent substituent. As the $R^Y$, there is mentioned a hydrogen atom, a hydrocarbon group which may be optionally substituted, a carbonyl group which may be optionally substituted, a hydrocarbon thio group which may be optionally substituted, a silyl group which may be optionally substituted, a hydrocarbon amino group which may be optionally substituted, a hydrocarbon oxy group which may be optionally substituted, a hydrocarbon carbonyl group, a cyano group or a halogen atom.

Specifically, it is similar to the specific examples of R' of the general formula (A) of previous (1).

Among the above description, a particularly preferable example is (2)-(i) and (ii) below.

(2)-(i). It is a case that X and Y are sulfur atoms and $R^X$ has (A).

At this time, the structure is represented by the formula (3) below.

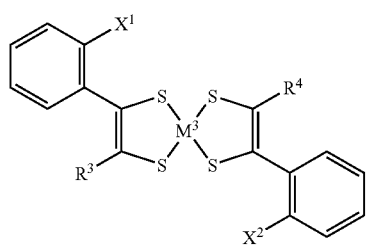

(3)

In the general formula (3), each of $R^3$ and $R^4$ represents independently a monovalent substituent.

Each of $X^1$ and $X^2$ is independently a monovalent group having 4 or more in total of at least one atom selected from a carbon atom, an oxygen atom, a nitrogen atom and a silicon atom. $X^1$ and $X^2$ may be bonded through a bonding group.

The aromatic ring may have an arbitrary substituent and adjacent groups may be bonded through a bonding group.

$M^3$ represents a metal atom.

Hereat, the $R^3$ and $R^4$ of the formula (3) are applicable to the $R^X$ of the formula (1) and the $M^3$ of the formula (3) is applicable to the M of the formula (1). The $X^1$ and $X^2$ of the formula (3) are applicable to the R of the fore-mentioned formula (A).

Further, among compounds represented by the formula (3), a compound shown in the formula (4) below is a novel compound and can be preferably used as the near infrared absorbing dye used for the near infrared absorbing pressure-sensitive adhesive by being mixed with a adhesive resin.

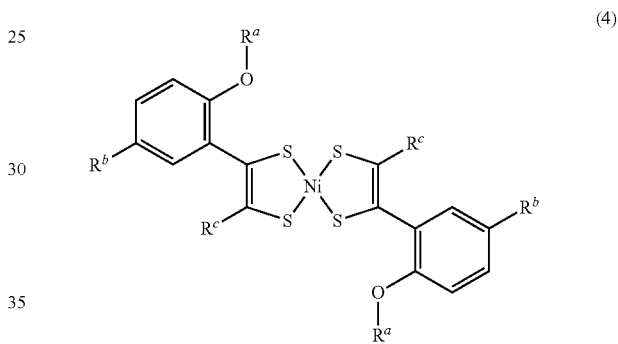

(4)

In the general formula (4), $R^a$ indicates a linear chain or branched chain alkyl group having 3 to 6 carbon atoms and $R^b$ indicates a linear chain or branched chain alkoxy group having 1 to 6 carbon atoms or a linear chain or branched chain alkyl group having 1 to 6 carbon atoms (however, $R^b$ is a same group as $OR^a$ in case of a branched alkoxy group)

$R^c$ indicates a hydrogen atom, or a linear chain or branched chain alkyl group having 1 to 5 carbon atoms, or a benzene ring which may optionally have a substituent including an alkyl group, an alkoxy group, a substituted amino group or a halogen atom, or a phenylthio group which may optionally have a substituent including an alkyl group, an alkoxy group, a substituted amino group or a halogen atom.

On the other hand, in the formula (1), the R of (A) is preferably a linear chain or branched chain alkyl group which may optionally have a substituent having 4 to about 10 carbon atoms, or an alkoxy group which may optionally have a substituent having 3 to about 10 carbon atoms, or an alkylthio group or a substituted amino group. R may be mutually bonded through a bonding group.

It is a case that $R^Y$ has a hydrogen atom, an aryl group which may optionally have a substituent, an alkyl group which may optionally have a substituent, an arylthio group which may optionally have a substituent, an alkylthio group which may optionally have a substituent. $R^X$ and $R^Y$ may be mutually bonded through a bonding group, but are not preferably bonded.

(2)-(ii). It is a case that X is a sulfur atom, Y is an oxygen atom and either of $R^X$ or $R^Y$ has (A)

The R of (A) is preferably a linear chain or branched chain alkyl group which may optionally have a substituent having 4 to about 10 carbon atoms, or an alkoxy group which may optionally have a substituent having 3 to about 10 carbon atoms, or an alkylthio group or a substituted amino group. R may be mutually bonded through a bonding group.

It is a case that $R^X$ or $R^Y$ not having (A) has a hydrogen atom, an aryl group which may optionally have a substituent, an alkyl group which may optionally have a substituent, an arylthio group which may optionally have a substituent, an alkylthio group which may optionally have a substituent. $R^X$ and $R^Y$ may be mutually bonded through a bonding group, but are not more preferably bonded.

The compound represented by the general formulae (1), (2), (3), and (4) may be a salt type to which a compound represented by the general formula $XR^iR^{ii}R^{iii}R^{iv}$ was coordinated. X represents Group XV atom and preferably a nitrogen atom or a phosphorous atom. Each of $R^i$, $R^{ii}$, $R^{iii}$ and $R^{iv}$ is independently an alkyl group which may be optionally substituted or an aryl group which may be optionally substituted. As the substituent of the above-mentioned alkyl group and aryl group, a substituent similar to those mentioned as the substituent of $R^1$ is mentioned.

As the $R^i$, $R^{ii}$, $R^{iii}$ and $R^{iv}$, there are preferably mentioned alkyl groups such as a methyl group, an ethyl group, a propyl group, an i-propyl group, an i-butyl group, an n-butyl group, an n-hexyl group and a cyclohexyl group; haloalkyl groups such as a trichloromethyl group and a trifluoromethyl group; and aralkyl groups such as a phenyl group, a benzyl group and a phenethyl group.

As the compound represented by the general formulae (1) to (4) related to the invention, those not forming a salt are more preferable than those forming a salt.

As the compound represented by the general formulae (1) to (4) related to the invention, a combination mainly with a (meth)acrylate pressure-sensitive adhesive is preferable. Among these, a combination with a pressure-sensitive adhesive having an acid value of 30 mgKOH/g or less that is obtained by controlling the copolymerization rate of a monomer having a carboxyl group in the molecule of the pressure-sensitive adhesive is preferable.

For example, the preferable specific example of the compound used for the pressure-sensitive adhesive containing the near infrared absorbing dye of the present invention is mentioned below. However, it is not limited to compounds below.

Further, in compounds 57 to 66, Ar shows a structure similar to a substituted phenyl group in the same molecule.

EXEMPLIFIED COMPOUND 1

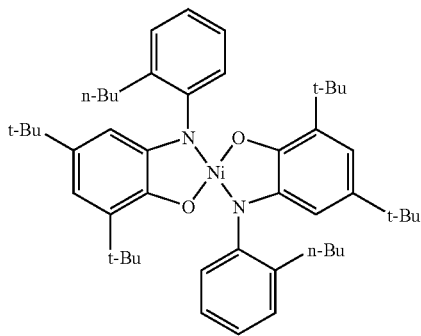

EXEMPLIFIED COMPOUND 2

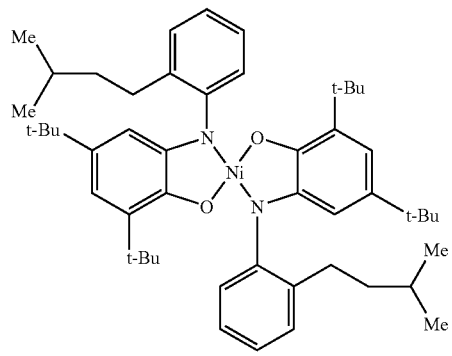

EXEMPLIFIED COMPOUND 3

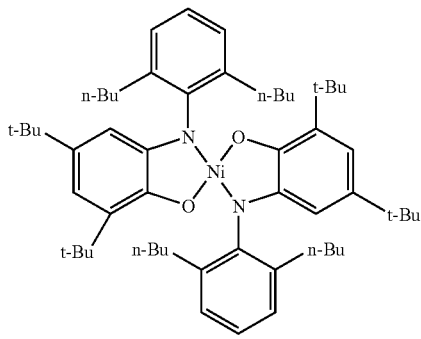

EXEMPLIFIED COMPOUND 4

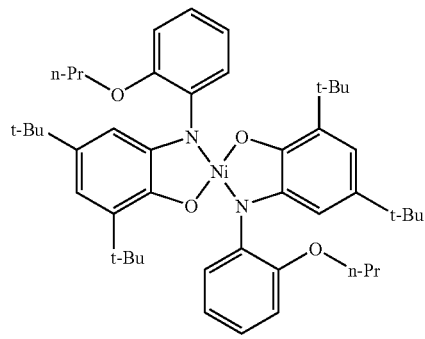

-continued
EXEMPLIFIED COMPOUND 5
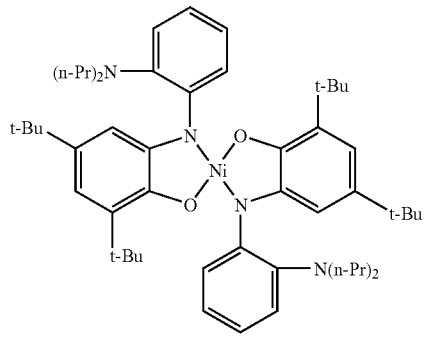
EXEMPLIFIED COMPOUND 6
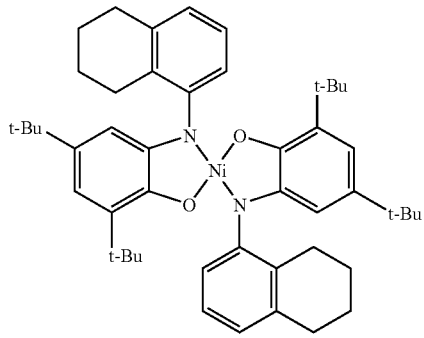
EXEMPLIFIED COMPOUND 7
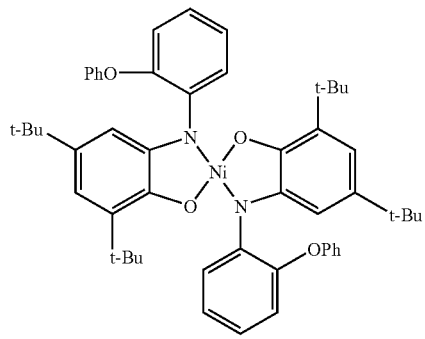
EXEMPLIFIED COMPOUND 8
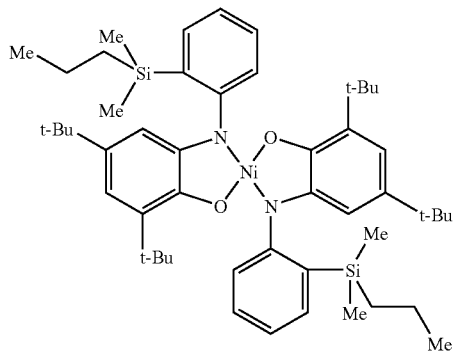
EXEMPLIFIED COMPOUND 9
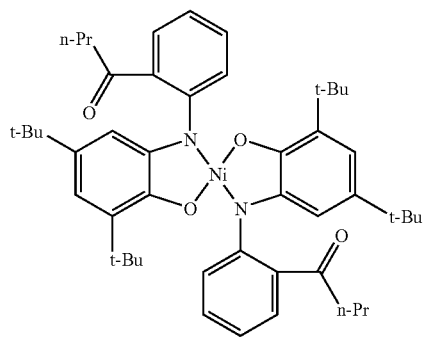
EXEMPLIFIED COMPOUND 10
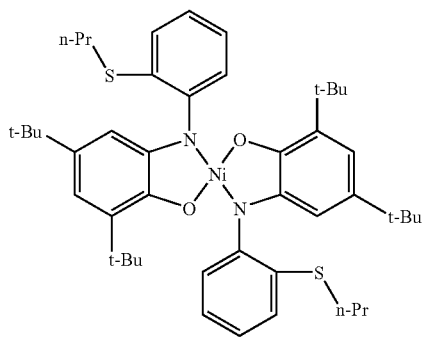
EXEMPLIFIED COMPOUND 11
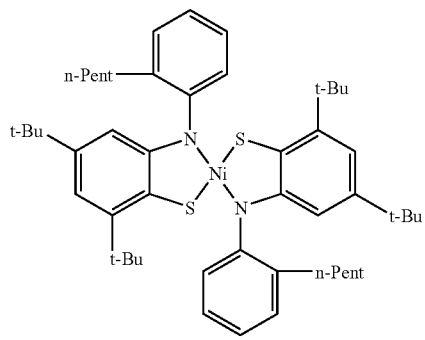
EXEMPLIFIED COMPOUND 12
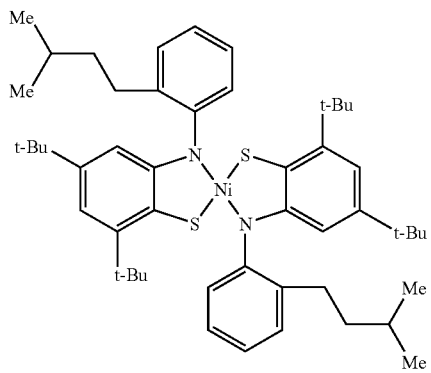

-continued
EXEMPLIFIED COMPOUND 13
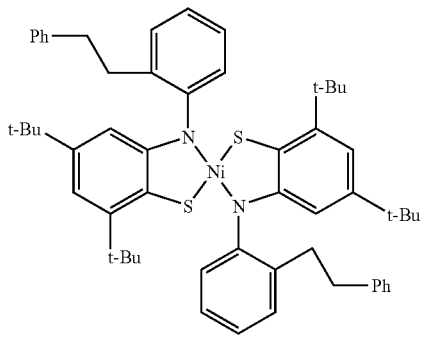
EXEMPLIFIED COMPOUND 14
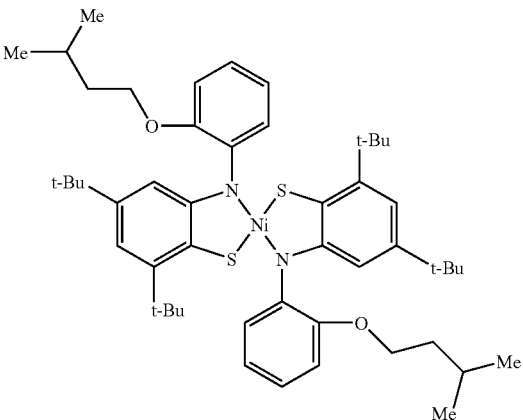
EXEMPLIFIED COMPOUND 15
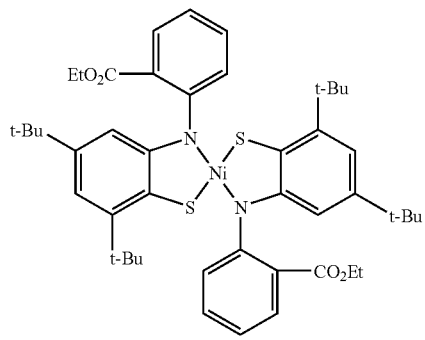
EXEMPLIFIED COMPOUND 16
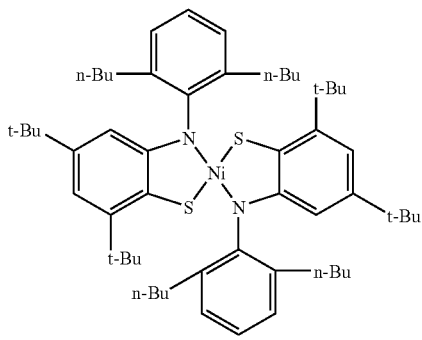
EXEMPLIFIED COMPOUND 17
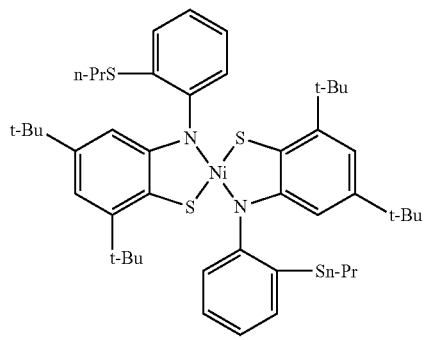
EXEMPLIFIED COMPOUND 18
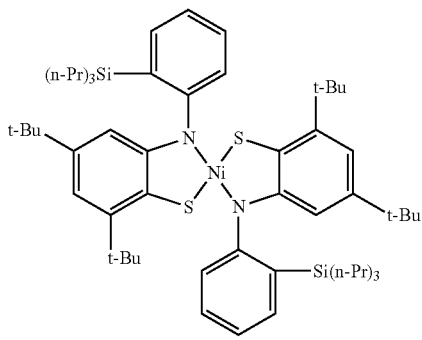
EXEMPLIFIED COMPOUND 19
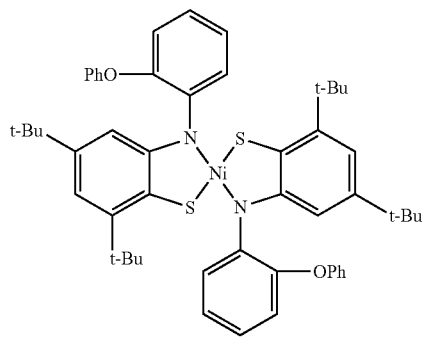
EXEMPLIFIED COMPOUND 20
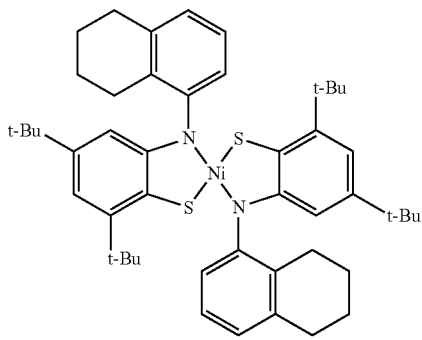

-continued
EXEMPLIFIED COMPOUND 21
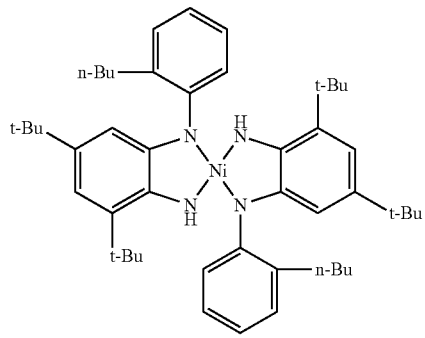
EXEMPLIFIED COMPOUND 22
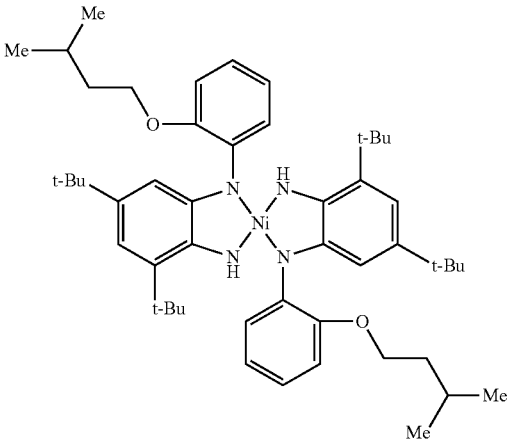
EXEMPLIFIED COMPOUND 23
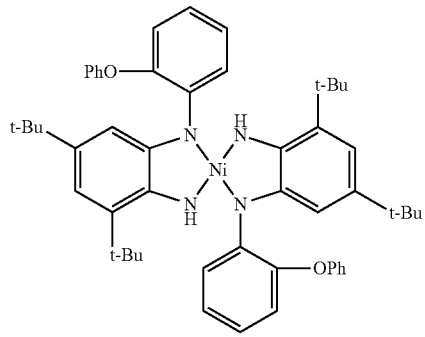
EXEMPLIFIED COMPOUND 24
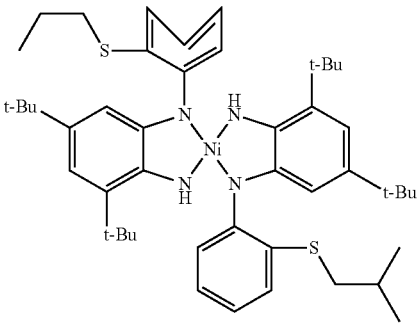
EXEMPLIFIED COMPOUND 25
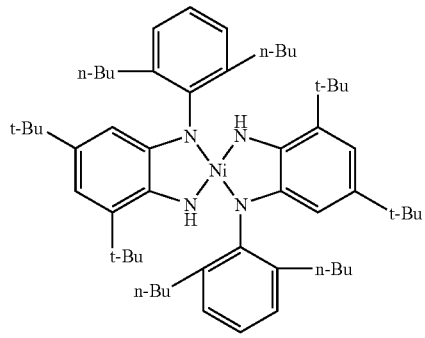
EXEMPLIFIED COMPOUND 26
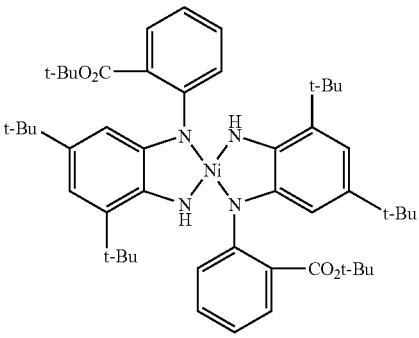
EXEMPLIFIED COMPOUND 27
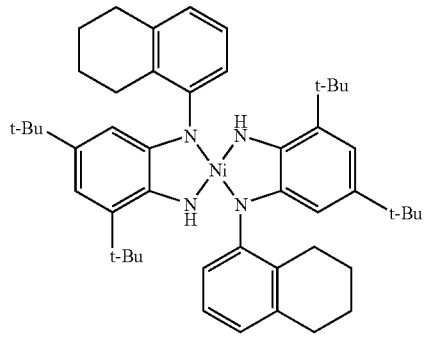
EXEMPLIFIED COMPOUND 28
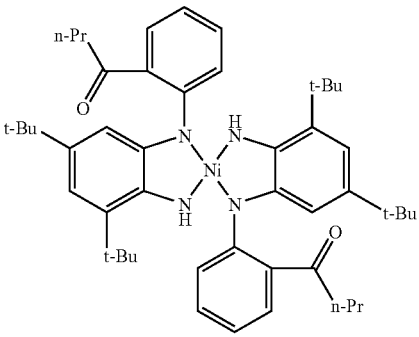

-continued
EXEMPLIFIED COMPOUND 29
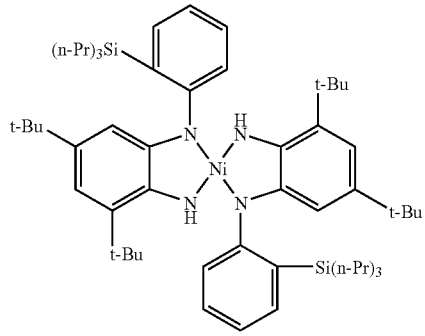
EXEMPLIFIED COMPOUND 30
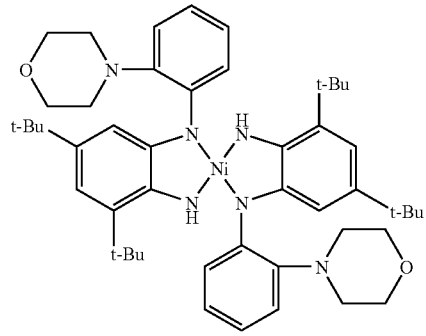
EXEMPLIFIED COMPOUND 31
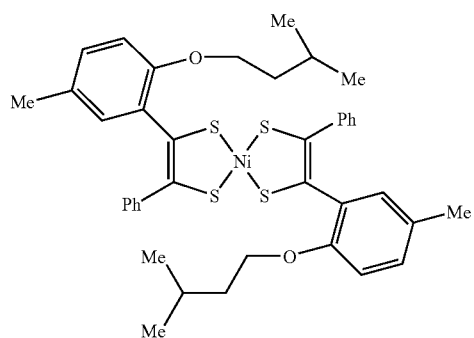
EXEMPLIFIED COMPOUND 32
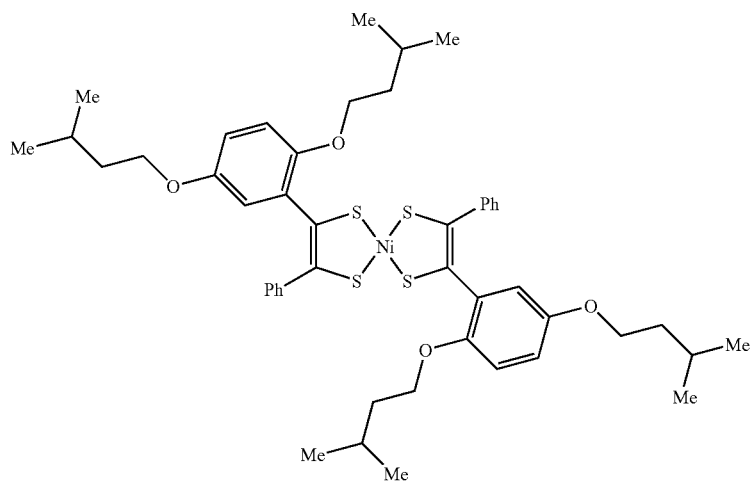

-continued
EXEMPLIFIED COMPOUND 33
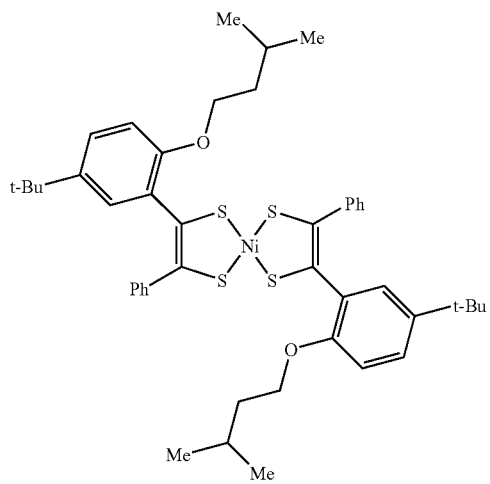
EXEMPLIFIED COMPOUND 34
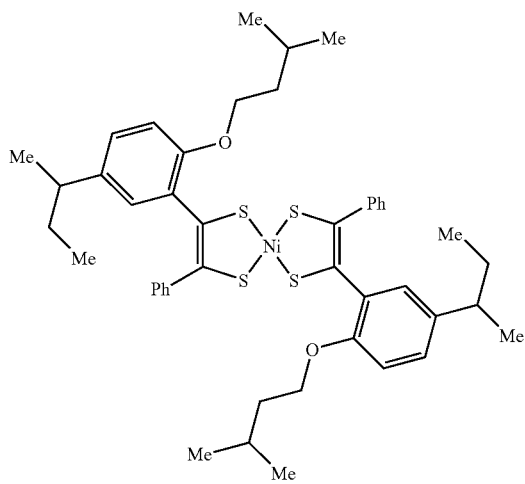
EXEMPLIFIED COMPOUND 35
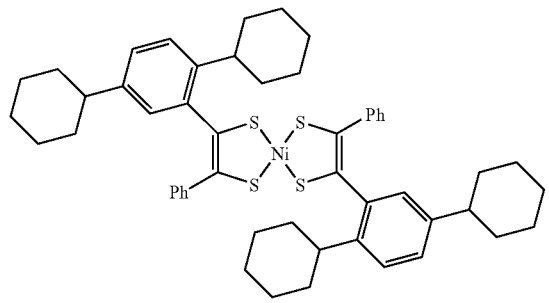
EXEMPLIFIED COMPOUND 36
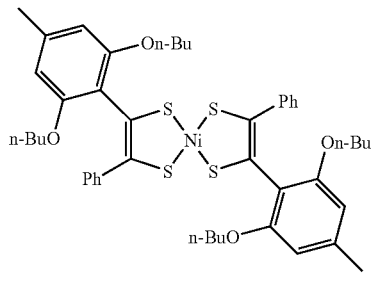
EXEMPLIFIED COMPOUND 37
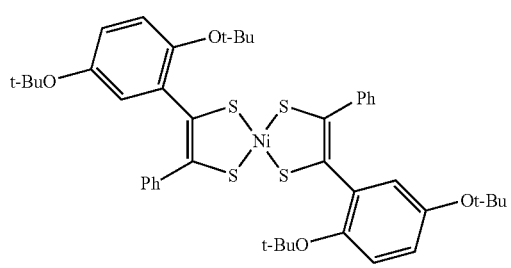
EXEMPLIFIED COMPOUND 38
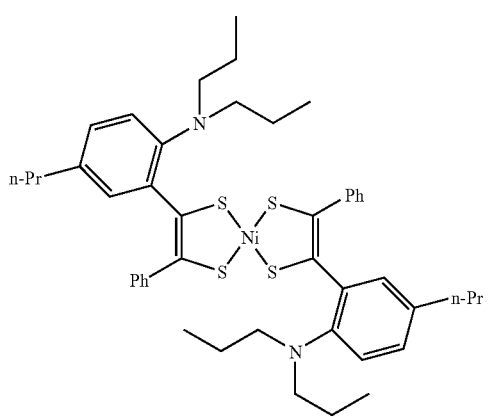
EXEMPLIFIED COMPOUND 39
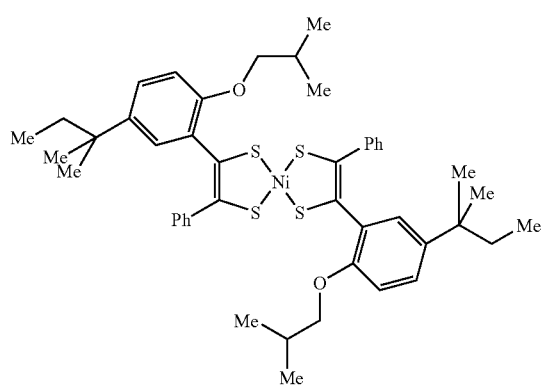
EXEMPLIFIED COMPOUND 40
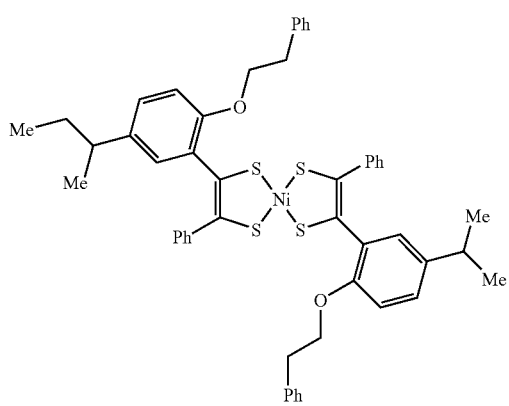

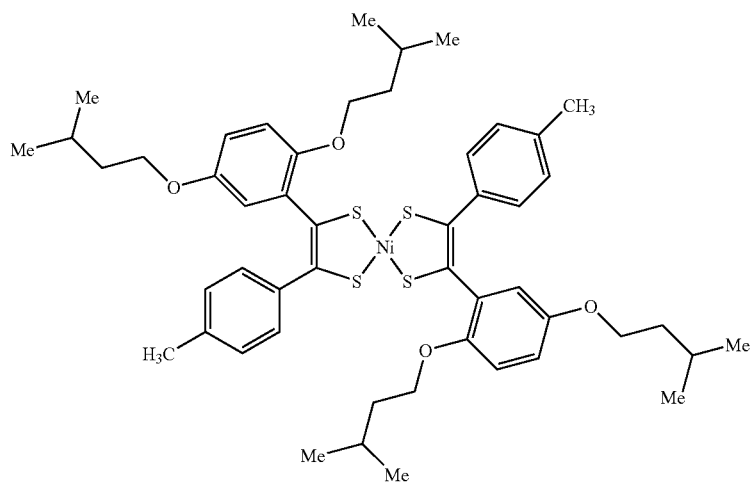
EXEMPLIFIED COMPOUND 41
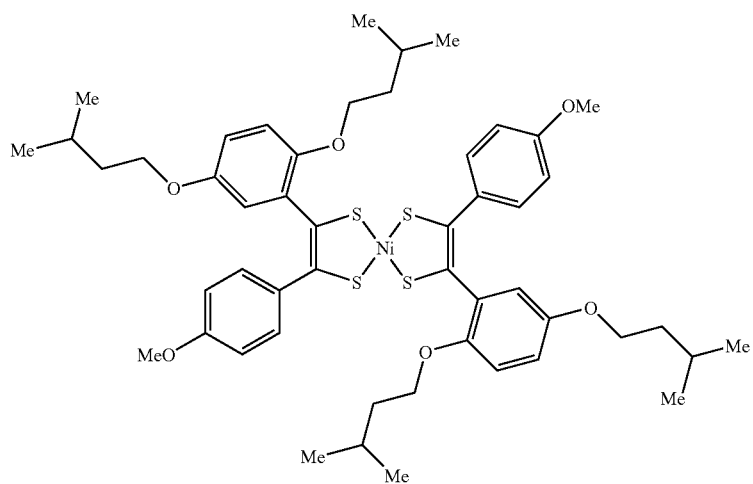
EXEMPLIFIED COMPOUND 42
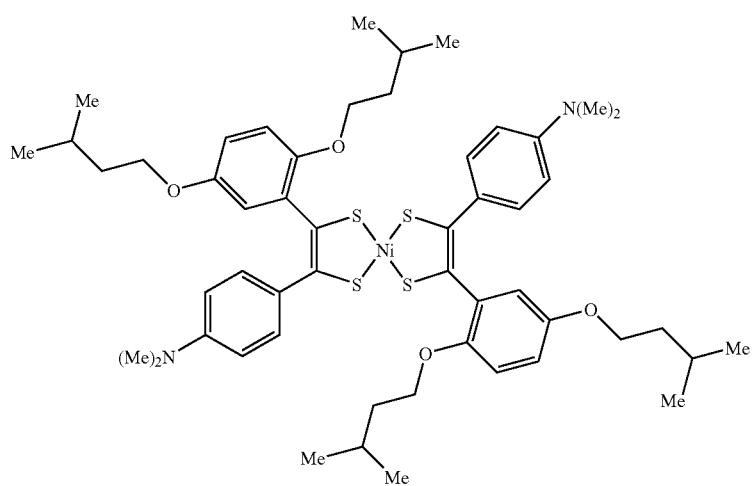
EXEMPLIFIED COMPOUND 43

EXEMPLIFIED COMPOUND 44
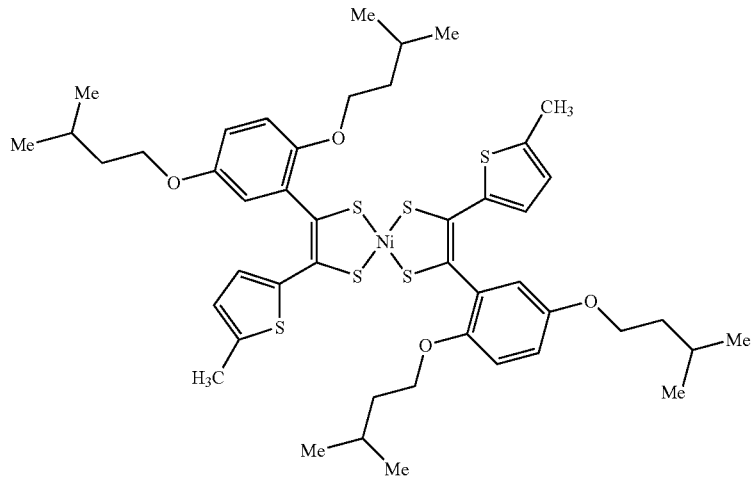
EXEMPLIFIED COMPOUND 45
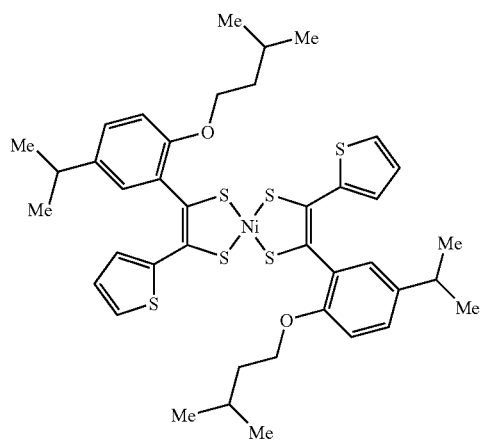
EXEMPLIFIED COMPOUND 46
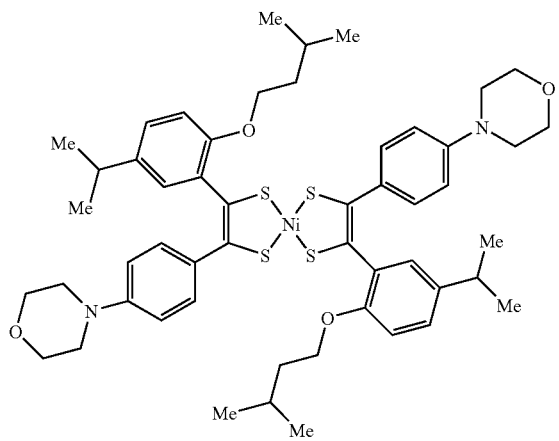
EXEMPLIFIED COMPOUND 47
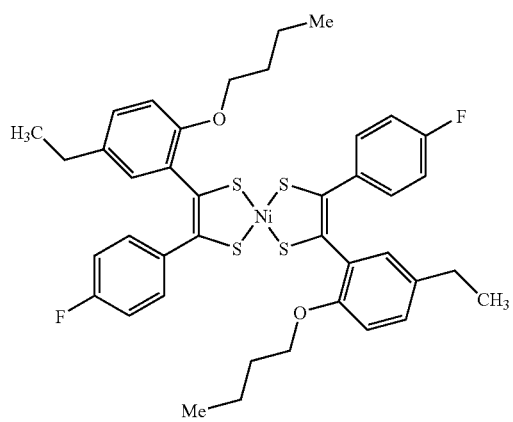
EXEMPLIFIED COMPOUND 48
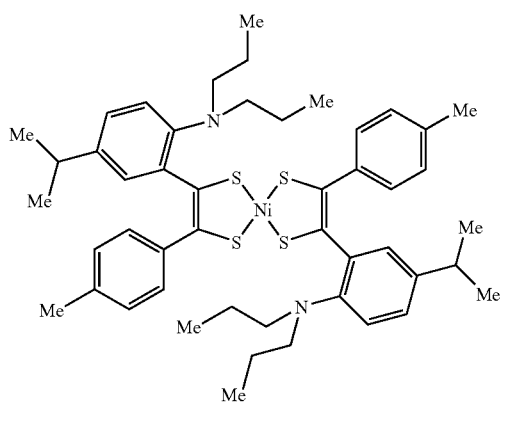

EXEMPLIFIED COMPOUND 49
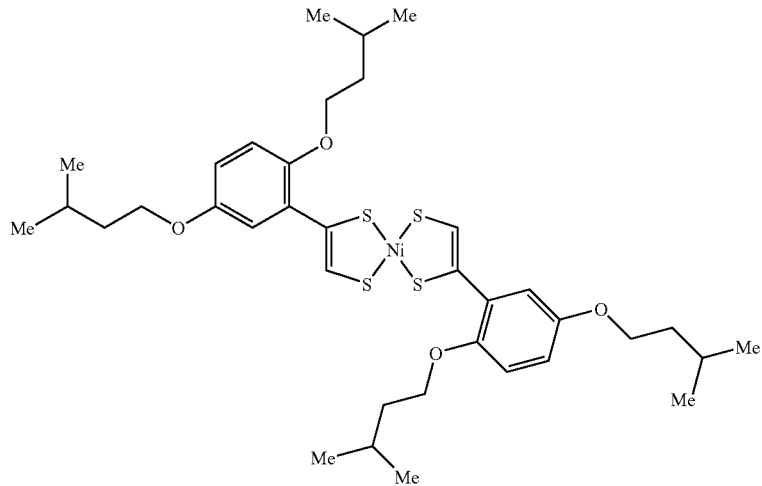
EXEMPLIFIED COMPOUND 50
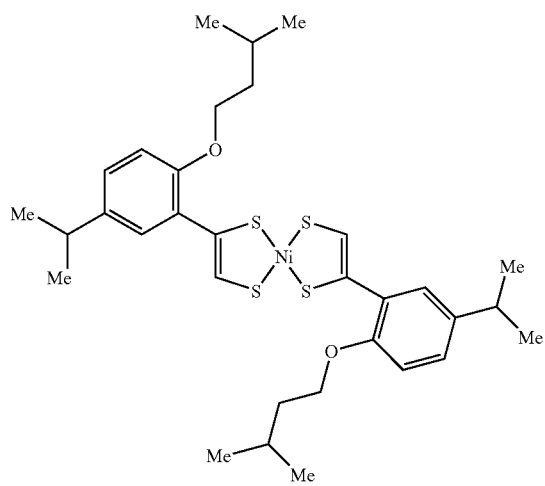
EXEMPLIFIED COMPOUND 51
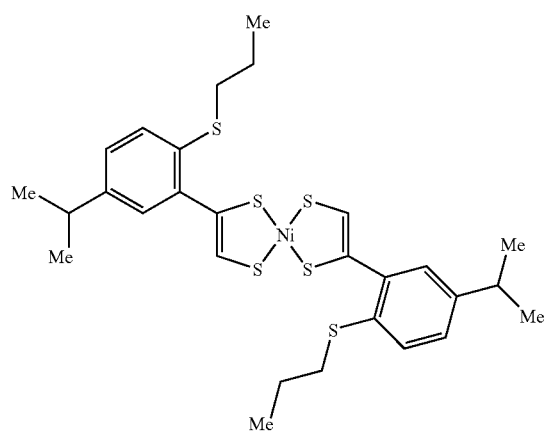
EXEMPLIFIED COMPOUND 52
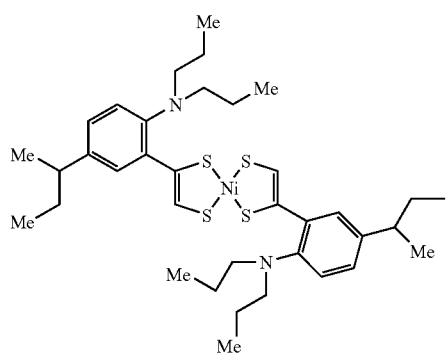
EXEMPLIFIED COMPOUND 53
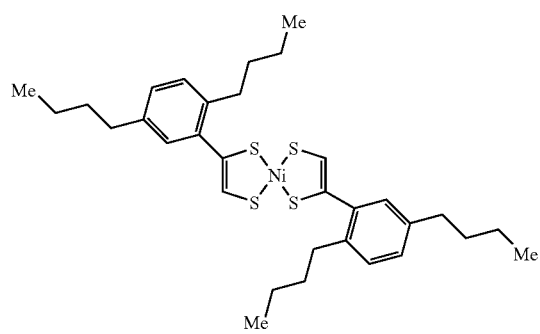

EXEMPLIFIED COMPOUND 54
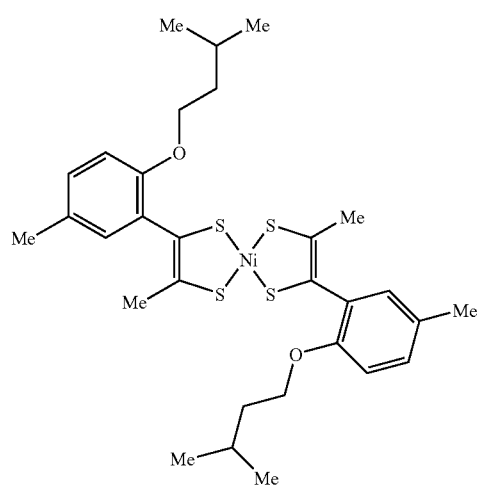
EXEMPLIFIED COMPOUND 55
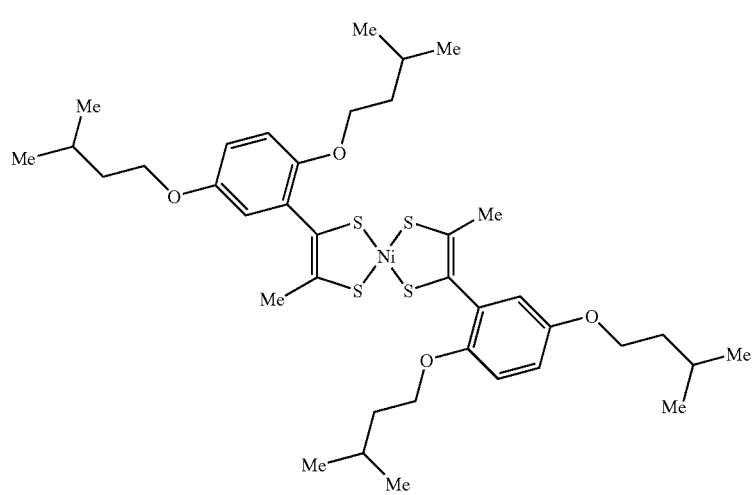
EXEMPLIFIED COMPOUND 56
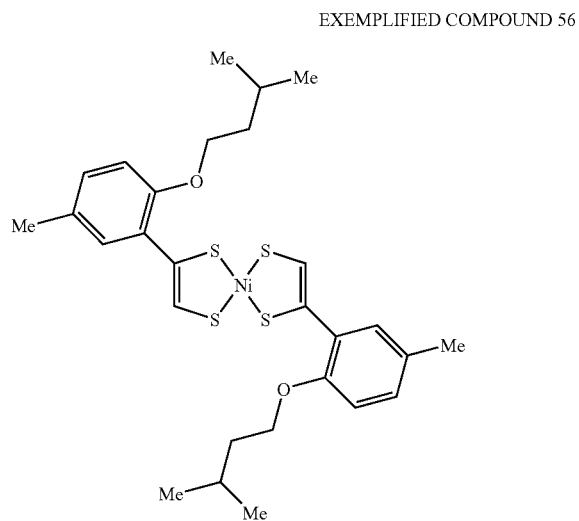
EXEMPLIFIED COMPOUND 57
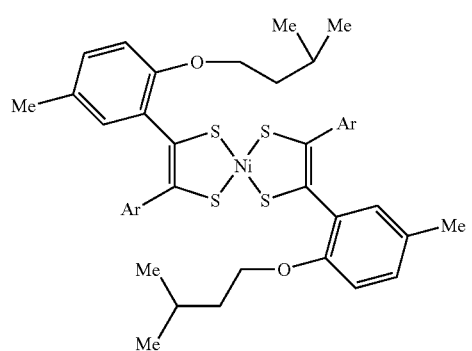

EXEMPLIFIED COMPOUND 58
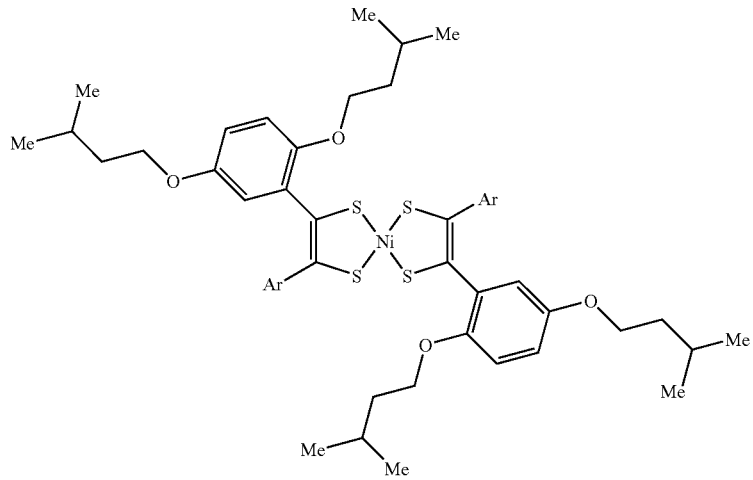
EXEMPLIFIED COMPOUND 59
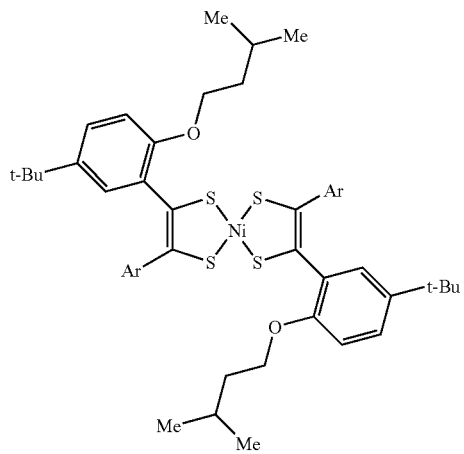
EXEMPLIFIED COMPOUND 60
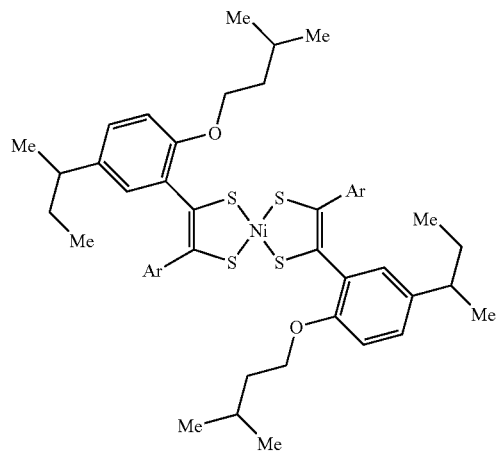
EXEMPLIFIED COMPOUND 61
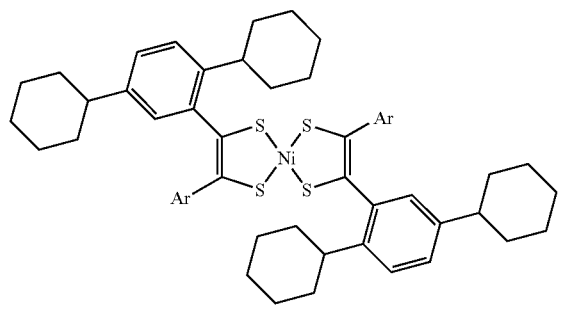
EXEMPLIFIED COMPOUND 62
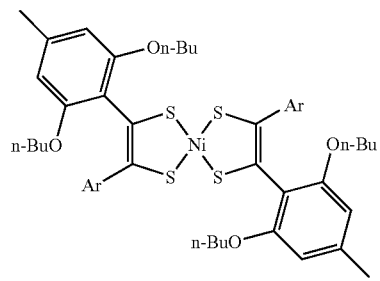

EXEMPLIFIED COMPOUND 63
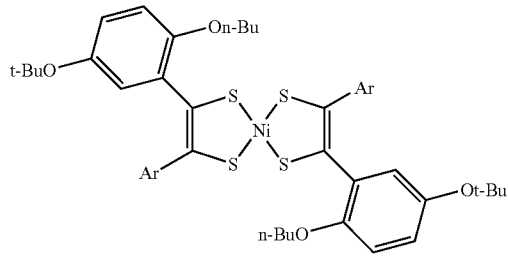
EXEMPLIFIED COMPOUND 64
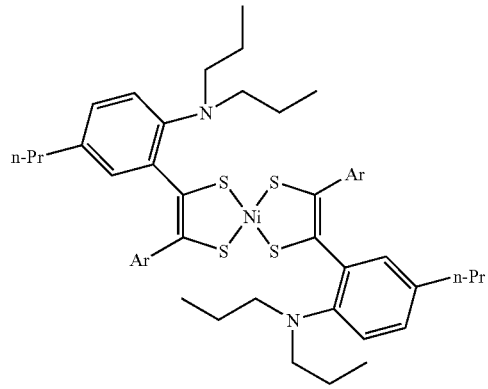
EXEMPLIFIED COMPOUND 65
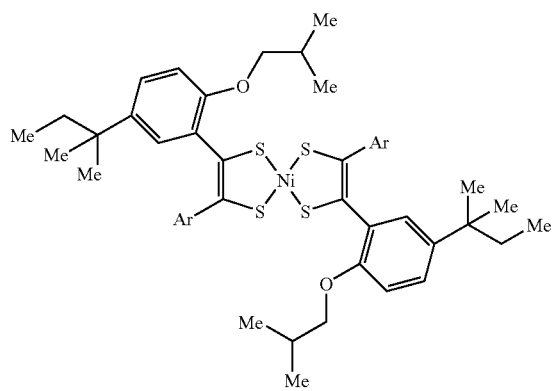
EXEMPLIFIED COMPOUND 66
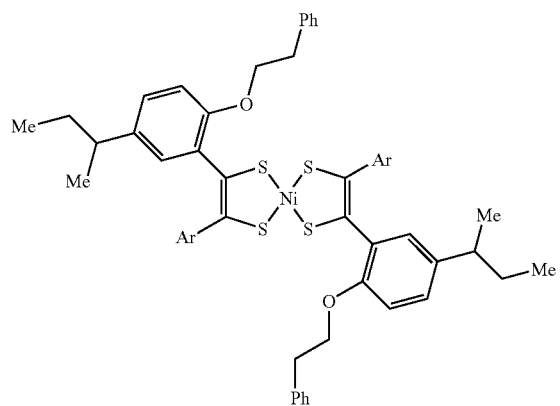
EXEMPLIFIED COMPOUND 67
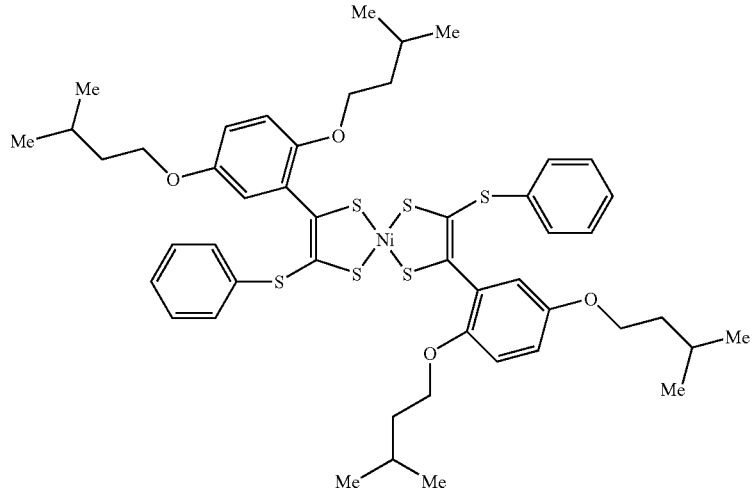

EXEMPLIFIED COMPOUND 68
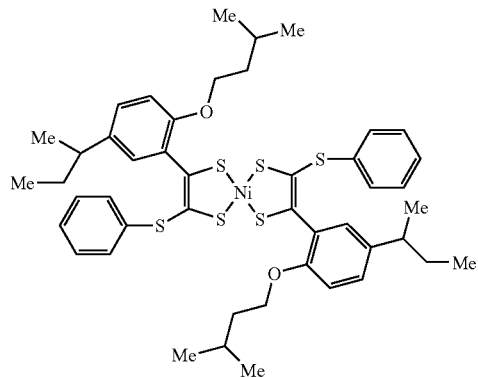
EXEMPLIFIED COMPOUND 69
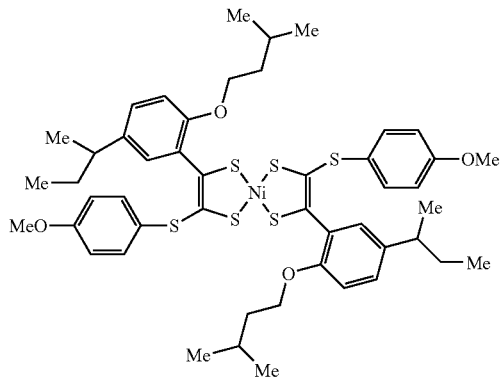
EXEMPLIFIED COMPOUND 70
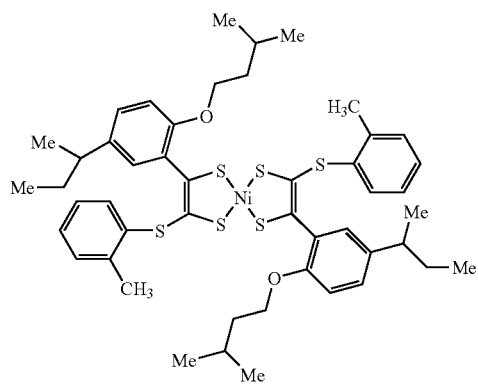
EXEMPLIFIED COMPOUND 71
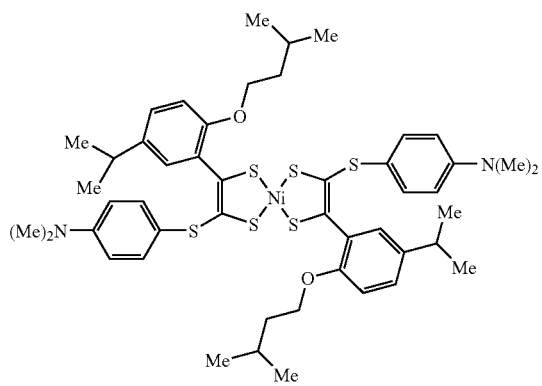
EXEMPLIFIED COMPOUND 72
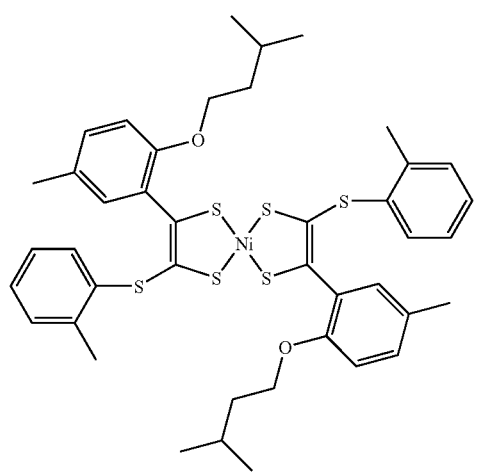
EXEMPLIFIED COMPOUND 73
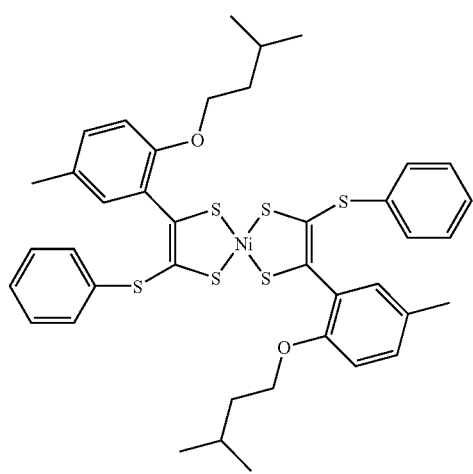

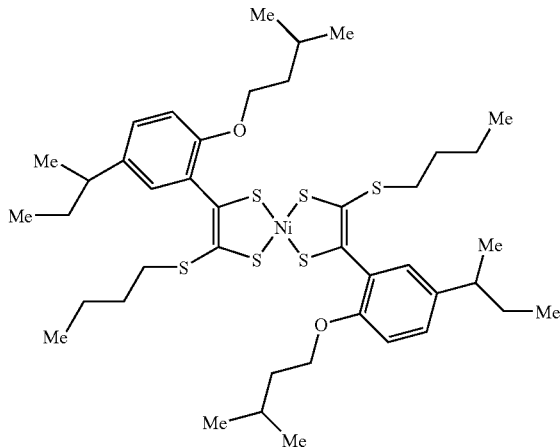

EXEMPLIFIED COMPOUND 74

Compounds preferable for use as the near infrared absorbing dye in the pressure-sensitive adhesive of the present invention other than the compounds represented by the above-mentioned general formula (1) and preferably the general formulae (2) to (4) are shown below in the general formulae (5) to (8).

[2] Compound Represented by the General Formula (5)

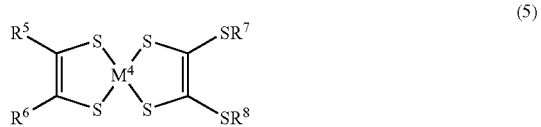

(5)

In the formula, $R^5$ and $R^6$ indicate a hydrocarbon group which may optionally have a substituent, a carbonyl group which may optionally have a substituent, a cyano group, a halogen atom or a hydrogen atom. $R^7$ and $R^8$ indicate an alkyl group which may optionally have a substituent or an aryl group which may optionally have a substituent. $M^4$ may be any metal receiving a planar quadridentate ligand.

As $M^4$, Ni, Pd, Pt, Co, Fe, Cu, Au, Cr, and Mn are preferable. Ni and Pd are more preferable. Ni is most preferable.

As the hydrocarbon group of $R^5$ and $R^6$, groups below are mentioned.

As the aliphatic hydrocarbon group, there are mentioned linear chain, branched chain or cyclic alkyl groups such as a methyl group, an ethyl group, an n-propyl group, a n-butyl group, a 2-methylpropyl group, a 2-methylbutyl group, a 3-methylbutyl group, a cyclohexylmethyl group, a neopentyl group, a 2-ethylbutyl group, an isopropyl group, a 2-butyl group, a cyclohexyl group, a 3-pentyl group, a tert-butyl group and a 1,1-dimethylpropyl group; alkenyl groups such as a 2-propenyl group, a 2-butenyl group, a 3-butenyl group and a 2,4-pentadienyl group; and alkynyl groups such as an ethynyl group. Among these, a branched alkyl group having 10 or less carbon atoms is preferable.

As the aryl group, there are mentioned a phenyl group, a naphthyl group, an anthranyl group, a fluorenyl group, a phenanthrenyl group, an azulenyl group, a metallocene ring group and the like. Among these, a monocyclic or condensed bicyclic aryl group having 12 or less carbon atoms is preferable. A phenyl group is further preferable.

As the heterocyclic group, there are mentioned a thienyl group, a furyl group, a pyrolyl group, a pyridyl group, an imidazolyl group, a pyrazolyl group, an indolyl group, a quinoxalinyl group, an acrydinyl group, a thiazolyl group, a pyrazinyl group and the like. Among these, a thienyl group is preferable in particular.

As the above-mentioned carbonyl group which may optionally have a substituent, there are mentioned an acyl group (—COR), a carbamoyl group (—CONRR'), an alkoxycarbonyl group (—C(O)OR), an aryloxycarbonyl group and a heterocyclic oxycarbonyl group. Further specifically, as R of an acyl group (—COR) and R and R' of the carbamoyl group (—CONRR'), those similar to the specific example of the fore-mentioned aliphatic hydrocarbon group, aryl group and heterocyclic group are mentioned. As R of the alkoxycarbonyl group (—C(O)OR), those similar to the specific example of the fore-mentioned aliphatic hydrocarbon group are mentioned. As R of the aryloxycarbonyl group (—C(O)OR), those similar to the specific example of the fore-mentioned aryl group are mentioned. As R of the heterocyclic oxycarbonyl group (—C(O)OR), those similar to the specific example of the fore-mentioned heterocyclic group are mentioned.

Among these, a phenyl group is further preferable as $R^5$ and $R^6$. $R^7$ and $R^8$ are preferably a branched chain alkyl group mentioned as $R^5$ and in particular, a secondary alkyl group or a phenyl group which may optionally have a substituent.

The particularly preferable combination of $R^5$ and $R^6$ is (a) to (d) below.

(a) It is a case that $R^5$ and $R^6$ have a phenyl group which may be optionally substituted at a p-position and/or an m-position:

The substituent of the phenyl group is a monovalent substituent and adjacent groups may be bonded directly or through a bonding group. For example, there is mentioned a halogen atom, a hydroxyl group, a nitro group, a cyano group, an alkyl group, an alkenyl group, an alkynyl group, an aryl group, a heteroaryl group, an alkoxy group, an aryloxy group, a heteroaryloxy group, an alkylthio group, an arylthio group, a heteroarylthio group, an amino group, an acyl group, an aminoacyl group, an ureide group, a sulfoneamide group, a carbamoyl group, a sulfamoyl group, a sulfamoylamino group, an alkoxycarbonyl group, an aryloxycarbonyl group, a heteroaryloxycarbonyl group, an alkylsulfonyl group, an arylsulfonyl group, a heteroarylsulfonyl group, an imide group and a silyl group, and the like.

Specifically, there are mentioned alkyl groups having 1 to about 6 carbon atoms such as a methyl group and an ethyl group; alkenyl groups having 1 to about 6 carbon atoms such as an ethynyl group and a propylenyl group; alkynyl groups having 1 to about 6 carbon atoms such as an acetylenyl group; aryl groups having 6 to about 20 carbon atoms such as a phenyl group and a naphthyl group; heteroaryl groups having 3 to about 20 carbon atoms such as a thienyl group, a furyl group and a pyridyl group; alkoxy groups having 1 to about 6 carbon atoms such as an ethoxy group and a propoxy group; aryloxy groups having 6 to about 20 carbon atoms such as a phenoxy group and a naphthoxy group; heteroaryloxy groups having 3 to about 20 carbon atoms such as a pyridyloxy group and a thienyloxy group; alkylthio groups having 1 to about 6 carbon atoms such as a methylthio group and an ethylthio group; arylthio groups having 6 to about 20 carbon atoms such as a phenylthio group and a naphthylthio group; heteroarylthio groups having 3 to about 20 carbon atoms such as a pyridylthio group and a thienylthio group; amino groups having 1 to about 20 carbon atoms that may optionally have a substituent such as a dimethylamino group and a diphenylamino group; acyl groups having 2 to about 20 carbon atoms such as an acetyl group and a pivaloyl group; acylamino groups having 2 to about 20 carbon atoms such as an acetylamino group and a propionylamino group; ureide groups having 2 to about 20 carbon atoms such as a 3-methylureide group; sulfoneamide groups having 1 to about 20 carbon atoms such as a methanesulfoneamide group and a benzenesulfoneamide group; carbamoyl groups having 1 to about 20 carbon atoms such as a dimethylcarbamoyl group and an ethylcarbamoyl group; sulfamoyl groups having 1 to about 20 carbon atoms such as an ethylsulfamoyl group; sulfamoylamino groups having 1 to about 20 carbon atoms such as a dimethylsulfamoylamino group; alkoxycarbonyl groups having 2 to about 6 carbon atoms such as a methoxycarbonyl group and an ethoxycarbonyl group; aryloxycarbonyl groups having 7 to about 20 carbon atoms such as a phenoxycarbonyl group and a naphthoxycarbonyl group; heteroaryloxycarbonyl groups having 6 to about 20 carbon atoms such as a pyridyloxycarbonyl group; alkylsulfonyl groups having 1 to about 6 carbon atoms such as a methanesulfonyl group, an ethane sulfonyl group and a trifluoromethanesulfonyl group; arylsulfonyl groups having 6 to about 20 carbon atoms such as a benzenesulfonyl group and a monofluorobenzenesulfonyl group; heteroarylsulfonyl groups having 3 to about 20 carbon atoms such as a thienylsulfonyl group; imide groups having 4 to about 20 carbon atoms such as phthalimide; a silyl group that is substituted with 3 substituents selected from a group including an alkyl group and an aryl group, etc.

An alkyl group, an alkoxy group, an alkylthio group, an amino group substituting an alkyl group and a phenyl group having a fluorine atom and a chlorine atom are preferable in particular.

(b) It is a Case that $R^5$ is a Phenyl Group in which a Substituent is Situated at Least at an Ortho-Position and $R^6$ is a hydrogen atom:

The substituent at an ortho-position is preferably univalent substituent having 4 or more in total of at least one atom selected from a carbon atom, an oxygen atom, a sulfur atom, a nitrogen atom and a silicon atom, in particular. Specifically, as the hydrocarbon group it is (1) to (3) below.

(1) As the aliphatic hydrocarbon group, there are mentioned linear chain, branched chain or cyclic alkyl groups such as an n-butyl group a 2-methylbutyl group, a 3-methylbutyl group, a cyclohexylmethyl group, a neopentyl group, 2-ethylbutyl group, 2-butyl group, a cyclohexyl group and a 3-pentyl group; alkenyl groups such as a 2-butenyl group, a 3-butenyl group and a 2,4-pentadienyl group; and alkynyl groups such as a 2-hexyne group. Among these, an aliphatic hydrocarbon group having 4 to about 12 carbon atoms is preferable and in particular, a branched chain aliphatic hydrocarbon group having 4 to about 12 carbon atoms is preferable.

(2) As the aryl group, there are mentioned a phenyl group, a naphthyl group, an anthranyl group, a fluorenyl group, a phenanthrenyl group, an azulenyl group and the like. Among these, a monocyclic or condensed bicyclic aryl group having 6 or more to 12 or less carbon atoms is preferable.

(3) As the heterocyclic group, there are mentioned a thienyl group, a furyl group, a pyrolyl group, a pyridyl group, an imidazolyl group, a pyrazolyl group, an indolyl group, a quinoxalinyl group, an acrydinyl group, a thiazolyl group, a pyrazinyl group and the like. Among these, a monocyclic or bicyclic 5-membered heterocyclic group having 3 or more and 12 or less carbon atoms is preferable.

As the carbonyl group, there are mentioned an acyl group (—COR), a carbamoyl group (—CONRR'), an alkoxycarbonyl group (—C(O)OR), an aryloxycarbonyl group and a heterocyclic oxycarbonyl group. Further specifically, as R of an acyl group (—COR), an n-propyl group, a 2-propenyl group and the like are mentioned in addition to those similar to the specific example of the fore-mentioned aliphatic hydrocarbon group, aryl group and heterocyclic group. As R and R' of the carbamoyl group (—CONRR'), an ethyl group, an n-propyl group, a 2-propenyl group, an ethynyl group and the like are mentioned in addition to those similar to the specific example of the fore-mentioned aliphatic hydrocarbon group, aryl group and heterocyclic group. As R of the alkoxycarbonyl group (—C(O)OR), an ethyl group, an n-propyl group, a 2-propenyl group, an ethynyl group and the like are mentioned in addition to those similar to the specific example of the fore-mentioned aliphatic hydrocarbon group. Further, as R of the aryloxycarbonyl group (—C(O)OR), those similar to the specific example of the fore-mentioned aryl group are mentioned. As R of the heterocyclic oxycarbonyl group (—C(O)OR), those similar to the specific example of the fore-mentioned heterocyclic group are mentioned.

As R of the hydrocarbon thio group (—SR), an n-propyl group, a 2-propenyl group, an ethynyl group and the like are mentioned in addition to those similar to the specific example of the fore-mentioned hydrocarbon group, aryl group and heterocyclic group.

As R and R' of the amino group (—NRR'), an n-propyl group, a 2-propenyl group, an ethynyl group and the like are mentioned in addition to those similar to the specific example of the fore-mentioned hydrocarbon group, aryl group and heterocyclic group.

As R of the hydrocarbon oxy group (—OR), an n-propyl group, a 2-propenyl group, an ethynyl group and the like are mentioned in addition to those similar to the specific example of the fore-mentioned hydrocarbon group, aryl group and heterocyclic group.

As the silyl group, silyl groups such as a t-butyldiphenylsilyl group, an n-butyldimethylsilyl group, a dimethylpropylsilyl group, a dimethylphenylsilyl group, a dimethylisopropylsilyl group and a triisopropylsilyl group are mentioned. An alkylsilyl group having 3 or more and 18 or less carbon atoms is preferable.

Among these, $R^5$ and $R^6$ are preferably an alkyl group, an alkoxy group and an alkylthio group in particular and is preferably a branched alkyl group or a branched alkoxy group in particular. It may optionally have a substituent other than that at an ortho-position, but an alkyl group, an alkoxy group, an alkylthio group, a fluorine atom, a chlorine atom, and cyano atom are preferable.

(c) It is a Case that $R^5$ is a Phenyl Group in which a Substituent Is Situated at Least an Ortho-Position And $R^6$ is a Phenyl Group Having a Substituent:

The substituent at the ortho-position of $R^5$ is preferably a monovalent substituent having 3 or more in total of at least one atom selected from a carbon atom, a sulfur atom, an oxygen atom, a nitrogen atom, and a silicon atom. An alkyl group, an alkoxy group and an alkylthio group are preferable in particular. It may optionally have a substituent other than that at an ortho-position, but an alkyl group, an alkoxy group, an alkylthio group, a fluorine atom, a chlorine atom and a cyano group are preferable. The substituent of $R^6$ is preferably situated at a meta-position and/or para-position and is an arbitrary monovalent group, but an alkyl group, an alkoxy group, an alkylthio group, a fluorine atom, a chlorine atom and a cyano group are preferable in particular.

(d) It is a Case that $R^5$ and $R^6$ are Phenyl Groups in Which a Substituent is Situated at Least at an Ortho-Position:

The substituent at an ortho-position of $R^5$ and $R^6$ is preferably a monovalent substituent having 2 or more in total of at least one atom selected from a carbon atom, an oxygen atom, a sulfur atom, a nitrogen atom and a silicon atom. An alkyl group, an alkoxy group and an alkylthio group are preferable in particular and a branched chain alkyl group or a branched chain alkoxy group is preferable in particular. It may optionally have a substituent other than that at an ortho-position, but an alkyl group, an alkoxy group, an alkylthio group, a fluorine atom, a chlorine atom and a cyano group are preferable.

The compound represented by the general formula (5) related to the invention is preferably a combination mainly with a (meth)acrylate pressure-sensitive adhesive. Among these, a combination with a pressure-sensitive adhesive having an acid value of 30 mgKOH/g or less that is obtained by controlling the copolymerization rate of a monomer having a carboxyl group in the molecule of the pressure-sensitive adhesive is preferable. Among these, a pressure-sensitive adhesive exhibiting neutrality is more preferable.

A combination with a pressure-sensitive adhesive having an acid value of 10 mgKOH/g or less is preferable in particular.

Among the compound represented by the general formula (5), structures below are mentioned as preferable specific examples.

EXEMPLIFIED COMPOUND 75

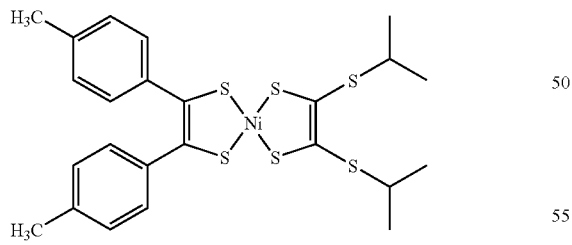

EXEMPLIFIED COMPOUND 76

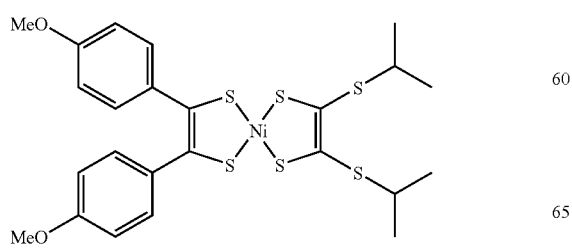

EXEMPLIFIED COMPOUND 77

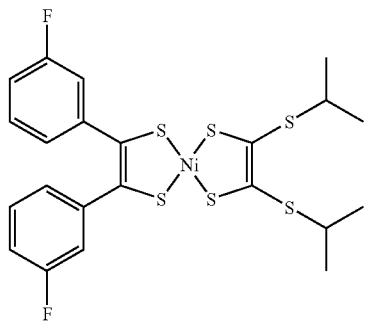

EXEMPLIFIED COMPOUND 78

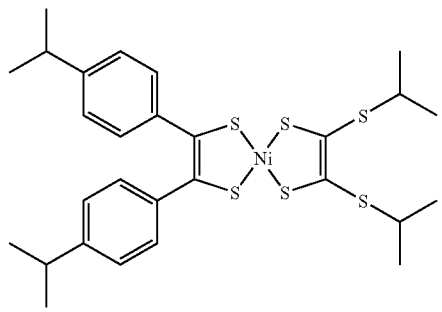

EXEMPLIFIED COMPOUND 79

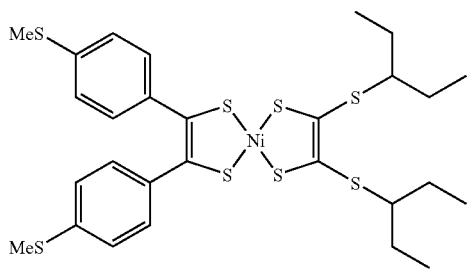

EXEMPLIFIED COMPOUND 80

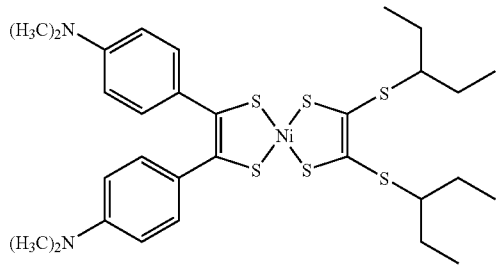

EXEMPLIFIED COMPOUND 81

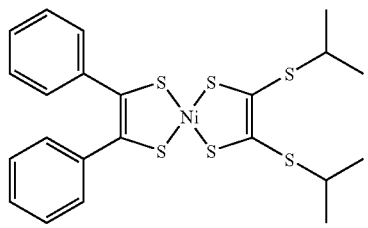

EXEMPLIFIED COMPOUND 82
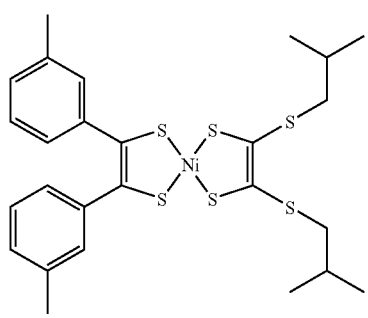
EXEMPLIFIED COMPOUND 83
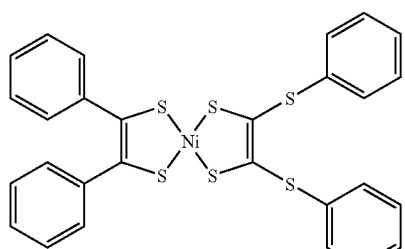
EXEMPLIFIED COMPOUND 84
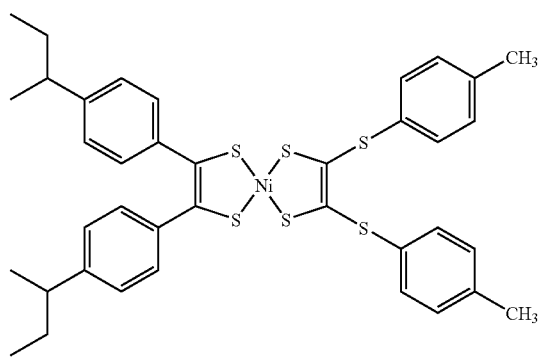
EXEMPLIFIED COMPOUND 85
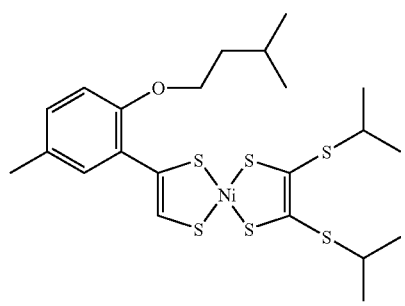
EXEMPLIFIED COMPOUND 86
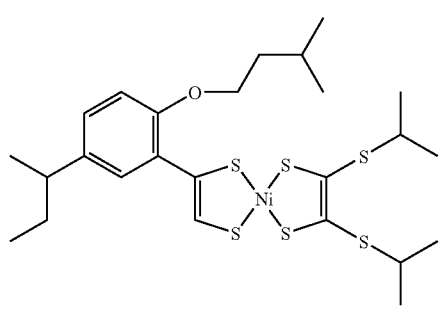
EXEMPLIFIED COMPOUND 87
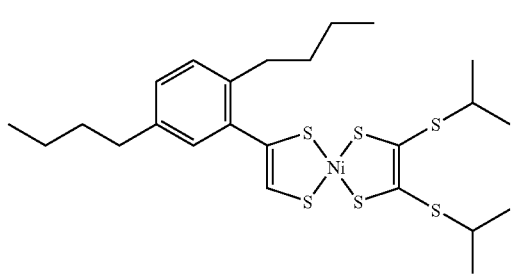
EXEMPLIFIED COMPOUND 88
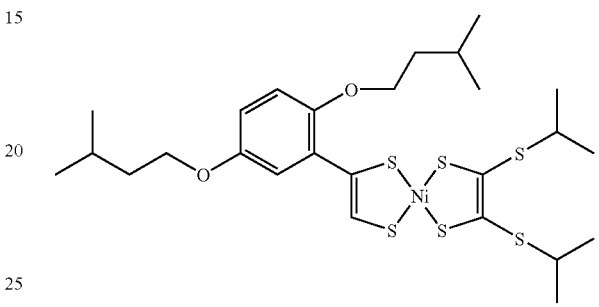
EXEMPLIFIED COMPOUND 89
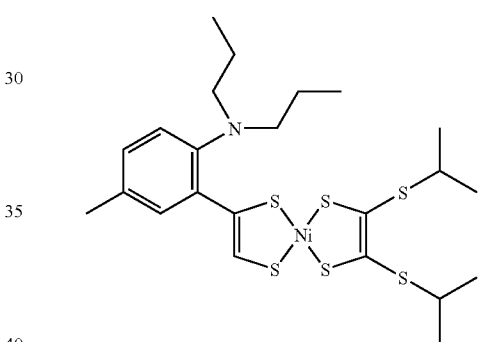
EXEMPLIFIED COMPOUND 90
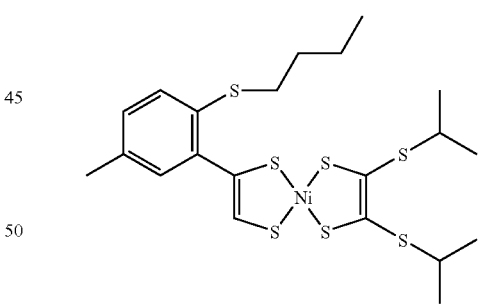
EXEMPLIFIED COMPOUND 95
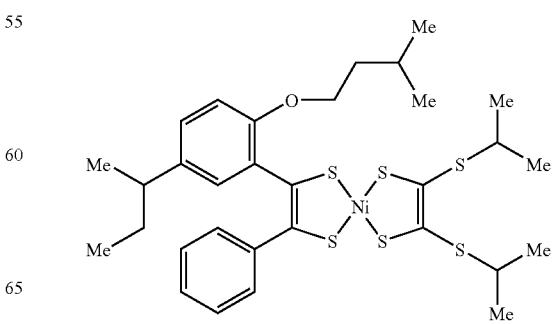

EXEMPLIFIED COMPOUND 96
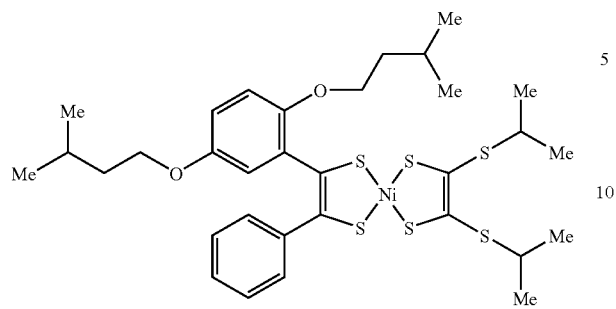
EXEMPLIFIED COMPOUND 97
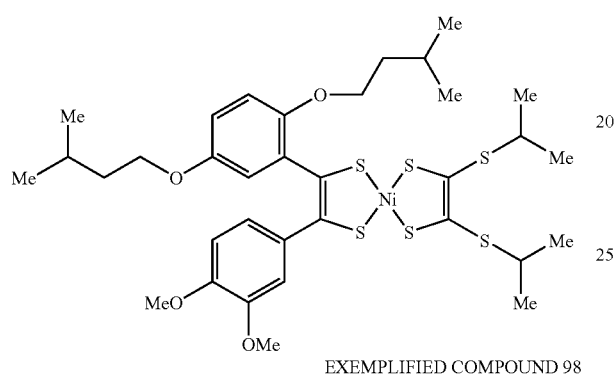
EXEMPLIFIED COMPOUND 98
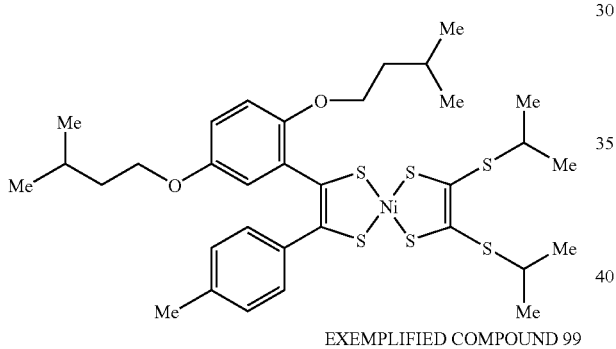
EXEMPLIFIED COMPOUND 99
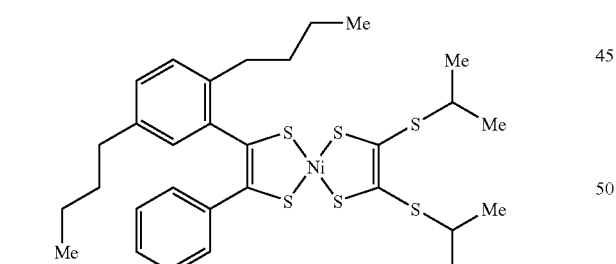
EXEMPLIFIED COMPOUND 100
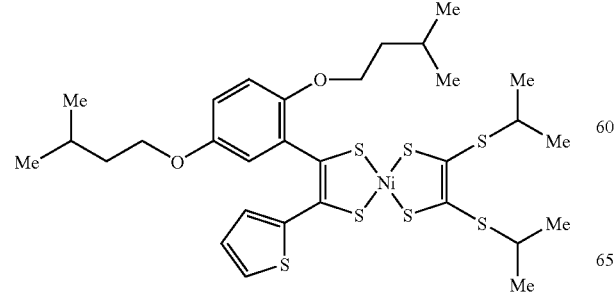
EXEMPLIFIED COMPOUND 101
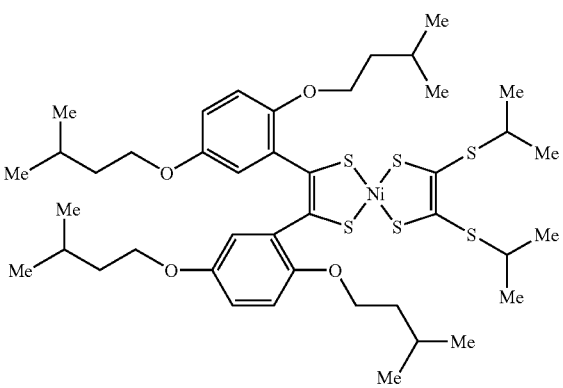
EXEMPLIFIED COMPOUND 102
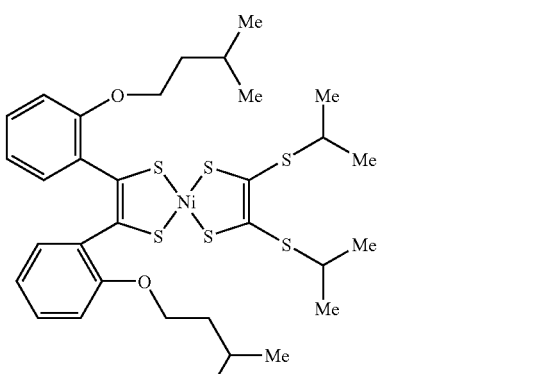
EXEMPLIFIED COMPOUND 103
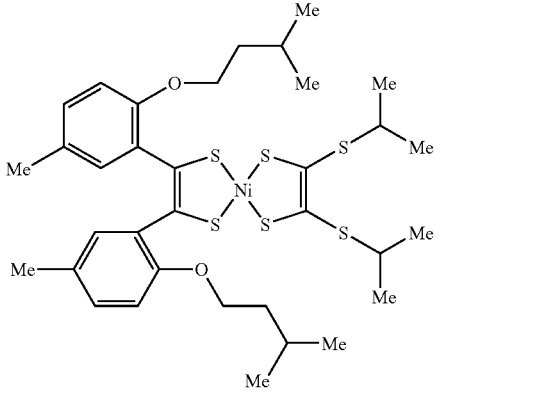
EXEMPLIFIED COMPOUND 104
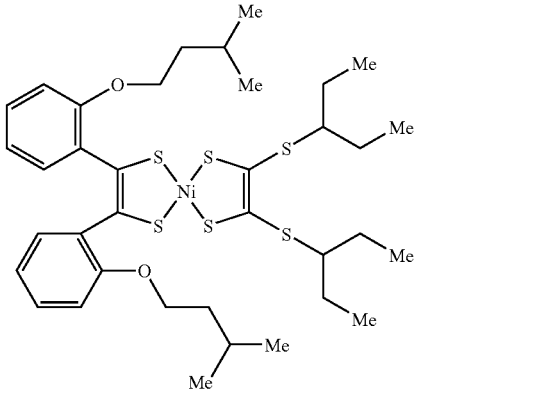

[3] Compound Represented by the General Formula (6)

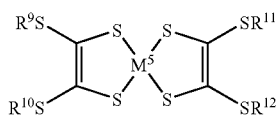
(6)

In the formula, $R^9$, $R^{10}$, $R^{11}$, and $R^{12}$ indicate an aryl group which may optionally have a substituent, or an alkyl group which may optionally have a substituent. $R^9$, $R^{10}$, $R^{11}$, and $R^{12}$ may be mutually different, but $R^9$ and $R^{10}$, and $R^{11}$ and $R^{12}$ are preferably the same groups respectively. All of $R^9$, $R^{10}$, $R^{11}$, and $R^{12}$ are more preferably the same groups. $R^9$ and $R^{10}$ and $R^{11}$ and $R^{12}$ may be bonded through a bonding group. As $M^5$, those similar to the $M^4$ of the general formula (5) are mentioned.

Specifically, as the aryl group of $R^9$, $R^{10}$, $R^{11}$, and $R^{12}$ an aryl group described in $R^7$ and $R^8$ of the general formula (5) is mentioned. A phenyl group is preferable, those having a substituent at an ortho-position are preferable in particular and an arbitrary monovalent substituent is preferable. It is preferably an alkyl group, an alkoxy group and an alkylthio group, and preferably a branched chain alkyl group and a branched chain alkoxy group in particular. Specifically, it is similar to those described in $R^7$ and $R^8$ of the general formula (5).

Further, it may have optionally a substituent other than at an ortho-position, and in such case, an alkyl group, an alkoxy group, an alkylthio group, a fluorine atom, a chlorine atom and a cyano group are preferable.

As the alkyl group of $R^9$, $R^{10}$, $R^{11}$, and $R^{12}$, a branched chain alkyl group is preferable and a secondary alkyl group is preferable in particular. Specifically, it is similar to those described in $R^7$ and $R^8$ of the general formula (5)

As the compound represented by the general formula (6) related to the invention, a combination mainly with a (meth) acrylate pressure-sensitive adhesive is preferable. Among these, a combination with a pressure-sensitive adhesive having an acid value of 30 mgKOH/g or less that is obtained by controlling the copolymerization rate of a monomer having a carboxyl group in the molecule of the pressure-sensitive adhesive is preferable. Among these, a pressure-sensitive adhesive exhibiting neutrality is more preferable. A combination with a pressure-sensitive adhesive having an acid value of 10 mgKOH/g or less is preferable in particular.

Among the compound represented by the general formula (6) related to the present invention, structures below are mentioned as preferable specific examples.

EXEMPLIFIED COMPOUND 105

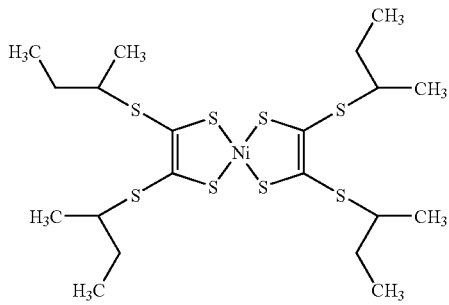

EXEMPLIFIED COMPOUND 106

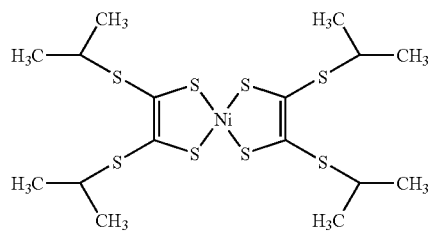

EXEMPLIFIED COMPOUND 107

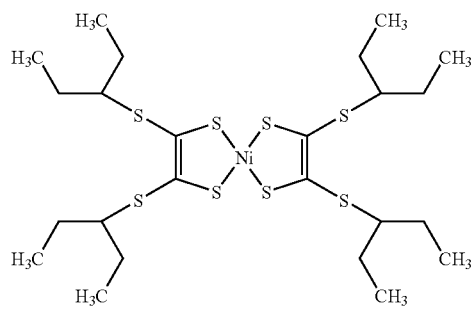

EXEMPLIFIED COMPOUND 108

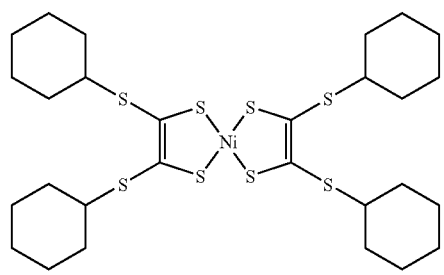

EXEMPLIFIED COMPOUND 109

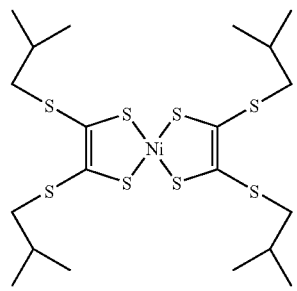

EXEMPLIFIED COMPOUND 110

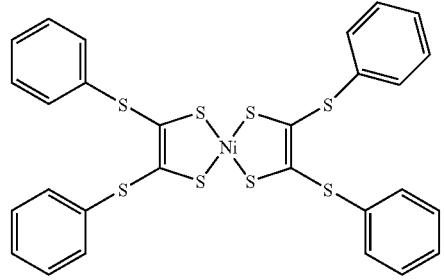

EXEMPLIFIED COMPOUND 111

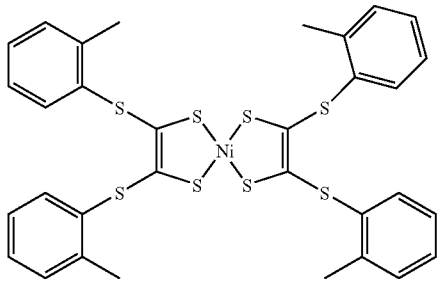

EXEMPLIFIED COMPOUND 112

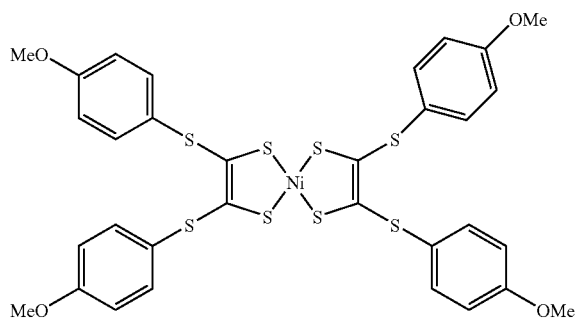

EXEMPLIFIED COMPOUND 113

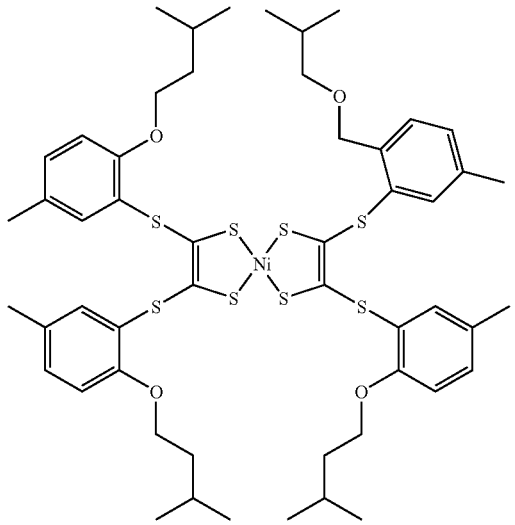

EXEMPLIFIED COMPOUND 114

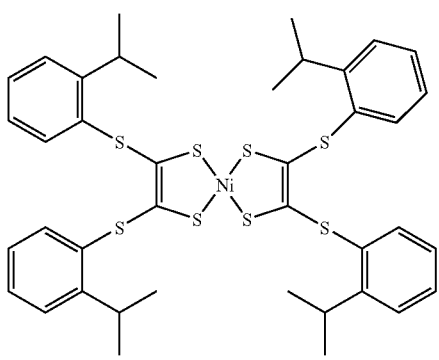

[4] Compound Represented by the Under-Mentioned General Formula (7)

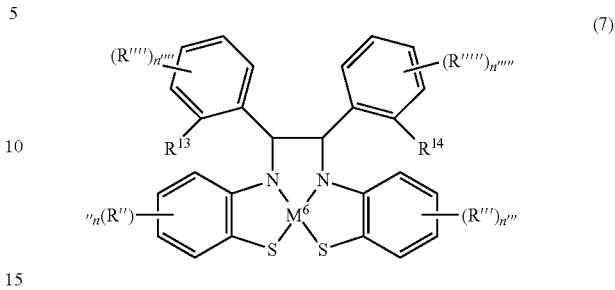

(7)

In the formula, $R^{13}$ and $R^{14}$ are a monovalent group other than hydrogen. $R^{13}$ and $R^{14}$ may be mutually different but are preferably the same group. A fluorine atom, a chlorine atom, a cyano group, a nitro group, an alkyl group, an alkoxy group, an alkylthio group, an amino group having a substituent, an alkylthio group and a silyl group having a substituent are preferable. Specifically, it is similar to those described as a substituent at an ortho-position of $R^5$ in the general formula (5).

R'', R''', R'''' and R''''', are arbitrary monovalent substituents, n'', n''', n'''' and n''''', are 0 to 4, and they are 0 to 10 in case of a condensed ring. R'' and R''' are preferably a fluorine atom, a chlorine atom, a cyano group, a nitro group, an alkyl group, an alkoxy group, an alkylthio group, an amino group having a substituent, an alkylthio group and a silyl group having a substituent in particularly. Adjacent groups may be bonded directly or through a bonding group. R'''' and R''''' are preferably a group similar to R'' and R''' and more preferably a fluorine atom, a chlorine atom, a cyano group, a nitro group, a haloalkyl group and a haloalkoxy group. As $M^6$, those similar to $M^4$ of the formula (5) are mentioned.

As the compound represented by the general formula (7) related to the invention, a combination mainly with a (meth) acrylate pressure-sensitive adhesive is preferable. Among these, a combination with a pressure-sensitive adhesive having an acid value of 30 mgKOH/g or less that is obtained by controlling the copolymerization rate of a monomer having a carboxyl group in the molecule of the pressure-sensitive adhesive is preferable. Among these, a pressure-sensitive adhesive exhibiting neutrality is more preferable. A combination with a pressure-sensitive adhesive having an acid value of 10 mgKOH/g or less is preferable in particular.

Among the compound represented by the general formula (7), structures below are mentioned as preferable specific examples.

EXEMPLIFIED COMPOUND 115

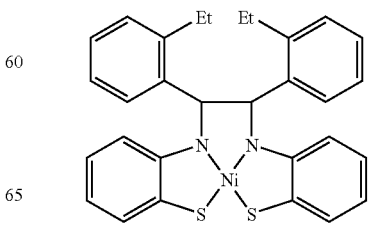

EXEMPLIFIED COMPOUND 116

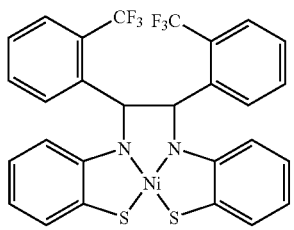

EXEMPLIFIED COMPOUND 117

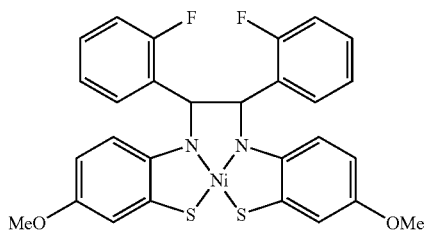

EXEMPLIFIED COMPOUND 118

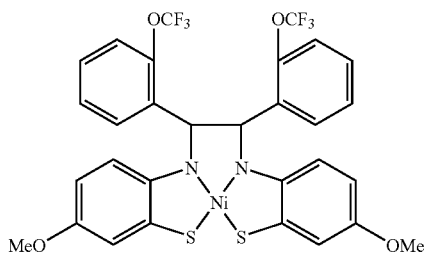

EXEMPLIFIED COMPOUND 119

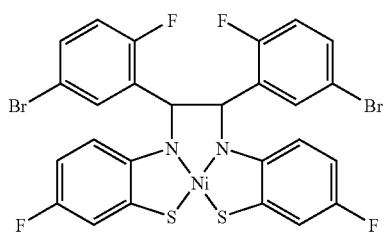

EXEMPLIFIED COMPOUND 120

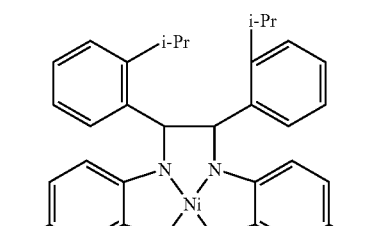

EXEMPLIFIED COMPOUND 121

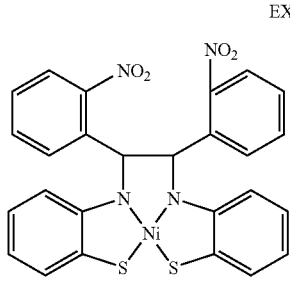

EXEMPLIFIED COMPOUND 122

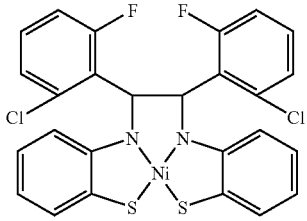

EXEMPLIFIED COMPOUND 123

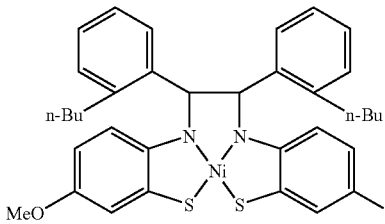

EXEMPLIFIED COMPOUND 124

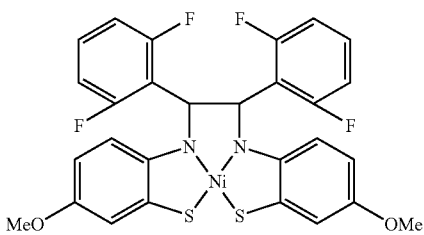

[5] Compound Represented by the General Formula (8)

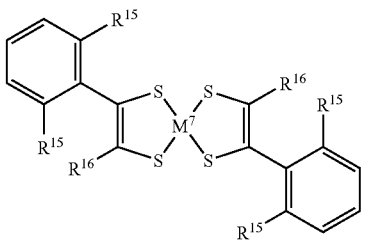

(8)

In the formula, $R^{15}$ indicates an alkyl group which may optionally have a substituent. $R^{16}$ indicates an alkyl group which may optionally have a substituent, an aryl group which may optionally have a substituent or a hydrogen atom. An aromatic ring having $R^{15}$ may optionally have an arbitrary monovalent substituent other than $R^{15}$. As $M^7$ those similar to the $M^4$ of the general formula (5) are mentioned.

Specifically, as the alkyl group of $R^{15}$, a linear chain or branched chain alkyl group having 1 to about 6 carbon atoms is mentioned. In particular, linear chain alkyl groups such as a methyl group and an ethyl group are preferable.

As the alkyl group of $R^{16}$, a linear chain or branched chain alkyl group having 1 to about 6 carbon atoms is mentioned. In particular, linear chain alkyl groups such as a methyl group, an ethyl group, an n-butyl group and an n-hexyl group are preferable.

As the aryl group of $R^{16}$, an aryl group described in of the general formula (5) is mentioned. A phenyl group which may optionally have a substituent and a thienyl group which may optionally have a substituent are preferably mentioned.

A phenyl group having $R^{15}$ and the phenyl group of a case that $R^{16}$ has a substituent may have 1 to 3 arbitrary monovalent substituents and more specifically, an alkyl group, an alkoxy group, an alkylthio group, a cyano group and a halogen atom are preferable.

As the compound represented by the general formula (8) related to the invention, a combination mainly with a (meth) acrylate pressure-sensitive adhesive is preferable. Among these, a combination with a pressure-sensitive adhesive having an acid value of 30 mgKOH/g or less that is obtained by controlling the copolymerization rate of a monomer having a carboxyl group in the molecule of the pressure-sensitive adhesive is preferable.

Among the compound represented by the general formula (8), structures below are mentioned as preferable specific examples.

EXEMPLIFIED COMPOUND 125

EXEMPLIFIED COMPOUND 126

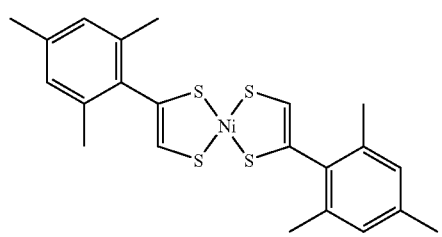

EXEMPLIFIED COMPOUND 127

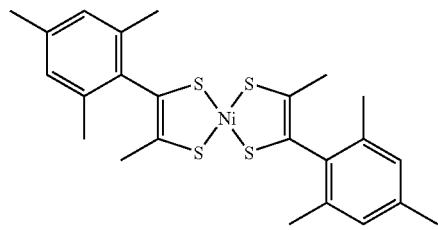

EXEMPLIFIED COMPOUND 128

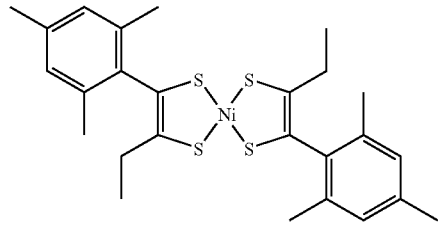

EXEMPLIFIED COMPOUND 129

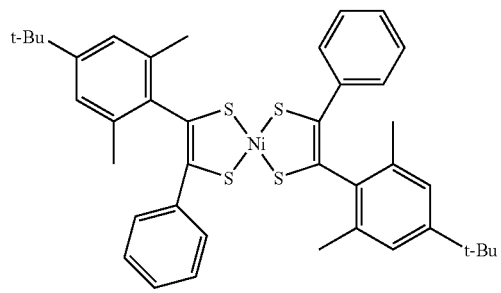

EXEMPLIFIED COMPOUND 130

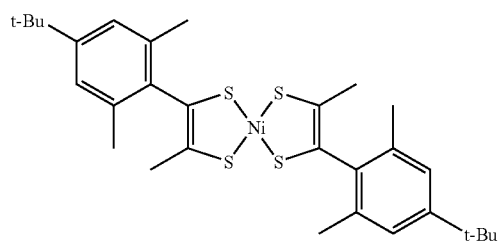

EXEMPLIFIED COMPOUND 131

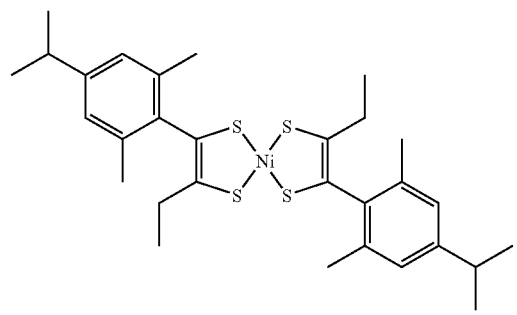

EXEMPLIFIED COMPOUND 132

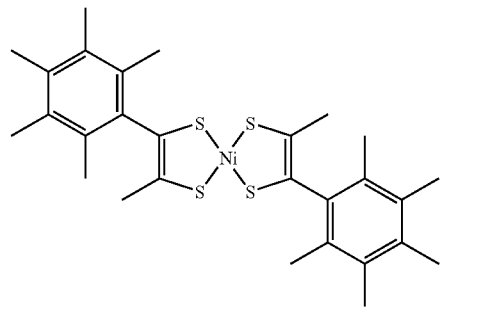

EXEMPLIFIED COMPOUND 133

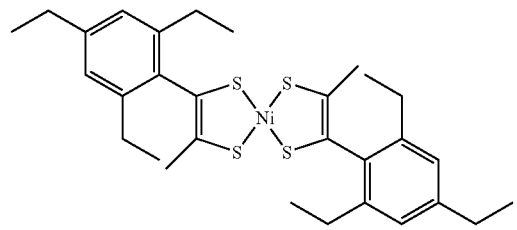

EXEMPLIFIED COMPOUND 134

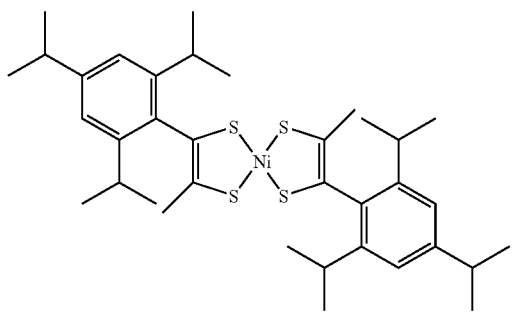

Hereat, the compounds represented by the general formulae (1) to (8) have the molecular weight of a ligand portion of usually 1000 or less and preferably 700 or less.

The molar absorption coefficient of the compounds represented by the general formulae (1) to (8) is usually 5000 or more and preferably 8000 or more.

Additionally, the solubility of the compounds represented by the general formulae (1) to (8) for a solvent selected from aromatic hydrocarbon solvents such as toluene, ether solvents such as tetrahydrofuran and dimethoxyethane and ketone solvents such as methyl ethyl ketone is usually 0.1% or more and preferably 0.5% or more.

B-2 Production Process of Near Infrared Absorbing Dye

The near infrared absorbing dye included in the pressure-sensitive adhesive of the invention has characteristics in the specific position and the specific kind of a substituent for known compounds. Consequently, the production method of the near infrared absorbing dye of the invention is similar to the production method of known compounds having basically the same skeleton structure and a raw material having a specific substituent may be used at that time. The production method is simply illustrated below.

(1) Compound of the Above-Mentioned General Formula (1)
  (1)-(i). Compound of the Above-Mentioned General Formula (2)
(a) It is a Case that X is a Nitrogen Atom Having a Substituent and Y is an Oxygen Atom
  It can be synthesized, for example, by the method described in Russ. J. Gen. Chem. Vol. 66, pp 1842 (1996).
(b) It is a Case that X is a Nitrogen Atom Having a Substituent and Y is a Sulfur Atom
  It can be synthesized, for example, by the methods described in Japanese Unexamined Patent Publication No. 63-112592 (hereinafter, referred to as JP-A-63-112592), dyes. Pig. 381 (1987) and the like.
(c) It is a Case that X is a Nitrogen Atom Having a Substituent and Y is a Nitrogen Atom
  It can be synthesized, for example, by the method described in J. Am. Chem. Soc., Vol. 88, pp 5201 (1966).
  (1)-(ii) Compound of the Above-Mentioned General Formula (3)
(a) It is a Case that X is a Sulfur Atom and Y is a Sulfur Atom
  It can be produced, for example, by a known method described in Mol. Cryst. Liq. Cryst. Vol. 56, pp 249 (1980).
(2) Compound of the Above-Mentioned General Formula (4)
  For example, substituted phenol, substituted aniline and the like are used as a starting raw material, and a hydroxyl group or an amino group is etherified or N,N-alkylated by alkyl halide in the presence of a phase-transfer catalyst (tetraalkylammonium salt) using KOH, $K_2CO_3$ or the like as a base. Acylation is carried out for the etherified product or N,N-dialkylaniline obtained, by the Friedel-Craft reaction using Lewis acid such as aluminum chloride or tin chloride. Further, its α-hydrogen is brominated with bromine in acetic acid, —Br— is converted to —SC(S)OEt (or OiPr) with potassium ethoxyxanthogenate (or potassium isopropoxyxanthogenate) and ring closure reaction is carried out using HBr and AcOH to obtain [1,3]-dithiol-2-one derivative that is a precursor. Then, a complex containing metal can be synthesized by the known method described in, for example, Mol. Cryst. Liq. Crst. (Lett.) Vol. 56, pp 249 (1980).

(3) Compound of the Above-mentioned General Formula (5)
  The compound of the above-mentioned general formula (6) and the compound of the above-mentioned general formula (3) are stirred at room temperature~temperature under refluxing for 1 hour to about 12 hours in an organic solvent (specifically, benzene solvents such as toluene and xylene; ether solvents such as THF and dimethoxyethane; halogen solvents such as chloroform and dichloromethane; and the like), to be converted to the compound (5). The compound (5) can be purified by column chromatography, gel permeation chromatography (GPC), and the like to be obtained.

(4) Compound of the Above-mentioned General Formula (6)
  It can be synthesized by the known method described in J. Mat. Chem. pp. 1861 (1994).

(5) Compound of the Above-mentioned General Formula (7)
  It can be synthesized, for example, by the method described in JP-A-2001-89492.

B-3 Adhesive Resin

The adhesive resin (pressure sensitive adhesive) used for the pressure-sensitive adhesive of the invention is a substance binding 2 same kind or different solids and is required to have 3 characteristics. The first characteristic is to be easily fluidized and to bond two solids. The second characteristic is that it has wettability to respective pasted bodies and is firmly bonded with the surface of the pasted bodies. The third characteristic is that the solids bonded through the pressure-sensitive adhesive are required not to be peeled by the destruction of the pressure-sensitive adhesive itself. Accordingly, the glass transition temperature (Tg) of the adhesive resin (pressure sensitive adhesive) is required to be low Tg so as to be good flowability. Specifically, one or more of component (resin) with Tg of 10° C. or less is preferably contained. A proportion of the component (resin) with Tg of 10° C. or less to the whole adhesive resin is preferably 1% by weight or more from the viewpoint of stickiness, more preferably 10% by weight or more, further preferably 30% by weight or more and most preferably 50% by weight or more.

In particular, Tg is preferably 10° C. or less as the whole adhesive resin.

Further, it is required to contain a functional group having affinity with the surface of the pasted body in a molecule, in order to better adhesion with the surface of the pasted body. Further, when only the adhesive resin is not adequate, it is required to prevent peeling by reacting it with a curing agent containing a multi functional group reactive with the adhesive resin to enhance the strength of the adhesive resin itself.

The acid value of the adhesive resin of the invention is usually 0 mgKOH/g or more and usually 50 mgKOH/g or less, preferably 30 mgKOH/g or less and more preferably 20 mgKOH/g or less. A hydroxyl group value is usually 0 MgKOH/g or more and usually 20 mgKOH/g or less, preferably 10 mgKOH/g or less and more preferably 5 mgKOH/g or less.

The molecular weight of the resin used is desirably high molecular weight so far as it has no influence to adhesive characteristic, but since adhesive characteristic and the like are occasionally lowered by high molecular weight, preferable molecular weight is a weight average molecular weight of 100 thousands to 10 millions and more preferably 1 million to 5 millions. Further, durability and adhesive characteristic may be adjusted by mixing a resin having different number average molecular weight.

The adhesive resin (pressure sensitive adhesive) of the invention may be any one of a rubber adhesive, a (meth) acryl adhesive, a silicone adhesive, a urethane adhesive, a polyvinyl butyral adhesive, polyvinyl ether adhesives such as an ethylene-vinyl acetate adhesive (FVA), a saturated amorphous polyester, a melamine resin and the like so far as it has practically usable adhesive strength.

Those below may be added in accordance with purpose.
(1) A phenol derivative, an amine derivative, a phosphorous derivative, an organic thioic acid salt and the like may be added as an aging resister.
(2) As a tackifier resin for improving tack property, there may be added natural resins such as rosin and dammar, modified rosin, a polyterpene resin, a terpene modified resin, an aliphatic hydrocarbon resin, a cyclopentadiene resin, an aromatic petroleum resin, a phenol resin, an alkylphenol-acetylene resin, a styrene resin, a xylene resin, a chroman indene resin, a vinyltoluene-α-methylstyrene copolymer and the like.
(3) In order to improve low temperature characteristic and the like, a phthalic acid plasticizer, a phosphoric acid ester plasticizer, an adipic acid ester plasticizer, a sebacic acid ester plasticizer, a ricinolic acid ester plasticizer, a polyester plasticizer, an epoxy plasticizer and the like may be added.

As the adhesive resin, many kinds of resins can be used, but many resins are low in the light transmission of the resins themselves, are bad in transparency, are discolored by sun light and heat and are occasionally peeled by the degeneration of the adhesive resin itself. Consequently, the adhesive resin of an acrylic resin good in optical property and superior in light resistance and heat resistance is better. Further, since an age resister, a plasticizer and the like bleed by use for a long time and performances are gradually lowered, additives shall not be used if possible.

The pressure-sensitive adhesive of the invention can be preferably used as a pressure-sensitive adhesive for an optical filter in particular, but in that case, since the transparency and light resistance of visible light are required, a (meth)acrylate pressure-sensitive adhesive is mainly used preferably.

As the (meth)acrylate pressure-sensitive adhesive, there can be used a (meth)acrylate polymer in which a (meth) acrylate alkyl ester having the carbon number of an alkyl group of 1 to 20 is a main component and a monomer containing functional groups such as acrylic acid and 2-hydroxyethyl methacrylate are copolymerized for providing functional groups in the polymer; a (meth)acryl polymer copolymerizing an oligomer with other copolymerizable monomer; and further, a (meth) acryl polymer in which a crosslinking agent reacting with the functional groups that the (meth)acryl polymer has was added. The example of the (meth)acrylic acid ester includes methyl (meth)acrylate, ethyl (meth)acrylate, propyl (meth)acrylate, n-butyl (meth) acrylate, isobutyl (meth)acrylate, t-butyl (meth)acrylate, n-pentyl (meth)acrylate, n-hexyl (meth)acrylate, 2-ethylhexyl (meth)acrylate, n-octyl (meth)acrylate, isooctyl (meth) acrylate, n-decyl (meth)acrylate, isodecyl (meth)acrylate, lauryl (meth)acrylate, stearyl (meth)acrylate and the like. The monomer having functional groups in a molecule includes acrylic acid, methacrylic acid, 2-hydroxyethyl (meth)acrylate, 4-hydroxybutyl (meth)acrylate, 2-hydroxypropyl (meth) acrylate, 6-hydroxyhexyl (meth)acrylate and the like. The crosslinking agent may have 2 or more of functional groups capable of reacting with an acrylic pressure-sensitive adhesive in a molecule and an isocyanate compound, an epoxy compound, an amine compound, an aziridine compound, a melamine compound, an urea resin and a metal chelate agent are known.

Among these, an acryl adhesive is preferable and the sheet adhesive of a pressure sensitive adhesive (pressure-sensitive adhesive) in which butyl acrylate and 2-ethylhexyl acrylate are main components is preferable from the viewpoint of easy processability. Further, the above-mentioned crosslinking agent may be added for improving durability, to be used.

C. Production Process of Pressure-sensitive Adhesive of the invention

C-1. Production Process of Pressure-Sensitive Adhesive

The pressure-sensitive adhesive of the invention is obtained by mixing the above-mentioned near infrared absorbing dye with the adhesive resin.

One or more of the near infrared absorbing dye is mixed so that the content of the near infrared absorbing dye is 10 ppm to 50% by weight for the solid content of the adhesive resin.

The pressure-sensitive adhesive of the invention may be homogeneously mixed together with the dye and the adhesive resin by a known stirrer, a kneader and the like and it may be homogeneously mixed with the adhesive resin after dispersing or dissolving the dye in a solvent, to be used.

The solvent dispersing or dissolving the dye includes halogenated aliphatic hydrocarbons such as 1,2,3-trichloropropane, tetrachloroethylene, 1,1,2,2-tetrachloroethane and 1,2-dichloroethane; alcohols such as methanol, ethanol, propanol, butanol, pentanoyl, hexanoyl, cyclohexanol and octanol; ketones such as acetone, methyl ethyl ketone and methyl isobutyl ketone; esters such as ethyl acetate, methyl propionate, methyl enanthate, methyl linolate and methyl stearate; aliphatic hydrocarbons such as cyclohexane, hexane, octane; aromatic hydrocarbons such as benzene, toluene, xylene, mesitylene, monochlorobenzene, dichlorobenzene, nitrobenzene and squalane; sulfoxides such as dimethyl sulfoxide and sulfolane; amides such as N,N'-dimethylformamide and N,N,N',N'-tetramethylurea; ethers such as tetrahydrofuran (hereinafter, called as THF), dioxane, dimethoxyethane, diethyleneglycol dimethyl ether, triethyleneglycol dimethyl ether and tertraethyleneglycol dimethyl ether; or a mixture thereof.

In order to disperse the dye in a solvent, known dispersing devices such as a paint shaker, a sand grind mill, a homomixer and an ultrasonic dispersing machine can be used.

As the mixing of the dye with the adhesive resin, all amounts at a fixed amount ratio may be mixed at one time and others may be mixed with one in stepwise. Usually, the dye and the adhesive resin are mixed at one time.

C-2 Production Process of Pressure-sensitive Adhesive Layer

The pressure-sensitive adhesive of the invention is preferably used in a sheet form or liquid form.

The pressure-sensitive adhesive containing the near infrared absorbing dye is dissolved in an organic solvent and molded by a coating device, and a sheet form pressure-sensitive adhesive layer can be formed through a drying process.

The organic solvent dissolving the pressure-sensitive adhesive includes halogenated aliphatic hydrocarbons such as 1,2, 3-trichloropropane, tetrachloroethylene, 1,1,2,2-tetrachloroethane and 1,2-dichloroethane; alcohols such as methanol, ethanol, propanol, butanol, pentanoyl, hexanoyl, cyclohexanol and octanol; ketones such as acetone, methyl ethyl ketone and methyl isobutyl ketone; esters such as ethyl acetate, methyl propionate, methyl enanthate, methyl linolate and methyl stearate; aliphatic hydrocarbons such as cyclohexane, hexan, octane; aromatic hydrocarbons such as benzene, toluene, xylene, mesitylene, monochlorobenzene, dichlorobenzene, nitrobenzene and squalane; sulfoxides such as dimethyl sulfoxide and sulfolane; amides such as N,N'-dimethylformamide and N,N,N',N'-tetramethylurea; ethers such as tetrahydrofuran (hereinafter, called as THF), dioxane, dimethoxyethane, diethyleneglycol dimethyl ether, triethyleneglycol dimethyl ether and tertraethyleneglycol dimethyl ether; or a mixture thereof.

As the coating device, a roll coater, a reverse coater, a comma coater, a lip coater, a die coater and the like is preferably used.

It is preferable to carry out process so that film thickness after drying is 1 μm to 1000 μm. It is more preferably 10 to 100 μm from the viewpoints of the maintenance of adhesion strength and the securement of hardness and the like.

It is usually molded on a film and a laminate in a film shape. Specifically, it may be coated on film substrates such as PET and TAC; the rear face of functional films such as an antireflection film and an electromagnetic shield film, glass, an acryl board, a polycarbonate board or it may be coated by sheet on an article on which a functional material has already been laminated.

After forming a pressure-sensitive adhesive layer on a film substrate, handling can be simplified by laminating a resin film or a paper to which peeling treatment was conducted by a laminator and the like.

Further, the above-mentioned pressure-sensitive adhesive is coated on the film to which peeling treatment was conducted, further, after drying, a peeling film whose peeling strength is different from the above-mentioned peeling film is laminated and thereby, it can be used as a double-sided adhesive tape having no film substrate.

Further, after the above-mentioned pressure-sensitive adhesive is coated on a film substrate by a similar method to be dried, a resin film or a paper to which peeling treatment was conducted is pasted by a laminator and the like. Further, after the above-mentioned pressure-sensitive adhesive is coated on the rear side of the film substrate to be dried, a resin film or a paper or the like to which peeling treatment was conducted is laminated by a laminator and the like and thereby, it can be used as a double-sided adhesive film with a material film.

C-3. Physical Property of Pressure-sensitive Adhesive Layer

As practically usable adhesion strength, a pressure-sensitive adhesive layer with a thickness of 25 μm is provided on a polyester film, it is pasted on a stainless board after ripening at a temperature of 23° C. for 7 days, and then, adhesion strength by 180 degree peeling method (a stretching speed of 300 mm/min and a unit of g/25 mm width) is preferably 0.1 to 10000 g/25 mm under the atmospheric conditions of a temperature of 23° C. and a humidity of 65%. In particular, the adhesion strength is preferably 1.0 g/25 mm or more in a pressure-sensitive adhesive layer that can be peeled again, more preferably 5.0 g/25 mm or more and further preferably 10 g/25 mm or more. It is preferably 10 g/25 mm or more in a pressure-sensitive adhesive layer that is not required to be peeled again, more preferably 50 g/25 mm or more and further preferably 100 g/25 mm or more.

D. Use of Pressure-sensitive Adhesive of the Invention

D-1. Near Infrared Absorption Filter

The near infrared absorption filter can be produced by forming a pressure-sensitive adhesive layer on the substrate by the pressure-sensitive adhesive containing the near infrared absorbing dye of the invention and pasting various layers in accordance with purpose. According to the invention, a near infrared absorbing layer can be excluded and the production step of an optical filter can be simplified.

(1) Production Process of Near Infrared Absorption Filter

The production process of a near infrared absorption filter of the invention includes a process of coating a coating solution containing the near infrared absorbing dye and the adhesive resin on a transparent substrate, a process of melt-kneading the near infrared absorbing dye and the adhesive resin to be molded in a film shape, etc. Among these, the process of coating a coating solution is preferable for reducing load for the near infrared absorbing dye.

The process for producing the near infrared absorption filter by coating a coating solution containing the near infrared absorbing dye and the adhesive resin on a transparent substrate is illustrated below in details.

(Transparent Substrate)

The transparent substrate composing the near infrared absorption filter of the invention is substantially transparent and is not specifically limited so far as it is a substrate with little absorbance and scattering. Its specific example includes glass, a polyolefin resin, an amorphous polyolefin resin, a polyester resin, a polycarbonate resin, a poly(meth)acrylate resin, a polystyrene, a polyvinyl chloride, a polyvinyl acetate, a polyarylate resin, a polyether sulfone resin and the like. Among these, an amorphous polyolefin resin, a polyester resin, a polycarbonate resin, a poly(meth)acrylate ester resin, a polyarylate resin and a polyether sulfone resin are preferable.

These resins can compound known additives such as antioxidants such as phenol-base and phosphorous-base, flame retardants such as halogen-base and phosphorous-base, a heat resistive age resister, an ultraviolet absorbent, a lubricant and an antistatic agent.

As the transparent substrate, there are used those molding these resins in a film shape using processes such as injection molding, T-die molding, calendar molding, and compression molding, and molding processes such as a process of dissolving them in an organic solvent and casting. The resin molded in a film shape may be stretched or non-stretched. Further, a film including different materials may be laminated.

The thickness of the transparent substrate is usually selected from a range of 10 μm to 5 nm in accordance with purpose. Further, the transparent substrate may be treated with surface processing by known methods such as corona discharge processing, flame processing, plasma processing, glow discharge processing, surface roughening processing and drug processing, and the coating of an anchor coating agent and a primer.

(Pressure-sensitive Adhesive Containing Near Infrared Absorbing Dye)

The coating solution of the pressure-sensitive adhesive containing the near infrared absorbing dye can be prepared by dissolving or dispersing the near infrared absorbing dye in a solvent together with the adhesive resin. Further, when the dye is dispersed, the near infrared absorbing dye can be usually granulated to a particle diameter of 0.1 to 3 μm using a dispersant if necessary and can be prepared by dispersing the granulated near infrared absorbing dye in a solvent together with the adhesive resin.

The concentration of all solid content of the near infrared absorbing dye that is prepared by being dissolved or dispersed in a solvent, dispersant, adhesive resin and the like is usually 5 to 50% by weight. Further, the concentration of the near infrared absorbing dye for all solid content is usually 0.1 to 50% by weight as the whole amount of the near infrared absorbing dye and preferably 0.2 to 30% by weight.

Further, as a matter of course, the concentration of the near infrared absorbing dye against the adhesive resin is also dependent on the thickness of the pressure-sensitive adhesive containing the near infrared absorbing dye; therefore when it is melt-kneaded to be molded in a film shape, it is lower than the above-mentioned concentration.

The dispersant includes a polyvinyl butyral resin, a phenoxy resin, a rosin-modified phenol resin, a petroleum resin, hardened rosin, rosin ester, maleinated rosin, a polyurethane resin and the like. Its use amount is usually 0 to 100% by weight based on the near infrared absorbing dye and preferably 0 to 70% by weight.

As the solvent, there can be used halogenated aliphatic hydrocarbons such as 1,2,3-trichloropropane, tetrachloroethylene, 1,1,2,2-tetrachloroethane and 1,2-dichloroethane; alcohols such as methanol, ethanol, propanol, butanol, pentanoyl, hexanoyl, cyclohexanol and octanol; ketones such as acetone, methyl ethyl ketone and methyl isobutyl ketone; esters such as ethyl acetate, methyl propionate, methyl enanthate, methyl linolate and methyl stearate; aliphatic hydrocarbons such as cyclohexane, hexane and octane; aromatic hydrocarbons such as benzene, toluene, xylene, mesitylene, monochlorobenzene, dichlorobenzene, nitrobenzene and squalane; sulfoxides such as dimethyl sulfoxide and sulfolane; amides such as N,N'-dimethylformamide and N,N,N',N'-tetramethylurea; ethers such as tetrahydrofuran (hereinafter, called as THF), dioxane, dimethoxyethane, diethyleneglycol dimethyl ether, triethyleneglycol dimethyl ether and tertraethyleneglycol dimethyl ether; or a mixture thereof.

The coating of the coating solution containing the near infrared absorbing dye and the adhesive resin on the transparent substrate is carried out by known coating processes such as a dipping process, a flow coat process, a spray process, a bar coat process, a gravure coat process, a roll coat process, a blade coat process and an air knife process.

The coating is carried out so that the film thickness of the pressure-sensitive adhesive containing the near infrared absorbing dye after drying is usually 0.1 µm or more and preferably 0.5 µm or more, and usually 5000 µm or less, preferably 1000 µm or less and more preferably 100 µm or less.

In particular, when it is used as the pressure-sensitive adhesive for an electronic display, high transparency is required and in point of the flatness and the processing efficiency the thickness is usually 1 µm or more, preferably 5 µm or more and more preferably 10 µm and usually 200 µm or less, preferably 100 µm or less and more preferably 50 µm.

(Ultraviolet Rays-cutting Layer)

The filter on which the pressure-sensitive adhesive containing the near infrared absorbing dye of the invention is coated can remarkably improve the light resistance of the near infrared absorption filter by synergy effect with the near infrared absorbing dye by further providing an ultraviolet rays-cutting layer. The ultraviolet rays-cutting layer may be pasted with a substrate by the pressure-sensitive adhesive of the invention, or after pasting the pressure-sensitive adhesive with other layer, the ultraviolet rays-cutting layer may be further pasted by other pressure-sensitive adhesive.

The ultraviolet rays-cutting layer is a layer capable of efficiently cutting ultraviolet rays with a wavelength of 400 nm or less and 70% or more of light with a wavelength of 350 nm can be preferably absorbed. The kind of the ultraviolet rays-cutting layer is not specifically limited but preferably, a resin film containing an ultraviolet absorbent (ultraviolet rays-cutting film) is preferable.

An ultraviolet absorbent used for the ultraviolet rays-cutting layer can be used without specifically limiting to either of an organic absorbent and an inorganic absorbent so far as it is a compound having the maximum absorption between 300 to 400 nm and efficiently cutting light at the range. The example of an organic ultraviolet absorbent includes a benzotriazole ultraviolet absorbent, a benzophenone ultraviolet absorbent, a salicylic acid ester ultraviolet absorbent, a triazine ultraviolet absorbent, a para-aminobenzoic acid ultraviolet absorbent, a cinnamate ultraviolet absorbent, an acrylate ultraviolet absorbent, a hindered amine ultraviolet absorbent and the like. An inorganic ultraviolet absorbent includes a titanium oxide ultraviolet absorbent, a zinc oxide ultraviolet absorbent, a fine particle iron oxide ultraviolet absorbent and the like. However, since the inorganic ultraviolet absorbent exits in a fine particle state in the ultraviolet rays-cutting layer, the organic ultraviolet absorbent is preferable because there is fear of damaging the efficiency of the near infrared absorption filter.

The example of the ultraviolet absorbent includes TINUVIN P, TINUVINs 120, 213, 234, 320, 326, 327, 328, 329, 384, 400 and 571 manufactured by Ciba-Geigy AG, SUMISORBs 250, 300 and 577 manufactured by Sumitomo Chemical Co., Ltd., VIOSORBs 582, 550 and 591 manufactured by Kyodo Chemical Co., Ltd., JFs-86, 79, 78 and 80 manufactured by Johoku Chemical Co., Ltd., ADEKASTABs LA-32, LA-36 and LA-34 manufactured by ADEKA CORPORATION, SEESORBs 100, 101, 101S, 102, 103, 501, 201, 202 and 612H manufactured by Shipro Kasei Kaisha Ltd., RUVAs 93, 30M and 30S manufactured by Otsuka Chemical Co., Ltd.; UVINARL 3039 manufactured by BASF AG, etc.

These ultraviolet absorbents may be used alone but may be used in combination. Further, optical bleaching agents such as UVITEXs OB and OB-P manufactured by Ciba-Geigy AG that absorb ultraviolet rays and convert their wavelengths to a visible range can be also used.

Further, as the ultraviolet rays-cutting film, a commercially available ultraviolet rays-cutting filter can be also used. For example, SC-38, SC-39 and SC-42 manufactured by Fuji Photo Film Co., Ltd., ACRYPREN manufactured by Mitsubishi Rayon Co., Ltd. and the like are mentioned. Both of the above-mentioned ultraviolet rays-cutting filters SC-39 and ACRIPREN are ultraviolet rays-cutting films that absorb 99% or more of wavelength of 350 nm.

The near infrared absorption filter of the invention providing the ultraviolet rays absorbing layer is a dye residual rate of 50% or more after the light resistance test by irradiating a Xe lamp for 160 hours, preferably 60% or more, more preferably 70% or more, further preferably 80% or more and most preferably 85% or more, and a new absorption peak does not appear at a visible light range. Hereat, the dye residual rate is determined from the degree of reduction of absorption strength before and after the test at a range of 800 to 1050 nm.

The above-mentioned near infrared absorption filter may be also used as a laminate in which it is pasted with transparent glass, other transparent resin board and the like.

Further, the near infrared absorption filter obtained by the invention can be also used for wide uses such as a hot beam shielding film, sunglasses, protective eyeglasses and a receiver for remote control other than the filter for a display panel of the invention.

D-2. Filter for Electronic Display

Further, the near infrared absorption filter including a pressure-sensitive adhesive containing the near infrared absorbing dye of the invention as a pressure-sensitive adhesive layer provides a hue correction layer (visible light absorbing layer), an electromagnetic wave-cutting layer, an antireflection layer that prevents the transcription of external light such as a fluorescent lamp on surface and an anti-glare layer (non-glare layer), if necessary, and can be used as a filter for electronic display and more preferably as a filter for a plasma display panel.

When it is used as the filter for electronic display, high transparency is required and it is coated from the viewpoints of flatness and process efficiency so that the film thickness of the pressure-sensitive adhesive containing the near infrared absorbing dye after drying is usually 1 μm or more, preferably 5 μm or more and more preferably 10 μm or more and usually 200 μm or less, preferably 100 μm or less and more preferably 50 μm or less.

Further, it is better to adjust the film thickness of the pressure-sensitive adhesive of the invention, the concentration of the near infrared absorbing dye and the like so that average light transmittance of 850 to 1100 nm is 20% or less, more preferably 15% or less and further preferably 10% or less.

The filter for electronic display of the invention can adopt usually a used constitution and production process arbitrarily except using the above-mentioned near infrared absorption filter and is not specifically limited.

A case that it is used as the filter for a plasma display panel is illustrated below as a typical example.

(1) Hue Adjusting Layer (Visible Light-absorbing Layer)

As the luminescence of the visible light of a usual plasma display, blue luminescence exists at 400 to 500 nm at which 450 nm is a peak, green luminescence exists at 500 to 550 nm at which 525 nm is a peak, and red luminescence exists at 595 nm, 610 nm and 625 nm as sharp luminescence.

Among these, since the luminescence at 595 nm among the red luminescence is luminescence that changes red at the red display of plasma display to orange color, it is usual to cut it by letting a front filter contain a dye having absorption at this range.

From these reasons, it is preferable from the viewpoint of securing the luminance of screen of a display that transmissions at 450 nm, 525 nm and 625 nm are preferably 40% or more, more preferably 50% or more and further preferably 60% or more in a plasma display use. General near infrared absorption filters including the near infrared absorption filter of the invention often take on slightly green color. When it is used for display uses such as a plasma display, its color is preferably achromatic color; therefore it is preferable that a color material having absorption at 500 to 600 nm that is the complementary color of green is contained to be colorless at a level not damaging the luminance of a display largely.

Further, there are many red components in luminescence spectrum for an electric bulb, a halogen lamp and the like. Although it seems to be achromatic color under the illumination of a fluorescent lamp, it occasionally takes on red color under the illumination of an electric bulb, a halogen lamp and the like. In such case, a color material having absorption nearby 600 to 700 nm is contained at a level at which the luminance of a display is not greatly damaged and it is preferable that it becomes achromatic color even under the illumination such as an electric bulb, a halogen lamp and the like.

Further, when it is used as a filter for a plasma display, it is preferable to carry out color calibration by containing a color material capable of absorbing neon orange color nearby 590 to 600 nm that is emitted from a plasma display.

A layer including these dyes is prepared as a separate layer from a near infrared absorbing layer and may be used as a laminate that is laminated with the near infrared absorbing layer. Further, if there is no problem in various properties such as luminescence property and durability at mixing with the near infrared absorbing layer, it may be prepared so as to be the same layer as the near infrared absorbing layer. Among these, the latter is preferable from the viewpoints of the simplification of steps, the reduction of cost and the like.

As the color material used here, general materials such as an inorganic pigment, an organic pigment, an organic dyestuff and a dye are mentioned. The inorganic pigment includes a cobalt compound, an iron compound, a chromium compound and the like. The organic pigment includes azo, indolinone, quinacridone, vat, phthalocyanine, naphthalocyanine pigments, etc. Further, an organic dyestuff and a dye include azine, azo, nickel azo complex, azomethine, anthraquinone, indigoid, indoaniline, oxazine, oxonole, xanthene, quinophthalone, cyanine, squalilium, stilbene, tetraazaporphyrin, triphenylmethane, naphthoquinone, pyrazolone, pyrromethene, dipyrromethene, benzylidene, polymethine, methine, chromium complex and the like.

The specific example of a color material having absorption at 500 to 600 nm that is the complementary color of green includes Aizen S.O.T Violet-1, Aizen S.O.T Blue-3, Aizen S.O.T Pink-1, Aizen S.O.T Red-1, Aizen S.O.T Red-2, Aizen S.O.T Red 3, Aizen Spilon Red BEH Special and Aizen Spilon Red GEH Special manufactured by Hodogaya Chemical Co., Ltd.; Kayaset Blue A-S, Kayaset Red 130, Kayaset Red A-G, Kayaset Red 2G, Kayaset Red BR, Kayaset Red SF-4G, Kayaset Red SF-B and Kayaset Violet A-R manufactured by Nippon Kayaku Co., Ltd.; DIARESIN Blue-J, DIARESIN Blue-G, DIARESIN Violet-D, DIARESIN Red H5B, DIARESIN Red S, DIARESIN Red A, DIARESIN Red K and DIARESIN Red Z.PTR63 manufactured by Mitsubishi Chemical Corporation; Violet-RB, Red-G, Pink-5BGL, Red-BL, Red-2B, Red-3GL Red-GR and Red-GA manufactured by Ciba Specialty Chemicals Co. and the like. Among these, when it is made as the same layer with a near infrared absorbing agent, nickel complex salt or chromium complex salt is preferable from the viewpoint of stability of the near infrared absorbing layer.

Further, the specific example of the color material having absorption nearby 600 to 700 nm includes Aizen S.O.T Blue-1, Aizen S.O.T Blue-2, Aizen S.O.T Blue-3, Aizen S.O.T Blue-4, Aizen Spilon Blue 2BNH and Aizen Spilon Blue GNH manufactured by Hodogaya Chemical Co., Ltd.; Kayaset Blue N, Kayaset Blue FR and KAYASORB IR-750 manufactured by Nippon Kayaku Co., Ltd.; DIARESIN Blue-H3G, DIARESIN Blue-4G, DIARESIN Blue-LR, PTB31, PBN, PGC, KBN and KBFR manufactured by Mitsubishi Chemical Corporation; Blue-GN, Blue-GL, Blue-BL, Blue-R and C.I.Solvent Blu3 63 manufactured by Ciba Specialty Chemicals Co. and the like.

The specific example of the color material having absorption at 560 to 600 nm includes organic dyestuffs described in JP-A-2000-258624, JP-A-2002-040233 and JP-A-2002-363434; organic pigments such as quinacridone described in Japanese Patent Marking 2004-505157 and JP-A-2004-233979, etc.

Further, the visible light absorbing layer can be omitted by containing further a visible light absorbing dye in the pressure-sensitive adhesive of the invention or by using the pressure-sensitive adhesive including the visible light absorbing dye separately from the pressure-sensitive adhesive of the invention, and the production process of a filter for electric display can be further simplified.

The visible light absorbing dye in case of being mixed in the pressure-sensitive adhesive is preferably pigments such as a cobalt compound, an iron compound, a chromium compound, azo, indolinone, quinacridone, vat, phthalocyanine, naphthalocyanine pigments, etc. Further, the dyestuff and dye include anthraquinone, indoaniline, tetraazaporphyrin and the like are more preferable.

The concentration of all solid content of the visible light absorbing dye, pressure-sensitive adhesive and the like is usually 5 to 50% by weight. The concentration of the visible light absorbing dye for all solid content is usually 0.001 to 50% by weight as the whole amount and preferably 0.01 to 5% by weight. However, as a matter of course, the concentration of the visible light absorbing dye against the pressure-sensitive adhesive is also dependent on the thickness of the pressure-sensitive adhesive including the visible light absorbing dye.

The coating solution of the pressure-sensitive adhesive including the visible light absorbing dye can be prepared by dissolving or dispersing the visible light absorbing dye in a solvent together with the adhesive resin. Further, when the dye is dispersed, it can be usually granulated to a particle diameter of 0.1 to 3 µm using a dispersant if necessary and can be also prepared by dispersing it in a solvent together with the adhesive resin. When the visible light absorbing dye is contained together with the near infrared light absorbing dye, addition order is not determined but it is preferable to add a dye first that requires longer dissolving time and dispersion time.

The coating of the coating solution containing the visible light absorbing dye and the adhesive resin on the transparent substrate is carried out by known coating processes such as a dipping process, a flow coat process, a spray process, a bar coat process, a gravure coat process, a roll coat process, a blade coat process and an air knife process, in like manner as the coating solution containing the near infrared absorbing dye and the adhesive resin.

The coating is carried out so that the film thickness is usually 0.1 µm or more and preferably 0.5 µm or more, and usually 1000 µm or less and preferably 500 µm or less in like manner as the coating solution containing the near infrared absorbing dye and the adhesive resin.

(2) Electromagnetic Wave-cutting Layer

The preparation of the electromagnetic wave-cutting layer used for the filter for a plasma display panel of the invention can utilize the deposition of metal oxide and the like or a spattering process or the like. It is general to use indium tin oxide (ITO) usually. Light with 1000 nm or more can be also cut by alternately laminating a dielectric material layer and a metal layer on a substrate by spattering and the like. The dielectric material layer is transparent metal oxide and the like such as indium oxide and zinc oxide and the metal layer is generally silver or silver-palladium alloy. 3 Layers, 5 layers, 7 layers, or about 11 layers is laminated from the dielectric material layer in order. As the substrate, the near infrared absorption filter of the invention may be utilized as it is and after the electromagnetic wave-cutting layer is provided on a resin film or glass by deposition or spattering, it may be pasted with the near infrared absorption filter of the invention.

(3) Antireflection Layer

As the antireflection layer used for the filter for a plasma display panel of the invention, there are a process of laminating inorganic substances such as metal oxide, fluoride, silicide, boride, carbide, nitride and sulfide by a vacuum deposition process, a spattering process, an ion plating process, an ion beam assist process and the like in a single layer or multilayer; a process of laminating resins having different refractive indices such as an acrylic resin and a fluorine resin in a single layer or multilayer, and the like in order to improve the transmittance of the filter suppressing reflection on surface. Further, a film on which an antireflection processing was carried out can be also pasted on said filter.

(4) Non-glare Layer

An anti-glare layer (non-glare layer) may be provided in addition to the above-mentioned respective layers. For the non-glare layer, there can be used a process of preparing the ink of fine powder such as silica, melamine and acryl and coating it on surface, for scattering transmitted light in order to broaden the visible angle of a filter, and the like. The curing of the ink can use thermal curing or optical curing. Further, a filter treated with non-glare can be also pasted on the filter. Further, a hard coat layer can be also provided if necessary.

D-3. Physical Property of Optical Filter Having Pressure-sensitive Adhesive of the Invention One of durability required as a filter for electronic display is light resistance. It is practically very important that there is no degradation by luminescent light from an electronic display, irradiation light and environmental light incident on the electronic display.

The indices of performance physical properties of light resistance are as below.

It is practically necessary that xenon light with irradiation intensities of 0.55 $W/m^2$ at a wavelength of 340 nm, 1.38 $W/m^2$ at a wavelength of 420 nm, 64.5 $W/m^2$ at a wavelength of 300 to 400 nm and 605.4 $W/m^2$ at a wavelength of 300 to 800 nm was irradiated for 160 hours at a state in which UV light was cut, and a proportion calculated from "Absorption intensity after irradiation÷Absorption intensity before irradiation×100" by which absorption intensity before and after irradiation was compared at the maximum absorption wavelength before irradiation is 50% or more. It is preferably 60% or more, more preferably 70% or more and further preferably 80% or more.

The wavelength determining absorption intensity is not specifically limited, but 800 to 1050 nm that can exhibit performance as the near infrared absorption of a filter for electronic display to a maximum extent is mentioned. It is more preferably mentioned that change at 350 to 800 nm being a visible light range is little because no color change is practically required in the filter for electronic display. When the visible light absorbing dye is contained in the pressure-sensitive adhesive of the invention and control function at a visible light range is provided, it is effective as the filter for electronic display that change at the maximum wavelength at which the function is exhibited is little in particular and a residual rate is large.

Those having heat resistance in addition to light resistance are effective for the reduction of deterioration during storage and conveyance. Further, it is also effective for direct pasting use to the panel of an electronic display. For example, in a plasma display panel (PDP) marked now as one of electronic displays, there has been recently proposed a direct pasting system by which a filter having the function of a front glass filter is directly pasted on a panel to design the improvement of image quality by excluding the picturing of reflection image, the simplification of steps by reduction of the number of members and light weight by exclusion of glass. Since heat from the panel is directly transmitted to the filter for electronic display itself by the system, heat resistance is desired more than a conventional system in which there is a gap between a front glass filter and the electronic display panel.

The indices of performance physical properties of heat resistance are as below.

It is practically necessary that it is exposed under the environment of a temperature of 80° C. for 250 hours and a proportion calculated from "Absorption intensity after exposure÷Absorption intensity before exposure×100" by which absorption intensity before and after exposure was compared at the maximum absorption wavelength before exposure is 50% or more. It is more preferably 80% or more It is necessary for practical use that said proportion is further preferably 50% or more in the exposure for 500 hours. It is more preferably 80% or more.

The wavelength for determining absorption intensity is similar to the light resistance.

Particularly preferable heat resistance is that it was exposed under the environment of a temperature of 90° C. for 250 hours and a proportion calculated from "Absorption intensity after exposure÷Absorption intensity before exposure×100" by which absorption intensity before and after exposure was compared at the maximum absorption wavelength before exposure is 50% or more and more preferably 80% or more.

Further, those having the heat and humidity resistance are very effective for not only durability in practical use and the improvement of reliability, but also for transportation by shipping service and the reduction of deterioration at storage. Heavy export products are transported by shipping service but a storage place nearby the bottom of a ship is environment with very high humidity.

The indices of performance physical properties of the heat and humidity resistance are as below. It is practically necessary that it was exposed under the environment of a temperature of 60° C. and a relative humidity of 90% for 250 hours and a proportion calculated from "Absorption intensity after exposure÷Absorption intensity before exposure×100" by which absorption intensity before and after exposure was compared at the maximum absorption wavelength before exposure is 50% or more. It is necessary for practical use that said proportion is further preferably 50% or more in the exposure for 500 hours. It is more preferably 80% or more.

The wavelength for determining absorption intensity is similar to the light resistance.

A function shielding near infrared rays of 800 to 1050 nm is required in addition to these durability and reliability as a filter for electronic display because light at a wavelength range of 800 to 1050 nm acts on electric equipments at surrounding such as cordless phone and video deck using a near infrared rays remote controller and becomes cause for provoking erroneous motion.

As the shielding performance for the purpose, it is preferable that spectral transmittance at the maximum wavelength is 40% or less for the sheet shaped pressure-sensitive adhesive containing the near infrared absorbing dye. 20% or less is more preferable and 10% or less is further preferable.

A plural number of the near infrared absorbing dyes may be contained for shielding the wavelength range of 800 to 1050 nm. If the spectral transmittance of 40% or less is attained by one dye, it is possible to attain the more preferable spectral transmittance of 10% or less by containing a plural number of dyes.

From above, the light resistance is required for durability necessary as the filter for electronic display. The heat resistance and heat and humidity resistance are also more preferably necessary and thereby, this is linked with the expansion of the activation system of the filter for electronic display and the expansion of practical use range in addition to practical effectiveness.

EXAMPLES

The embodiment of the invention is illustrated below according to Examples, but the invention is not limited to these so far as it does not exceed the purport.

[Production of Near Infrared Absorbing Dye]
Instance 1: Exemplified Compound 1/general Formula (1)

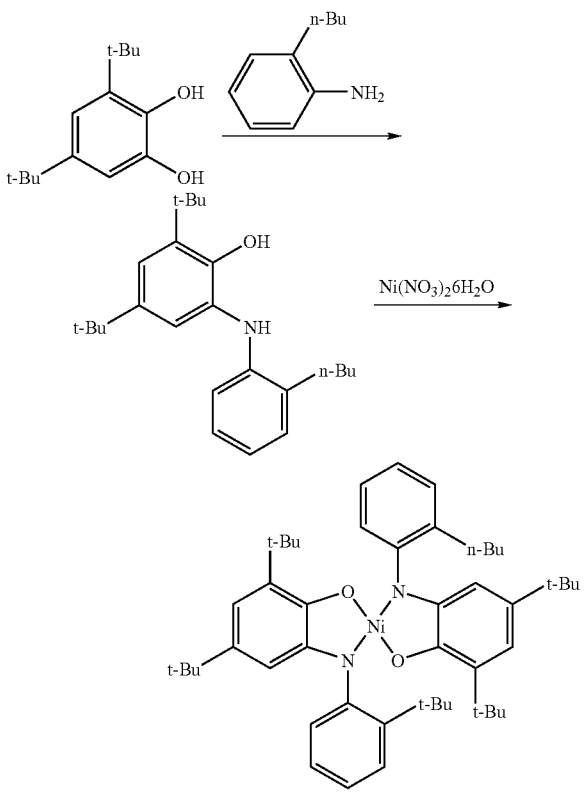

3,5-Di-tert-butylcathecol (5 g, 22.5 mmol) was dissolved in n-heptane (23 mL) at 40° C. A mix solution of 2-n-butylaniline (3.4 g, 22.5 mmol) and triethylamine (0.3 mL) was added to the reaction solution to be refluxed for 5 hours. The mixture was cooled in a refrigerator over night and recrystalized to prepare precipitate, and it was filtered and rinsed with cool n-heptane to obtain an objective aminocathecol compound at an yield of 72% (EI MS: 354).

The aminocathecol compound (5.7 g, 16.2 mmol) obtained in the above-description was dissolved in acetonitrile (200 mL) and triethylamine (4 mL) and nickel nitrate hexahydrate (2.34 g, 8.1 mmol) were added to the solution to be refluxed for 3 hours under air bubbling. The mixture was cooled to room temperature and a product was filtered. The solid obtained was rinsed with hot ethanol by suspension and filtered to obtain the exemplified compound 1 in an yield of 79%.

EI MS: 762

λmax (in THF): 881 nm

Instance 2: Exemplified Compound 106/general Formula (6)

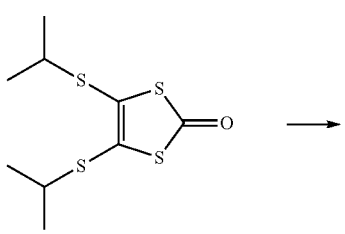

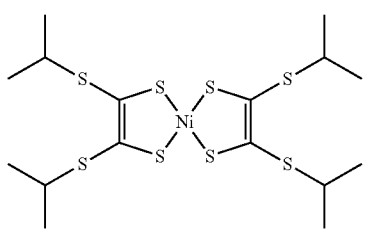

8.3 mL (2.2 equivalent) of 1 M sodium methoxide-methanol solution was added to 1.0 g (3.75 mmol) of 4,5-bis(sec-propylthio)-1,3-dithiol-2-on obtained by a known method and the mixture was stirred at 25° C. for 30 min. 0.5 equivalent nickel chloride hexahydrate that was dissolved in 1 mL of methanol was added thereto to be further stirred at 25° C. for 30 min. To the mix solution, 50 mL of toluene and 10 g of silica gel (SILICAGEL C300 (trade name) manufactured by WAKO Co.) were added and reaction was carried out by stirring for 7 hours while bubbling air. The green reaction solution obtained was filtered, silica gel was filtered and then, the filtrate was concentrated after rinsing with water. Thereto, 25 mL of methanol was added, the mixture was rinsed by suspension and the solid was filtered to obtain the exemplified compound 106 at an yield of 78%.

EI MS: 536

λmax (in THF): 1001 nm

Instance 3: Exemplified Compound 32/general Formula (4)

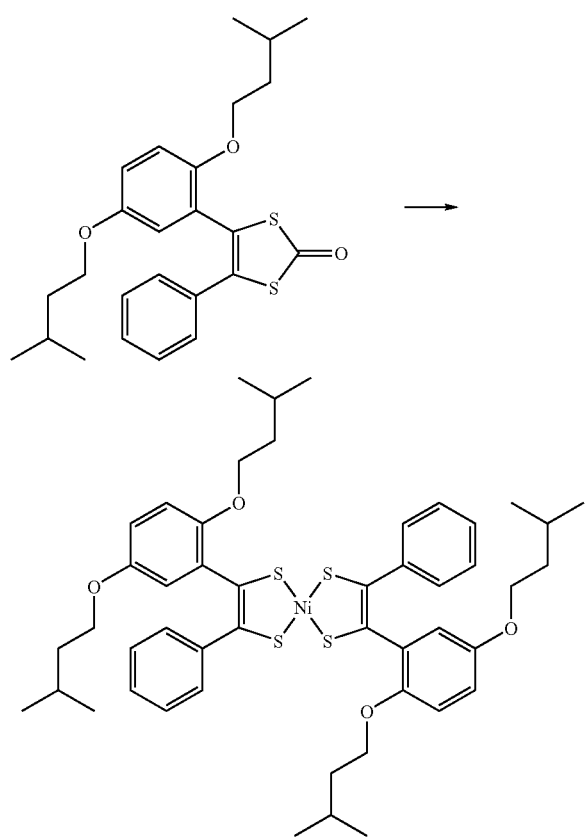

4.7 g (10.5 mmol) of [1,3]dithiol-2-one derivative obtained by a known method was dissolved in 30 mL of THF and 1 M sodium methoxide-methanol solution (22 mL) was added thereto to stirred at 25° C. for 3 hours. To the reaction solution, 0.5 equivalent nickel chloride hexahydrate that was dissolved in 5 mL of methanol was added to be further stirred at 25° C. for 30 min. The reaction solution was poured into the mix solvent of 90 mL of toluene and 12 mL of acetic acid to be stirred at 40° C. for 3 hours while bubbling air. The reaction solution was concentrated, a crude product obtained was dissolved in chloroform and rinsed with water, and the organic layer was concentrated. Thereto, 50 mL of methanol was added, the mixture was rinsed by suspension and the solid was filtered to obtain 3.8 g (yield: 82%) of the exemplified compound 32.

EI MS: 888

λmax (in THF): 858 nm

Instance 4: Exemplified Compound 34/general Formula (4)

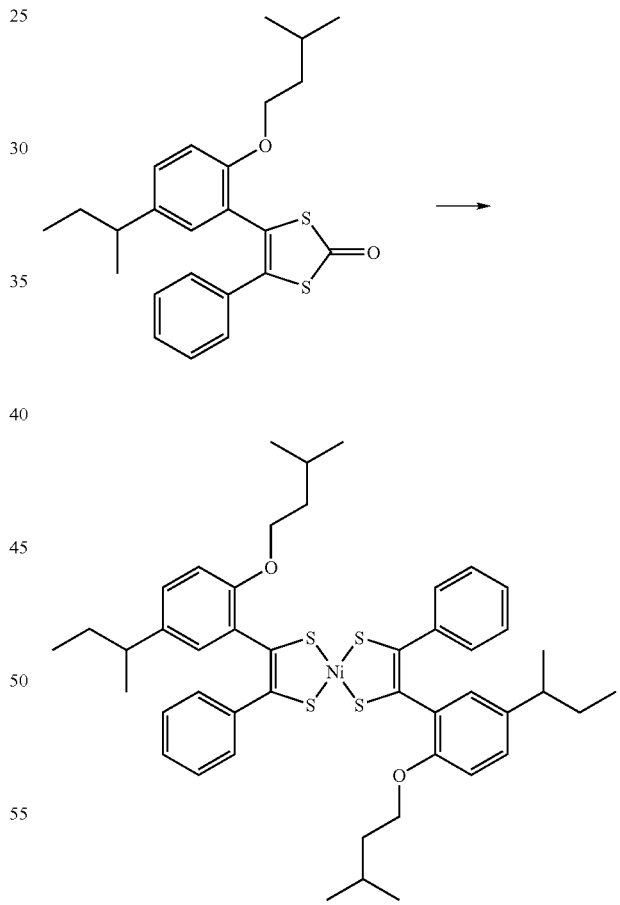

Reaction was carried out in accordance with Instance 3 using 4.05 g (9.82 mmol) of [1,3]dithiol-2-one derivative obtained by a known method to obtain 3.2 g (yield: 79%) of the exemplified compound 34.

EI MS: 828

λmax (in THF): 855 nm

Instance 5: Exemplified Compound 31/general Formula (4)

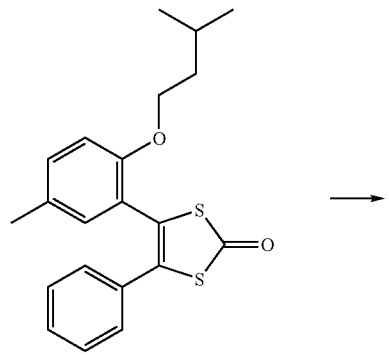

→

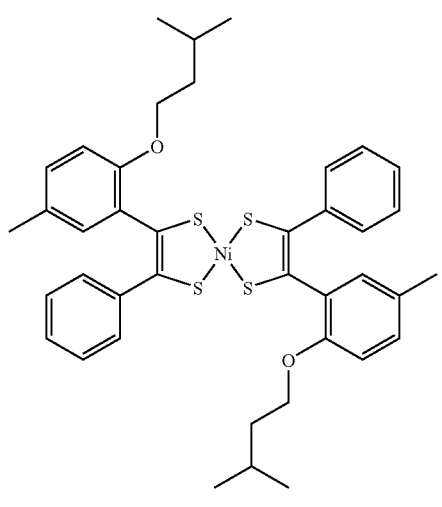

Reaction was carried out in accordance with Instance 3 using 2.6 g (7.03 mmol) of [1,3]dithiol-2-one derivative obtained by a known method to obtain 2.2 g (yield: 84%) of the exemplified compound 31.

EI MS: 744

λmax (in THF): 850 nm

Instance 6: Exemplified Compound 54/general Formula (4)

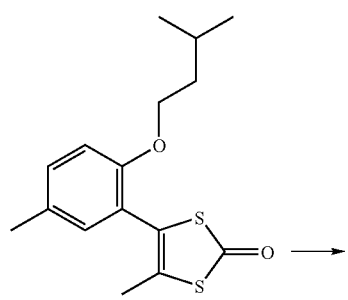

→

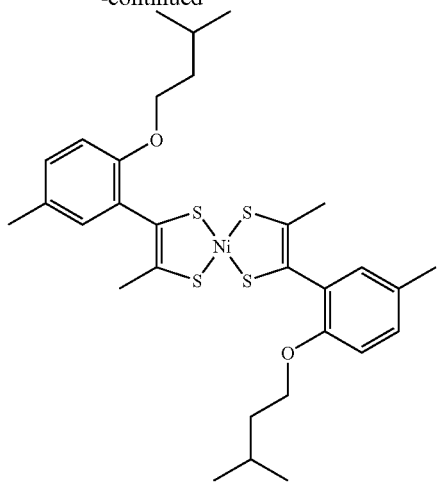

Reaction was carried out in accordance with Instance 3 using 3.55 g (11.5 mmol) of [1,3]dithiol-2-one derivative obtained by a known method to obtain 3.0 g (yield: 85%) of the exemplified compound 54.

EI MS: 620

λmax (in THF): 793 nm

Instance 7: Exemplified Compound 72/general Formula (4) (Precursor)

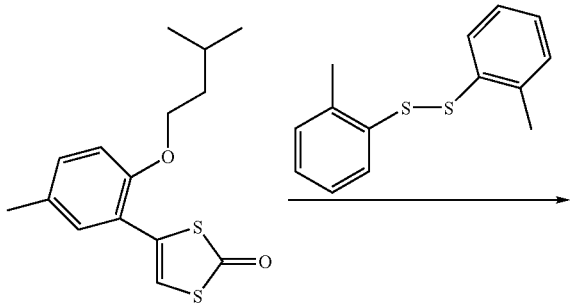

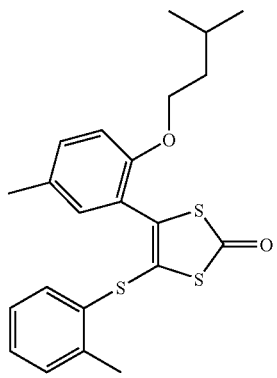

1.94 g (6.57 mmol) of 4-phenyl-[1,3]dithiol-2-one derivative and 2.43 g (9.86 mmol) of substituted diphenyldisulfide were dissolved in anhydrous THF (13 mL) to be cooled to −78° C. To the reaction solution, the hexane solution (1M, 7.4 mL) of LiN(TMS)$_2$ (TMS: trimethylsilyl) was added for 2 min. The temperature of the reaction solution was raised to 0° C. over 2 hours and poured into ice-saturated ammonium chloride aqueous solution. The mixture was extracted with ethyl acetate, and the organic layer was rinsed with saturated saline, then dried on anhydrous sodium sulfate, filtered and concentrated. The crude product obtained was purified by column chromatography (developing solvent: 3% ethyl acetate/hexane) to obtain 4-phenyl-5-phenylthio-[1,3]dithiol-2-one derivative at an yield of 95%.

EI MS: 417

(Near Infrared Absorbing Dye)

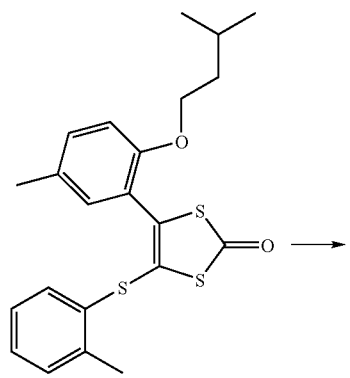

Into a solution in which 2.6 g (6.25 mmol) of 4-phenyl-5-phenylthio-[1,3]dithiol-2-one derivative was dissolved in 18 mL of THF, 1 M sodium methoxide-methanol solution (13 mL) was added to stirred at 25° C. for 30 min. To the reaction solution, 0.5 equivalent nickel chloride hexahydrate that was dissolved in 5 mL of methanol was added to be further stirred at 25° C. for 30 min. The mix solution was poured into the mix solvent of 60 mL of toluene and 7 mL of acetic acid to be stirred for 5 hours while bubbling air. The solvent was concentrated and a crude product obtained was rinsed with methanol by suspension and filtered. The precipitate was rinsed with ethyl acetate again by suspension and filtered to obtain 1.9 g (yield: 74%) of the exemplified compound 72.

EI MS: 836

λmax (in THF): 906 nm

Instance 8: Exemplified Compound 73/general Formula (4) (Precursor)

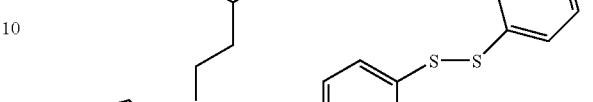

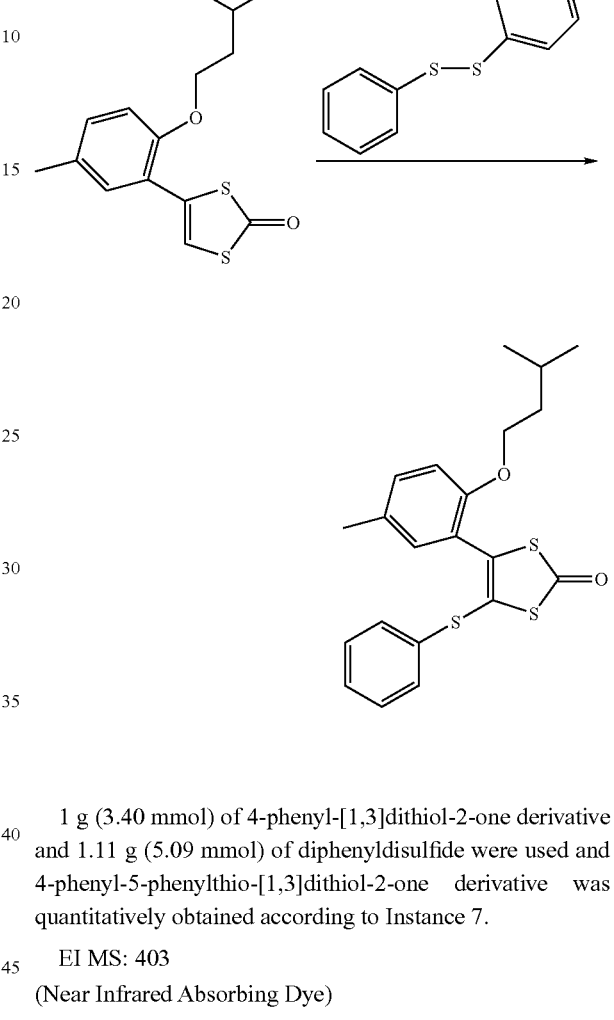

1 g (3.40 mmol) of 4-phenyl-[1,3]dithiol-2-one derivative and 1.11 g (5.09 mmol) of diphenyldisulfide were used and 4-phenyl-5-phenylthio-[1,3]dithiol-2-one derivative was quantitatively obtained according to Instance 7.

EI MS: 403

(Near Infrared Absorbing Dye)

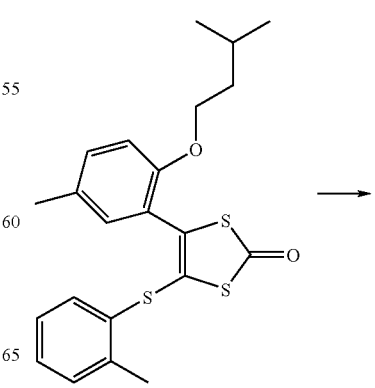

-continued

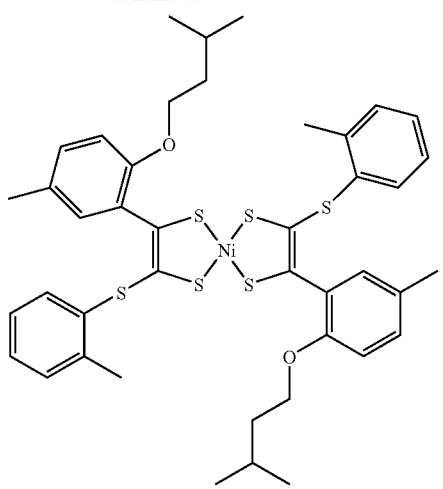

1.46 g (3.63 mmol) of 4-phenyl-5-phenylthio-[1,3]dithiol-2-one derivatives was used and 1.1 g (yield: 77%) of the exemplified compound 73 was obtained according to Instance 7.

EI MS: 808

λmax (in THF): 897 nm

Instance 9: Exemplified Compound 70/general Formula (4) (Precursor)

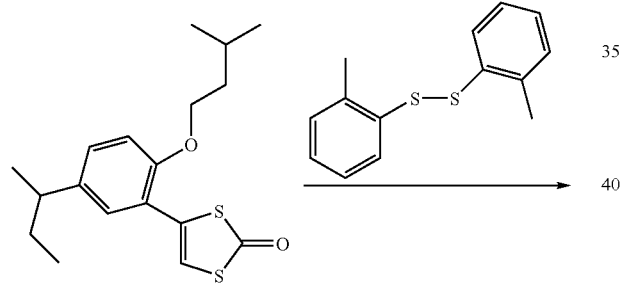

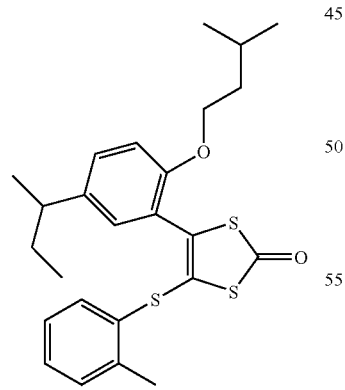

2.1 g (6.18 mmol) of 4-phenyl-[1,3]dithiol-2-one derivative and 2.28 g (9.25 mmol) of substituted diphenyldisulfide were used and 4-phenyl-5-phenylthio-[1,3]dithiol-2-one derivative was obtained according to Instance 7 at an yield of 88%.

EI MS: 459

(Near Infrared Absorbing Dye)

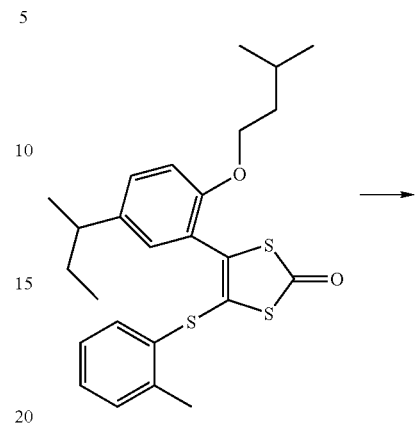

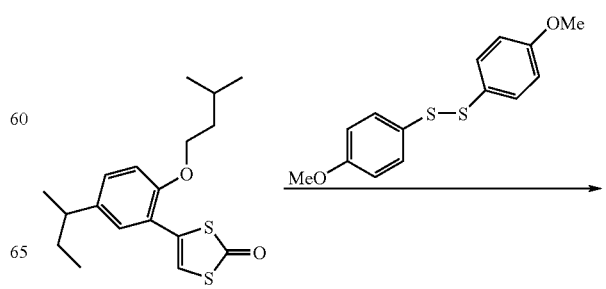

2.5 g (5.46 mmol) of 4-phenyl-5-phenylthio-[1,3]dithiol-2-one derivative was used and 2.0 g (yield: 81%) of the exemplified compound 70 was obtained according to Instance 7.

EI MS: 920

λmax (in THF): 903 nm

Instance 10: Exemplified Compound 69/general Formula (4) (Precursor)

83

-continued

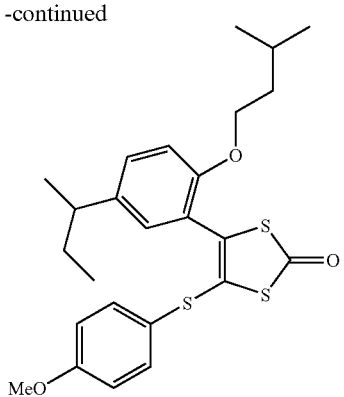

2.0 g (5.94 mmol) of 4-phenyl-[1,3]dithiol-2-one derivative and 2.48 g (8.92 mmol) of substituted diphenyldisulfide were used and 4-phenyl-5-phenylthio-[1,3]dithiol-2-one derivative was quantitatively obtained according to Instance 7.

EI MS: 475

(Near Infrared Absorbing Dye)

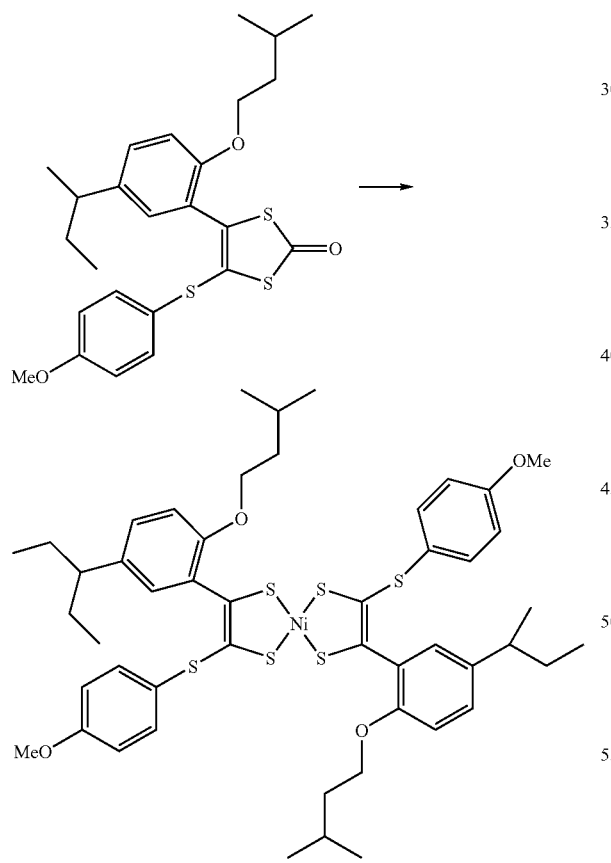

2.82 g (5.94 mmol) of 4-phenyl-5-phenylthio-[1,3]dithiol-2-one derivative was used and 2.1 g (yield: 76%) of the exemplified compound 69 was obtained according to Instance 7.

EI MS: 952

λmax (in THF): 914 nm

84

Instance 11: Exemplified Compound 125/general Formula (8)

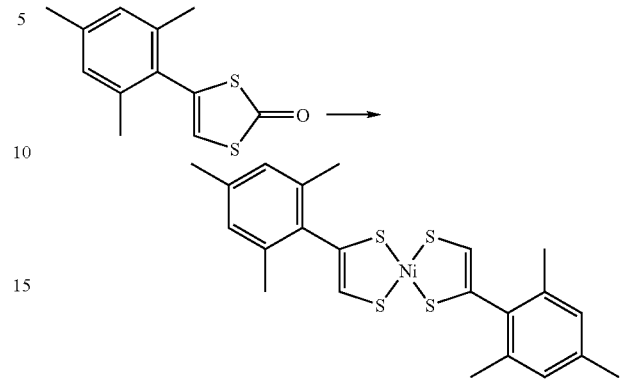

Reaction was carried out according to Instance 3 using 4.43 g (18.7 mmol) of [1,3]dithiol-2-one derivative obtained by a known method, to obtain 3.2 g (yield: 72%) of the exemplified compound 125.

EI MS: 476

λmax (in THF): 762 nm

Instance 12: Exemplified Compound 76/general Formula (5)

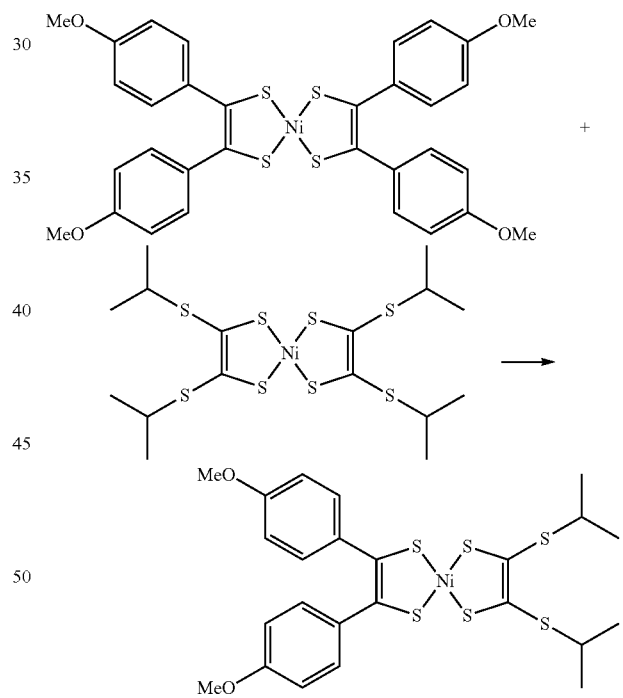

The above-mentioned compound X (1.0 g, 1.5 mmol) and the exemplified compound 106 (0.81 g, 1.5 mmol) were added in toluene (15 mL) to be refluxed for 5 hours. After toluene was removed, the mixture was extracted with chloroform and the organic layer was rinsed with saturated saline. After the organic layer was dried on anhydrous sodium sulfate, it was concentrated to obtain a crude product. The crude product was purified by silica gel column chromatography and further rinsed with methanol by suspension to obtain 0.65 g (yield: 72%) of the exemplified compound 76.

EI MS: 600

λmax (m, in THF): 946 nm

[Pressure-sensitive Adhesive Containing Near Infrared Absorbing Dye]

Then, the pressure-sensitive adhesive was produced using the near infrared absorbing dye thus obtained and evaluation was carried out.

(Production Process of Pressure-Sensitive Adhesive)

The pressure-sensitive adhesives containing the near infrared absorbing dyes of Examples and Comparative Examples were prepared as follow.

Compounds having near infrared absorbing performance were added to 2.5 g of THF to be stirred and 10 g of acryl tackiness main agent was added therein and adequately stirred to be dissolved. The specified amount of the pressure-sensitive adhesive was added therein and adequately stirred. Foam entangled a stirring was removed by applying ultrasonic wave or by leaving it alone to collect the foam upward.

(Formation of Pressure-sensitive Adhesive Layer)

Then, the pressure-sensitive adhesive containing these near infrared absorbing dye s was coated at a thickness of 125 μm on a film with a thickness of 100 μm made of polyethylene terephthalate by a Baker type applicator (manufactured by Tester Sangyo Co., Ltd.) and dried at 100° C. for 2 min to form a pressure-sensitive adhesive layer with a thickness of 25 μm including the near infrared absorbing dye.

Then, a film with a thickness of 100 μm made of polyethylene terephthalate was clamped on the pressure-sensitive adhesive layer side including the near infrared absorbing dye with a roller to obtain the test piece of a laminate sandwiching the pressure-sensitive adhesive layer including the near infrared absorbing dye.

(Evaluation Method)

Then, evaluation 1 was carried out for said test piece and successively evaluations 2 to 5 were conducted.

Absorption intensity before and after respective tests was measured at evaluation.

<Method of Measuring the Absorption Intensity>

In order to measure the absorption intensity, firstly, transmittance was obtained by spectral transmission spectrum measurement (Uv-3150 manufactured by Shimadzu Corporation, measured by integrating sphere system) and absorption intensities of respective test pieces at the maximum absorption wavelength were calculated. Further, when a plural number of dyes were mixed, absorption intensities of respective dyes at the maximum absorption wavelength were obtained.

<Evaluation 1: Ripening Test>

Test pieces were left alone under the conditions of a temperature of 24° C. and a humidity of 45% for 7 days or more.

Absorption intensity after ripening for absorption intensity before ripening was determined.

<Evaluation 2: Light Resistance Test>

UV cutting filters (SC-39, manufactured by Fuji Photo Films Co., Ltd.) were mounted on test pieces and they were irradiated for 160 hours by the ATLAS Wheather-Ometer Ci4000 (manufactured by Toyo Seiki Seisaku-sho Ltd.) that was a xenon light resistance tester The ATLAS wheatherometer was irradiation intensities of 0.55 W/m$^2$ at a wavelength of 340 nm, 1.38 W/m$^2$ at a wavelength of 420 nm, 64.5 W/m$^2$ at a wavelength of 300 to 400 nm and 605.4 W/m$^2$ at a wavelength of 300 to 800 nm and the temperature of a black panel was controlled at 58° C. and humidity was controlled at 50% RH.

Absorption intensity after light resistance test for absorption intensity before light resistance test was determined.

<Evaluation 3: Heat and Humidity Resistance Test>

Test pieces were charged in a constant temperature and constant humidity bath at 60° C. and 90% RH and exposed for 250 hours and 500 hours. Absorption intensity after heat and humidity resistance test for absorption intensity before heat and humidity resistance test was determined.

<Evaluation 4: Heat Resistance Test 1>

Test pieces were charged in a constant temperature bath at 80° C. and exposed for 250 hours and 500 hours.

Absorption intensity after heat resistance test for absorption intensity before heat resistance test was determined.

<Evaluation 5: Heat Resistance Test 2>

Test pieces were charged in a constant temperature bath at 90° C. and exposed for 250 hours.

Absorption intensity after heat resistance test for absorption intensity before heat resistance test was determined Example 1

A pressure-sensitive adhesive layer containing 25 mg of the exemplified compound 32 as a near infrared absorbing dye, SK DYNE 1811L (manufactured by Soken Chemical & Engineering Co., Ltd.) as an acrylic adhesive resin and an isocyanate curing agent L-45 (manufactured by Soken Chemical & Engineering Co., Ltd.) as a curing agent was provided to prepare a test piece. The maximum absorption wavelength was 862 nm.

The SK DYNE 1811L (manufactured by Soken Chemical & Engineering Co., Ltd.) has an acid value of 0 mgKOH/g and a hydroxyl group value of 0.2 mgKOH/g The pressure-sensitive adhesive layer with a thickness of 25 μm was provided on a polyester film, it was pasted on a stainless plate after ripening at a temperature of 23° C. for 7 days and then, adhesion strength was measured by a 180 degree peeling method (a stretching speed of 300 mm/min and a unit of g/25 mm width) under the atmospheric conditions of a temperature of 23° C. and a humidity of 65%. The adhesion strength was 850 g/25 mm width.

Example 2

A pressure-sensitive adhesive layer containing 25 mg of the exemplified compound 32 as a near infrared absorbing dye, SK DYNE 2094 (manufactured by Soken Chemical & Engineering Co., Ltd.) as an acrylic adhesive resin and an epoxy curing agent E-AX (manufactured by Soken Chemical & Engineering Co., Ltd.) as a curing agent was provided to prepare a test piece. The maximum absorption wavelength was 866 nm.

(Measurement of Adhesion Strength)

The SK DYNE 2094 (manufactured by Soken Chemical & Engineering Co., Ltd.) has an acid value of 6.9 mgKOH/g and a hydroxyl group value of 0 mgKOH/g. The pressure-sensitive adhesive layer with a thickness of 25 μm was provided on a polyester film, it was pasted on a stainless plate after ripening at a temperature of 23° C. for 7 days and then, adhesion strength was measured by a 180 degree peeling method (a stretching speed of 300 mm/min and a unit of g/25 mm width) under the atmospheric conditions of a temperature of 23° C. and a humidity of 65%. The adhesion strength was 1000 g/25 mm width.

Example 3

A pressure-sensitive adhesive layer containing 25 mg of the exemplified compound 32 as a near infrared absorbing dye, SK DYNE 909A (manufactured by Soken Chemical & Engineering Co., Ltd.) as an acrylic adhesive resin and an isocyanate curing agent L-45 (manufactured by Soken Chemical & Engineering Co., Ltd.) as a curing agent was provided to prepare a test piece. The maximum absorption wavelength was 862 nm.

(Measurement of Adhesion Strength)

The SK DYNE 909A (manufactured by Soken Chemical & Engineering Co., Ltd.) has an acid value of 17.2 mgKOH/g and a hydroxyl group value of 0 mgKOH/g. The pressure-sensitive adhesive layer with a thickness of 25 μm was provided on a polyester film, it was pasted on a stainless plate after ripening at a temperature of 23° C. for 7 days and then, adhesion strength was measured by a 180 degree peeling method (a stretching speed of 300 mm/min and a unit of g/25 mm width) under the atmospheric conditions of a temperature of 23° C. and a humidity of 65%. The adhesion strength was 1150 g/25 mm width.

Example 4

A pressure-sensitive adhesive layer was provided in like manner as Example 1 using the exemplified compound 31 as a near infrared absorbing dye, to prepare a test piece. The maximum absorption wavelength was 855 nm.

Example 5

A pressure-sensitive adhesive layer was provided in like manner as Example 2 using the exemplified compound 31 as a near infrared absorbing dye, to prepare a test piece. The maximum absorption wavelength was 857 nm.

Example 6

A pressure-sensitive adhesive layer was provided in like manner as Example 3 using the exemplified compound 31 as a near infrared absorbing dye, to prepare a test piece. The maximum absorption wavelength was 856 nm.

Example 7

A pressure-sensitive adhesive layer was provided in like manner as Example 1 using the exemplified compound 40 as a near infrared absorbing dye, to prepare a test piece. The maximum absorption wavelength was 852 nm.

Example 8

A pressure-sensitive adhesive layer was provided in like manner as Example 3 using the exemplified compound 40 as a near infrared absorbing dye, to prepare a test piece. The maximum absorption wavelength was 855 nm.

Example 9

A pressure-sensitive adhesive layer was provided in like manner as Example 3 using the exemplified compound 106 as a near infrared absorbing dye, to prepare a test piece. The maximum absorption wavelength was 1010 nm.

Example 10

A pressure-sensitive adhesive layer was provided in like manner as Example 1 using the exemplified compound 73 as a near infrared absorbing dye, to prepare a test piece. The maximum absorption wavelength was 905 nm.

Example 11

A pressure-sensitive adhesive layer was provided in like manner as Example 3 using the exemplified compound 73 as a near infrared absorbing dye, to prepare a test piece. The maximum absorption wavelength was 897 nm.

Example 12

A pressure-sensitive adhesive layer was provided in like manner as Example 3 using the exemplified compound 70 as a near infrared absorbing dye, to prepare a test piece. The maximum absorption wavelength was 903 nm.

Example 13

A pressure-sensitive adhesive layer was provided in like manner as Example 3 using the exemplified compound 72 as a near infrared absorbing dye, to prepare a test piece. The maximum absorption wavelength was 906 nm.

Example 14

A pressure-sensitive adhesive layer was provided in like manner as Example 3 using the exemplified compound 69 as a near infrared absorbing dye, to prepare a test piece. The maximum absorption wavelength was 914 nm.

Example 15

A pressure-sensitive adhesive layer was provided in like manner as Example 3 using the exemplified compound 1 as a near infrared absorbing dye, to prepare a test piece. The maximum absorption wavelength was 887 nm.

Example 16

A pressure-sensitive adhesive layer was provided in like manner as Example 3 using the exemplified compound 117 as a near infrared absorbing dye, to prepare a test piece. The maximum absorption wavelength was 828 nm.

Example 17

A pressure-sensitive adhesive layer was provided in like manner as Example 3 using the exemplified compound 125 as a near infrared absorbing dye, to prepare a test piece. The maximum absorption wavelength was 762 nm.

Example 18

A pressure-sensitive adhesive layer was provided in like manner as Example 3 using the exemplified compound 56 as a near infrared absorbing dye, to prepare a test piece. The maximum absorption wavelength was 838 nm.

Example 19

A pressure-sensitive adhesive layer was provided in like manner as Example 3 using the exemplified compound 81 as a near infrared absorbing dye, to prepare a test piece. The maximum absorption wavelength was 919 nm.

Example 20

A pressure-sensitive adhesive layer was provided in like manner as Example 3 using the exemplified compound 76 as a near infrared absorbing dye, to prepare a test piece. The maximum absorption wavelength was 953 nm.

Example 21

A pressure-sensitive adhesive layer was provided in like manner as Example 3 using the exemplified compound 103 as a near infrared absorbing dye, to prepare a test piece. The maximum absorption wavelength was 913 nm.

Example 22

A pressure-sensitive adhesive layer was provided in like manner as Example 3 using 25 mg of the exemplified compound 32 and 25 mg of the exemplified compound 76 as a near infrared absorbing dye, to prepare a test piece. The performance evaluation of absorption intensities was carried out at the respective maximum absorption wavelengths at 862 nm and 953 nm of the two compounds.

Example 23

A pressure-sensitive adhesive layer was provided in like manner as Example 3 using 25 mg of the exemplified compound 31 and 25 mg of the exemplified compound 76 as a near infrared absorbing dye, to prepare a test piece. The performance evaluation of absorption intensities was carried out at the respective maximum absorption wavelengths at 856 nm and 953 nm of the two compounds.

Example 24

A pressure-sensitive adhesive layer was provided in like manner as Example 3 using 25 mg of the exemplified compound 40 and 25 mg of the exemplified compound 76 as a near infrared absorbing dye, to prepare a test piece. The performance evaluation of absorption intensities was carried out at the respective maximum absorption wavelengths at 855 nm and 953 nm of the two compounds.

Example 25

A pressure-sensitive adhesive layer was provided in like manner as Example 3 using 25 mg of the exemplified compound 32 and 25 mg of the exemplified compound 106 as a near infrared absorbing dye, to prepare a test piece. The performance evaluation of absorption intensities was carried out at the respective maximum absorption wavelengths at 862 nm and 1010 nm of the two compounds.

Example 26

A pressure-sensitive adhesive layer was provided in like manner as Example 3 using 25 mg of the exemplified compound 40 and 25 mg of the exemplified compound 106 as a near infrared absorbing dye, to prepare a test piece. The performance evaluation of absorption intensities was carried out at the respective maximum absorption wavelengths at 852 nm and 1010 nm of the two compounds.

Example 27

A pressure-sensitive adhesive layer was provided in like manner as Example 3 using 28 mg of the exemplified compound 32, 27 mg of the exemplified compound 76 and 26 mg of MICROLIS Magenta 5B-K (manufactured by Ciba Specialty Chemicals Co.) as a near infrared absorbing dye, to prepare a test piece. The performance evaluation of absorption intensities was carried out at the respective maximum absorption wavelengths at 583 nm, 862 nm and 953 nm of the three compounds.

Example 28

A pressure-sensitive adhesive layer was provided in like manner as Example 3 using 28 mg of the exemplified compound 32, 27 mg of the exemplified compound 76 and 10 mg of tetra-t-butylazaporphyrin copper complex that was obtained by being synthesized using copper chloride after synthesizing non metal tetra-t-butylazaporphyrin by the method of "Phthalocyanine-Chemistry and Function (IPC Inc.)" p. 29 and pp 39-40, as a near infrared absorbing dye, to prepare a test piece. The performance evaluation of absorption intensities was carried out at the respective maximum absorption wavelengths at 585 nm, 862 nm and 953 nm of the three compounds.

Comparative Example 1

A pressure-sensitive adhesive layer was provided in like manner as Example 1 using 21 mg of the compound R shown in the under-mentioned formula as a near infrared absorbing dye, to prepare a test piece. The maximum absorption wavelength was 862 nm.

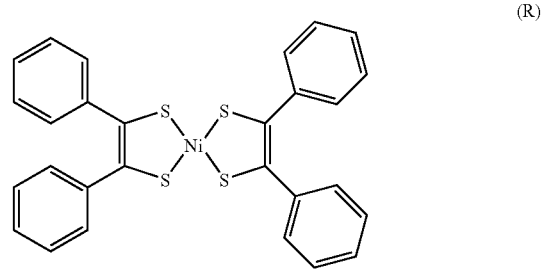

(R)

Comparative Example 2

A pressure-sensitive adhesive layer was provided in like manner as Example 3 using 21 mg of the same compound R as Comparative Example 1 as a near infrared absorbing dye, to prepare a test piece. The maximum absorption wavelength was 854 nm.

Comparative Example 3

A pressure-sensitive adhesive layer was provided in like manner as Example 1 using 25 mg of naphthalocyanine EX906B (manufactured by Nippon Shokubai Co., Ltd.) as a near infrared absorbing dye, to prepare a test piece. The maximum absorption wavelength was 924 nm.

Comparative Example 4

A pressure-sensitive adhesive layer was provided in like manner as Example 3 using 25 mg of the same compound as Comparative Example 3 as a near infrared absorbing dye, to prepare a test piece. The maximum absorption wavelength was 927 nm.

Comparative Example 5

A pressure-sensitive adhesive layer was provided in like manner as Example 3 using 16 mg of 07975-62 manufactured by Kanto Chemical Co., Ltd. of a phthalocyanine compound as a near infrared absorbing dye, to prepare a test piece. The maximum absorption wavelength was 735 nm.

Comparative Example 6

A pressure-sensitive adhesive layer was provided in like manner as Example 1 using 21 mg of 39317-7 manufactured by Sigma-Aldrich Chemicals Co. of a naphthalocyanine compound as a near infrared absorbing dye, to prepare a test piece. The maximum absorption wavelength was 841 nm.

Comparative Example 7

A pressure-sensitive adhesive layer was provided in like manner as Example 3 using 21 mg of the same compound as Comparative Example 6 as a near infrared absorbing dye, to prepare a test piece. The maximum absorption wavelength was 841 nm.

Comparative Example 8

A pressure-sensitive adhesive layer was provided in like manner as Example 1 using 25 mg of 43296-2 manufactured by Sigma-Aldrich Chemicals Co. of a naphthalocyanine compound as a near infrared absorbing dye, to prepare a test piece. The maximum absorption wavelength was 743 nm.

Comparative Example 9

A pressure-sensitive adhesive layer was provided in like manner as Example 3 using 25 mg of the same compound as Comparative Example 8 as a near infrared absorbing dye, to prepare a test piece. The maximum absorption wavelength was 741 nm.

Comparative Example 10

A pressure-sensitive adhesive layer was provided in like manner as Example 3 using 21 mg of 41207-4 manufactured by Sigma-Aldrich Chemicals Co. of a naphthalocyanine compound as a near infrared absorbing dye, to prepare a test piece. The maximum absorption wavelength was 868 nm.

Comparative Example 11

A pressure-sensitive adhesive layer was provided in like manner as Example 1 using 13 mg of IRG068 (manufactured by Nippon Kayaku Co., Ltd.) of an immonium compound as a near infrared absorbing dye, to prepare a test piece. The maximum absorption wavelength was 976 nm.

Comparative Example 12

A pressure-sensitive adhesive layer was provided in like manner as Example 3 using 13 mg of IRG068 (manufactured by Nippon Kayaku Co., Ltd.) of an immonium compound as a near infrared absorbing dye, to prepare a test piece. The maximum absorption wavelength was 1092 nm.

Comparative Example 13

A pressure-sensitive adhesive layer was provided in like manner as Example 3 using 23 mg of the compound R and 23 mg of CIR1081 (manufactured by Japan Carlit Co., Ltd.), Ltd. of an immonium compound as a near infrared absorbing dye, to prepare a test piece. The performance evaluation of absorption intensities was carried out at the respective maximum absorption wavelengths at 865 nm and 1090 nm of the two compounds.

(Evaluation Result)

The evaluation results of Examples 1 to 28 and Comparative Examples 1 to 13 are shown in Table 1. The results were evaluated as below.

Evaluation 1: No change was notated as o and change was notated as x.

Evaluations 2 to 5: It was notated as a double circle that absorption intensity after test for absorption intensity before test was 80% or more. 50% or more and less than 80% was notated as a circle, 0% or more and less than 50% was notated as an X-mark, and non enforcement was notated as a horizontal line.

TABLE 1

|  | ○ No change<br>X Change<br>Evaluation 1 | Evaluation wavelength | ◎ 80% or more<br>○ 50-80%<br>X 0-50%<br>— No enforcement<br>Evaluation 2 | Same as left Evaluation 3 | | Same as left Evaluation 4 | | Same as left Evaluation 5 |
|---|---|---|---|---|---|---|---|---|
|  |  |  |  | 250 h | 500 h | 250 h | 500 h | 250 h |
| Example 1 | ○ | 862 | ◎ | ◎ | ◎ | ◎ | ◎ | — |
| Example 2 | ○ | 866 | ◎ | ◎ | ◎ | ◎ | ◎ | ◎ |
| Example 3 | ○ | 862 | ○ | ◎ | ◎ | ◎ | ○ | — |
| Example 4 | ○ | 855 | ◎ | ◎ | ○ | ◎ | ○ | ◎ |
| Example 5 | ○ | 857 | ○ | ○ | ○ | ◎ | ○ | — |
| Example 6 | ○ | 856 | ◎ | ◎ | ○ | ◎ | ◎ | — |
| Example 7 | ○ | 852 | ◎ | ◎ | ◎ | ◎ | ◎ | — |
| Example 8 | ○ | 855 | ◎ | ◎ | ◎ | ◎ | ◎ | — |
| Example 9 | ○ | 1010 | ◎ | ◎ | ◎ | ◎ | ○ | — |
| Example 10 | ○ | 905 | ○ | ◎ | X | ○ | X | — |
| Example 11 | ○ | 897 | ◎ | ◎ | ◎ | ◎ | ◎ | — |
| Example 12 | ○ | 903 | ◎ | ◎ | ◎ | ◎ | ◎ | — |
| Example 13 | ○ | 906 | ◎ | ◎ | ◎ | ◎ | ◎ | — |
| Example 14 | ○ | 914 | ◎ | ◎ | ◎ | ◎ | ◎ | — |
| Example 15 | ○ | 887 | ◎ | ○ | ○ | ◎ | ○ | — |
| Example 16 | ○ | 828 | ◎ | ○ | ○ | X | X | — |
| Example 17 | ○ | 762 | ◎ | ◎ | ◎ | ◎ | ◎ | — |
| Example 18 | ○ | 838 | ○ | ○ | ○ | ○ | X | — |
| Example 19 | ○ | 919 | ◎ | ◎ | ○ | ◎ | ◎ | — |
| Example 20 | ○ | 953 | ◎ | ◎ | ◎ | ◎ | ○ | — |
| Example 21 | ○ | 913 | ○ | ◎ | ○ | ◎ | ○ | — |
| Example 22 | ○ | 862 | ◎ | ◎ | ◎ | ◎ | ◎ | — |
|  |  | 953 | ◎ | ◎ | ◎ | ◎ | ◎ | — |

TABLE 1-continued

|  | ○ No change X Change Evaluation 1 | Evaluation wavelength | ◎ 80% or more ○ 50-80% X 0-50% — No enforcement Evaluation 2 | Same as left Evaluation 3 250 h | Same as left Evaluation 3 500 h | Same as left Evaluation 4 250 h | Same as left Evaluation 4 500 h | Same as left Evaluation 5 250 h |
|---|---|---|---|---|---|---|---|---|
| Example 23 | ○ | 856 | ◎ | ◎ | ◎ | ◎ | ◎ | — |
|  |  | 953 | ◎ | ◎ | ◎ | ◎ | ◎ | — |
| Example 24 | ○ | 855 | ◎ | ◎ | ◎ | ◎ | ◎ | — |
|  |  | 953 | ◎ | ◎ | ◎ | ◎ | ◎ | — |
| Example 25 | ○ | 862 | ◎ | ◎ | ◎ | ◎ | ◎ | — |
|  |  | 1010 | ○ | ◎ | ◎ | ◎ | ○ | — |
| Example 26 | ○ | 852 | ◎ | ◎ | ◎ | ◎ | ◎ | — |
|  |  | 1010 | ○ | ○ | ○ | ○ | ○ | — |
| Example 27 | ○ | 583 | ◎ | ◎ | ◎ | ◎ | ◎ | — |
|  |  | 862 | ◎ | ◎ | ◎ | ◎ | ◎ | — |
|  |  | 953 | ◎ | ◎ | ◎ | ◎ | ◎ | — |
| Example 28 | ○ | 585 | ◎ | ◎ | ◎ | ◎ | ◎ | — |
|  |  | 862 | ◎ | ◎ | ◎ | ◎ | ◎ | — |
|  |  | 953 | ◎ | ◎ | ◎ | ◎ | ◎ | — |
| Comparative Example 1 | ○ | 862 | X | ○ | X | X | X | X |
| Comparative Example 2 | X Absoprtion was reduced | 854 | X | X | X | X | X | — |
| Comparative Example 3 | ○ | 924 | X | ◎ | ◎ | ◎ | ◎ | — |
| Comparative Example 4 | ○ | 927 | X | ◎ | ◎ | ◎ | ◎ | — |
| Comparative Example 5 | X No dissolution | 735 | — | — | — | — | — | — |
| Comparative Example 6 | ○ | 841 | X | ◎ | ◎ | ◎ | X | — |
| Comparative Example 7 | ○ | 841 | X | ◎ | ◎ | ◎ | ◎ | — |
| Comparative Example 8 | ○ | 743 | X | ◎ | ◎ | ◎ | ○ | — |
| Comparative Example 9 | ○ | 741 | X | ◎ | ◎ | ◎ | ◎ | — |
| Comparative Example 10 | X Absoprtion was reduced | 868 | — | — | — | — | — | — |
| Comparative Example 11 | X Vigorously changed to yellow | 976 | — | — | — | — | — | — |
| Comparative Example 12 | ○ | 1092 | X | ○ | X | ○ | X | — |
| Comparative Example 13 | X Absoprtion was reduced and colored | 865 1090 | X X | X X | X X | X X | X X | — — |

<Ripening Test>

The result of the evaluation 1 was as below.

(Absorption intensity after ripening÷absorption intensity before ripening×100) of the test piece of Comparative Example 2 was 90% after 3 days during ripening and was successively changed to be 82% after 15 days. Comparative Example 5 had no solubility and absorption intensity was not expressed. The absorption intensity of Comparative Example 10 was also 90% after 3 days during ripening and changed in like manner as Comparative Example 2. Comparative Example 11 changed vigorously to yellow at the time of preparing a pressure-sensitive adhesive containing the near infrared absorbing dye. Spectral transmission spectrum shape changed and absorption performance that the compound IRG068 had was not obtained. In Comparative Example 12, a pressure-sensitive adhesive containing the near infrared absorbing dye also changed to yellow. Further, absorption intensity was 88% after 3 days during ripening to be changed. There was no change before and after the ripening except this.

<Light Resistance>

For Examples 1 to 21 and Example 28, the absorption intensity of the maximum absorption wavelength was 50% or more. Examples 22 to 28 contained compounds having a plural number of absorption performances but the absorption intensity at the maximum absorption wavelength of each of compounds was wholly 50% or more. Examples 27 and 28 had not only near infrared absorbing performance but also absorption performance at a visible light range and good result was obtained.

Comparative Examples except Comparative Examples 5, and 11 could not enforce the evaluation 2 or were less than 50%. The colors of the test pieces in Comparative Examples 3, 4, 6, 7, 11 and 12 changed to yellow.

By above results, it is clear that the pressure-sensitive adhesive containing the near infrared absorbing dye that has good light resistance can be provided by using the near infrared absorbing dye having a specific structure and further, the pressure-sensitive adhesive containing the near infrared absorbing dye that has the heat resistance and heat and humidity resistance can be provided. Further, the pressure-sensitive adhesive capable of effectively shielding near infrared rays at a necessary range can be provided by combining a plural number of dyes.

Further, it is clear from the results of Examples 27 and 28 that a dye for color calibration capable of being generally compounded in an adhesive resin can be mixed in addition to the near infrared absorbing dye contained in the pressure-sensitive adhesive of the invention. Accordingly, it can be used as the portion of filters for electronic display such as a filter for a plasma display panel by pasting with layers having other functions such as an antireflection layer and an electromagnetic wave shielding layer, and cost reduction and light transmittance by reduction of the layers of a filter for electronic display can be improved.

INDUSTRIAL APPLICABILITY

According to the invention, there are provided a near infrared absorbing dye that provokes hardly the deterioration of the dye by mixing with a pressure-sensitive adhesive, is excellent in light resistance, further heat resistance and heat and humidity resistance and cuts broadly a near infrared rays range nearby 800 to 1050 nm, and a pressure-sensitive adhesive including the dye. The pressure-sensitive adhesive of the invention can be used for wide uses as a HEAT-ray shielding film, sun glasses, protective glasses, a light receiver for a remote controller and the like other than a filter for electronic display such as a filter for an optical plasma display panel, by pasting these with layers having other functions such as an antireflection layer and an electromagnetic wave shielding layer.

Further, the specification, the scope of claims for the patent, drawings and the whole content of the summary of Japanese Patent Application Publication No. 2005-133342 that was applied on Apr. 28, 2005 are cited here and are taken in as the disclosure of the specification of the invention.

The invention claimed is:

1. A pressure-sensitive adhesive comprising a near infrared absorbing dye of formula (9):

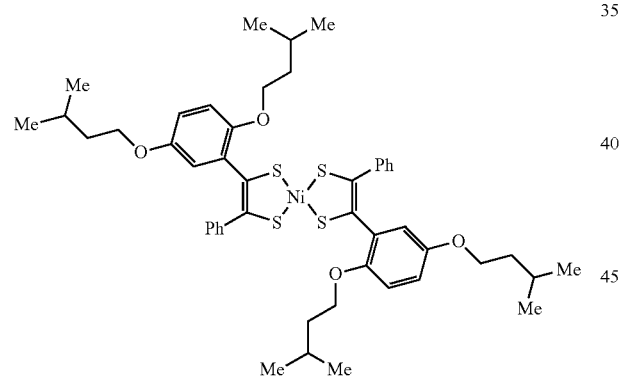

(9)

wherein Me is a methyl group and Ph is a phenyl group, and wherein in a light resistance test, an absorption intensity at a maximum absorption wavelength of the near infrared absorbing dye (9) in a layer of the pressure-sensitive adhesive having a thickness of 25±5 μm is 50% or more of the absorption intensity before the test in which the layer of the pressure sensitive adhesive is irradiated with light having an irradiance of 64.5 W/m² at a wavelength of 300 to 400 nm for 160 hours.

2. A pressure-sensitive adhesive comprising a near infrared absorbing dye of formula (10):

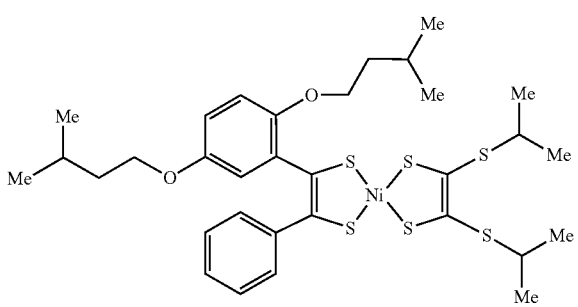

(10)

wherein Me is a methyl group, and wherein in a light resistance test, an absorption intensity at a maximum absorption wavelength of the near infrared absorbing dye (9) in a layer of the pressure-sensitive adhesive having a thickness of 25±5 μm is 50% or more of the absorption intensity before the test in which the layer of the pressure sensitive adhesive is irradiated with light having an irradiance of 64.5 W/m² at a wavelength of 300 to 400 nm for 160 hours.

* * * * *